US007573800B2

(12) United States Patent
Fukakusa et al.

(10) Patent No.: US 7,573,800 B2
(45) Date of Patent: Aug. 11, 2009

(54) OPTICAL PICKUP AND OPTICAL DISK APPARATUS

(75) Inventors: Masaharu Fukakusa, Kobayashi (JP); Mitsuhiro Matsumoto, Arao (JP); Jiro Mimasa, Tamana (JP); Hiroshi Tanigawa, Kumamoto (JP); Hiroshi Kamei, Tamana (JP); Toshiharu Kimura, Tamana (JP); Mitsugu Adachi, Tamana (JP); Hiroshi Iwabuchi, Oonojou (JP); Eiichiro Nakao, Kurume (JP)

(73) Assignee: Panasonic Corporation, Osaka (JP)

( * ) Notice: Subject to any disclaimer, the term of this patent is extended or adjusted under 35 U.S.C. 154(b) by 572 days.

(21) Appl. No.: 11/044,633

(22) Filed: Jan. 28, 2005

(65) Prior Publication Data
US 2005/0169151 A1 Aug. 4, 2005

(30) Foreign Application Priority Data

| Jan. 29, 2004 | (JP) | ............ P2004-021088 |
| Jan. 30, 2004 | (JP) | ............ P2004-022896 |
| Feb. 6, 2004 | (JP) | ............ P2004-030338 |
| Feb. 6, 2004 | (JP) | ............ P2004-030339 |
| Mar. 31, 2004 | (JP) | ............ P2004-103803 |
| Apr. 27, 2004 | (JP) | ............ P2004-131006 |
| May 18, 2004 | (JP) | ............ P2004-147452 |

(51) Int. Cl.
G11B 7/00 (2006.01)
(52) U.S. Cl. .................. 369/112.19; 369/44.12
(58) Field of Classification Search ............ 369/112.01, 369/44.12
See application file for complete search history.

(56) References Cited

U.S. PATENT DOCUMENTS

| 5,136,152 A | | 8/1992 | Lee |
| 5,497,366 A | * | 3/1996 | Fujisawa ............... 369/112.24 |
| 5,513,121 A | * | 4/1996 | Sugawara et al. ........ 369/44.14 |

(Continued)

FOREIGN PATENT DOCUMENTS

JP 06-103602 4/1994

(Continued)

OTHER PUBLICATIONS

Japanese Office Action dated Dec. 9, 2008 with English translation.
Japanese Office Action dated Nov. 19, 2008 with English translation thereof. (JP 2004-030338).
Japanese Office Action dated Nov. 19, 2008 with English translation thereof. (JP 2004-021088).

(Continued)

Primary Examiner—Wayne R Young
Assistant Examiner—Linh T Nguyen
(74) Attorney, Agent, or Firm—Dickinson Wright, PLLC

(57) ABSTRACT

An optical pickup and an optical disk apparatus of the invention includes a light source 1 mounted with a light-emitting element constituted of a monoblock on a surface of a plate 6 and emitting plural light beams, a light-receiving element 2, optical members 4, 5 and a coupling base 3 for coupling the light source 1, the light-receiving element 2 and the optical members 4, 5, wherein a light from the light source 1 is directed through the optical members 4, 5 toward an optical disk, and a returning light from the optical disk is guided through the optical members 4, 5 to the light-receiving element 2, characterized in that the plate 6 provided in the light source 1 and the coupling base 3 are adjoined by a solder.

5 Claims, 39 Drawing Sheets

U.S. PATENT DOCUMENTS

| | | | |
|---|---|---|---|
| 5,689,492 A * | 11/1997 | Brazas et al. | 369/112.09 |
| 5,703,856 A * | 12/1997 | Hayashi et al. | 369/53.2 |
| 5,706,270 A * | 1/1998 | Iizuka et al. | 369/112.29 |
| 5,790,504 A * | 8/1998 | Hayashi et al. | 369/112.12 |
| 6,018,509 A * | 1/2000 | Itoh et al. | 720/685 |
| 6,023,448 A * | 2/2000 | Tajiri et al. | 369/112.04 |
| 6,556,533 B1 * | 4/2003 | Fukakusa et al. | 369/112.19 |
| 6,664,998 B1 * | 12/2003 | Kyoya et al. | 347/241 |
| 2001/0043535 A1 | 11/2001 | Fukakusa | |
| 2002/0097773 A1 | 7/2002 | Masui | |
| 2003/0185137 A1 | 10/2003 | Horinouchi | |
| 2005/0128895 A1* | 6/2005 | Hoshino et al. | 369/44.15 |
| 2005/0169151 A1 | 8/2005 | Fukakusa | |

FOREIGN PATENT DOCUMENTS

| | | |
|---|---|---|
| JP | 07-073493 | 3/1995 |
| JP | 08-102080 | 4/1996 |
| JP | 1 0241189 | 9/1998 |
| JP | 2001-053372 | 2/2001 |
| JP | 2001-101703 | 4/2001 |
| JP | 2001 307367 | 11/2001 |
| JP | 2001-312835 | 11/2001 |
| JP | 2002-056550 | 2/2002 |
| JP | 2002-100068 | 4/2002 |
| JP | 2002-298423 | 10/2002 |
| JP | 2003-123297 | 4/2003 |
| JP | 2003-132583 | 5/2003 |
| JP | 2004-005903 | 1/2004 |
| JP | 2004-192755 | 7/2004 |
| JP | 2004-310902 | 11/2004 |
| JP | 2005-136171 | 5/2005 |
| JP | 2005-166157 | 6/2005 |
| JP | 2005-190520 | 7/2005 |
| JP | 2005-216369 | 8/2005 |

OTHER PUBLICATIONS

Japanese Office Action dated Sep. 17, 2008 with English translation thereof.

Japanese Office Action dated Mar. 9, 2009 with English translation.

* cited by examiner

OPTICAL PICKUP AND OPTICAL DISK APPARATUS

BACKGROUND OF THE INVENTION

1. Field of the Invention

The present invention relates to an optical disk apparatus to be mounted on an electronic equipment such as a personal computer, a notebook computer, a mobile terminal equipment or the like, and an optical pickup advantageously employed in such optical disk apparatus.

2. Description of the Related Art

As an optical recording medium, various optical disks such as a DVD (digital versatile disk), a CD-R (recordable compact disk), a CD-RW (rewritable compact disk) and the like are being developed. In the DVD, information recording or reproduction is executed with a laser beam of a wavelength of about 650 nm. Also in the CD-R or CD-RW, information recording or reproduction is executed with a laser beam of a wavelength of about 780 nm. There is proposed an optical disk apparatus for executing information recording or reproduction on the optical disks of such plural types.

Also in such optical disk apparatus for executing information recording or reproduction on the optical disks of such plural types, as a light source for an optical pickup mounted on the optical disk apparatus, there are employed plural laser elements emitting light beams of different light beams arranged in adjacent manner in a package (so-called hybrid 2-wavelength semiconductor laser) (refereed to JP-A-10-241189) or light sources of plural wavelengths integrated on a semiconductor substrate (so-called monolithic 2-wavelength semiconductor laser).

However, though the configuration described in JP-A-10-241189 does not show a very large heat generation in the light source because the distance of the light sources is relatively large, the monolithic 2-wavelength semiconductor laser when employed as the light source shows a very high heat generation because it is of a monoblock structure with very close light beam emitting positions, thereby resulting in drawbacks such as a shortened service life of the light source.

SUMMARY OF THE INVENTION

The present invention is to resolve the aforementioned prior drawback, and is to provide an optical pickup and an optical disk apparatus capable of improving reliability such as the service life of the laser, utilizing a frame laser light source, and even in case of employing preferably a 2-wavelength laser light source.

The present invention has been made for solving the aforementioned drawbacks, and is to provide an optical pickup including a light source mounted with a light-emitting element constituted of a monoblock structure on a surface of a plate and emitting plural light beams, a light-receiving element, an optical member and a coupling base for coupling the light source, the light-receiving element and the optical member, wherein a light from the light source is directed through the optical member toward a medium, and a returning light from the medium is guided through the optical member to the light-receiving element, characterized in that the plate provided in the light source and the coupling base are adjoined by a solder, and an optical pickup apparatus utilizing the optical pickup.

The present invention minimizes an area of a gap generated at adjoining of a light source including a light-emitting element and a coupling base for supporting the light source to effectively transmit heat generated in the light-emitting element to thus adjoined coupling base and to sufficiently secure an adjoining support force of the light source and the coupling base, thereby preventing at least either of a deterioration of the characteristics and a shortened service life of the light-emitting element by heat, even in case the entire structure is made compact by utilizing a light-emitting element capable of emitting plural light beams by a monoblock.

DESCRIPTION OF THE PREFERRED EMBODIMENTS

Figure 1:
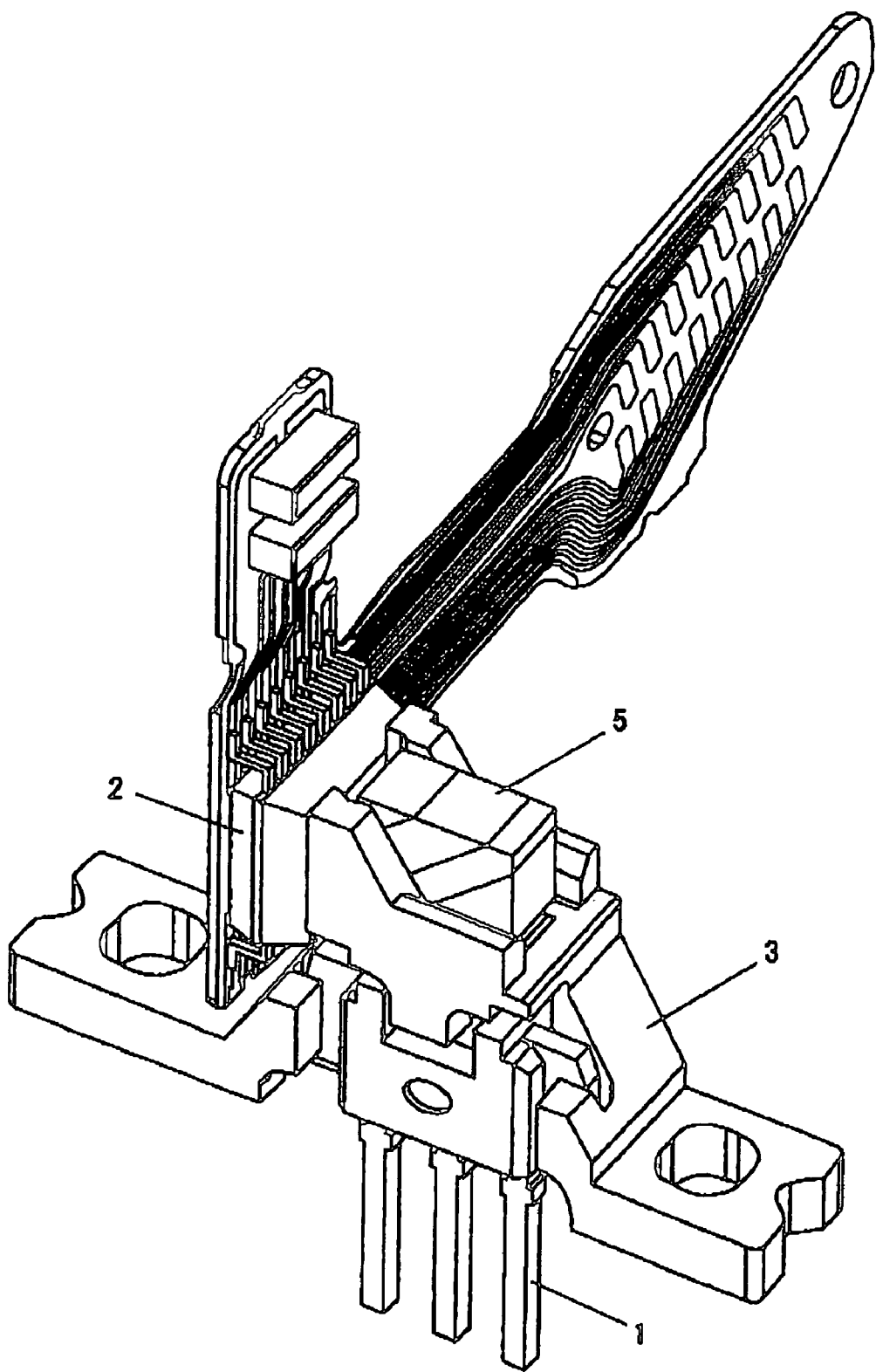
FIG. 1 is a perspective view showing an optical pickup in an embodiment of the present invention.

An invention is an optical pickup including a light source mounted with a light-emitting element constituted of a monoblock on a surface of a plate and emitting plural light beams, a light-receiving element, an optical member and a coupling base for coupling the light source, the light-receiving element and the optical member, wherein a light from the light source is directed through the optical member toward a medium, and a returning light from the medium is guided through the optical member to the light-receiving element, characterized in that the plate provided in the light source and the coupling base are adjoined by a solder. As the heat generated in the light-emitting element can be effectively transmitted to the coupling base, it is rendered possible to prevent at least either of a deterioration of the characteristics and a shortened service life of the light-emitting element by heat, even in case the entire structure is made compact by utilizing a light-emitting element capable of emitting plural light beams by a monoblock.

The invention is an optical pickup characterized in that the solder is a solder having a melting point lower than that of a substrate of the coupling base or the light source or a surface processing layer provided on the substrate, and is provided as a coating layer on at least either of the coupling base and the light source. By forming a coating layer of a melting point lower than that of a metal constituting the coupling member, it is possible to fuse the coating layer and fix the coupling member by conducting at least either of irradiating the coupling member with a laser beam and bringing a heat source close thereto, thereby allowing to precisely fix the coupling member even in case the optical member employed in the optical pickup apparatus is made compact. Also a main fixation for adjoining the light source, including the light-emitting element and the coupling base for supporting the light source can be executed in a shorter time than in the prior technology and in a partial manner, thereby decreasing an influence to a temporary fixation part for adjoining the light source including the light-emitting element and the coupling base for supporting the light source and allowing to execute the main fixation while maintaining optical characteristics already adjusted at the temporary fixation.

The invention is an optical pickup characterized in that the solder is a cream solder having a melting point lower than that of a substrate of the coupling base or the light source or a surface processing layer provided on the substrate, and is provided on at least either of and on an adjoining interface of the coupling base and the light source. By forming a coating layer of a melting point lower than that of a metal constituting the coupling member, it is possible to fuse the coating layer and fix the coupling member by conducting at least either of irradiating the coupling member with a laser beam and bringing a heat source close thereto, thereby allowing to precisely fix the coupling member even in case the optical member employed in the optical pickup apparatus is made compact.

The invention is an optical pickup characterized in that the coupling base is adjoined to a portion of a side of the plate opposite to the side mounting the light-emitting element, whereby the coupling base and the plate can be thermally adjoined without paying attention to the light-emitting element.

The invention is an optical pickup characterized in that an adjoining portion of the plate and the coupling base is provided in plural positions, whereby it is rendered possible to securely transmit heat from the plate to the coupling base and to firmly fix the light source and the coupling base.

The invention described is an optical pickup characterized in that the light source has a configuration of mutually fixing the plate and a terminal portion with a mold, and is constructed as a frame laser in which the light-emitting element provided on the plate and the terminal portion are electrically connected, both ends of the plate protrude from the mold, and both ends of the plate and a portion of the light-emitting element opposite to a mounting portion thereof are adjoined to the coupling base whereby it is rendered possible to securely transmit heat from the plate to the coupling base and to firmly fix the light source and the coupling base.

The invention is an optical pickup characterized in that the solder has a Bi content of 53 to 63%, and a lowered melting point of the solder allows to reduce the heat to be applied at the adjoining and to minimize the damage to the light source and the temporary fixing portion.

An invention is an optical pickup characterized in that the solder, in case of a Sn—Cu alloy, has a Cu content of 1 to 3%, whereby it is rendered possible to realize a lowered melting point and a wetting property of the solder at the same time, thereby enabling to efficiently transmit heat from the plate to the coupling base and to firmly fix the light source and the coupling base.

The invention is an optical pickup characterized in that the coating layer formed by the solder has a thickness of 5 to 10 μm, whereby it is rendered possible to attain at the same time a precision of a component dimension of the substrates of the coupling base or the light source and an adjoining strength of the coupling base and the light source, thereby improving precision of assembly and realizing firm fixation of the light source and the coupling base.

The invention is an optical disk apparatus characterized in including the optical pickup, rotation drive means which rotates a medium, and displacement means which displaces the optical pickup close to or away from the rotation drive means. Countermeasure to heat can be easily achieved in a thin structure and a light source of a monoblock structure can be employed, so that the configuration can be simplified.

In the following, an embodiment of the present invention will be explained with reference to the accompanying drawings.

Embodiment 1

Figure 2:
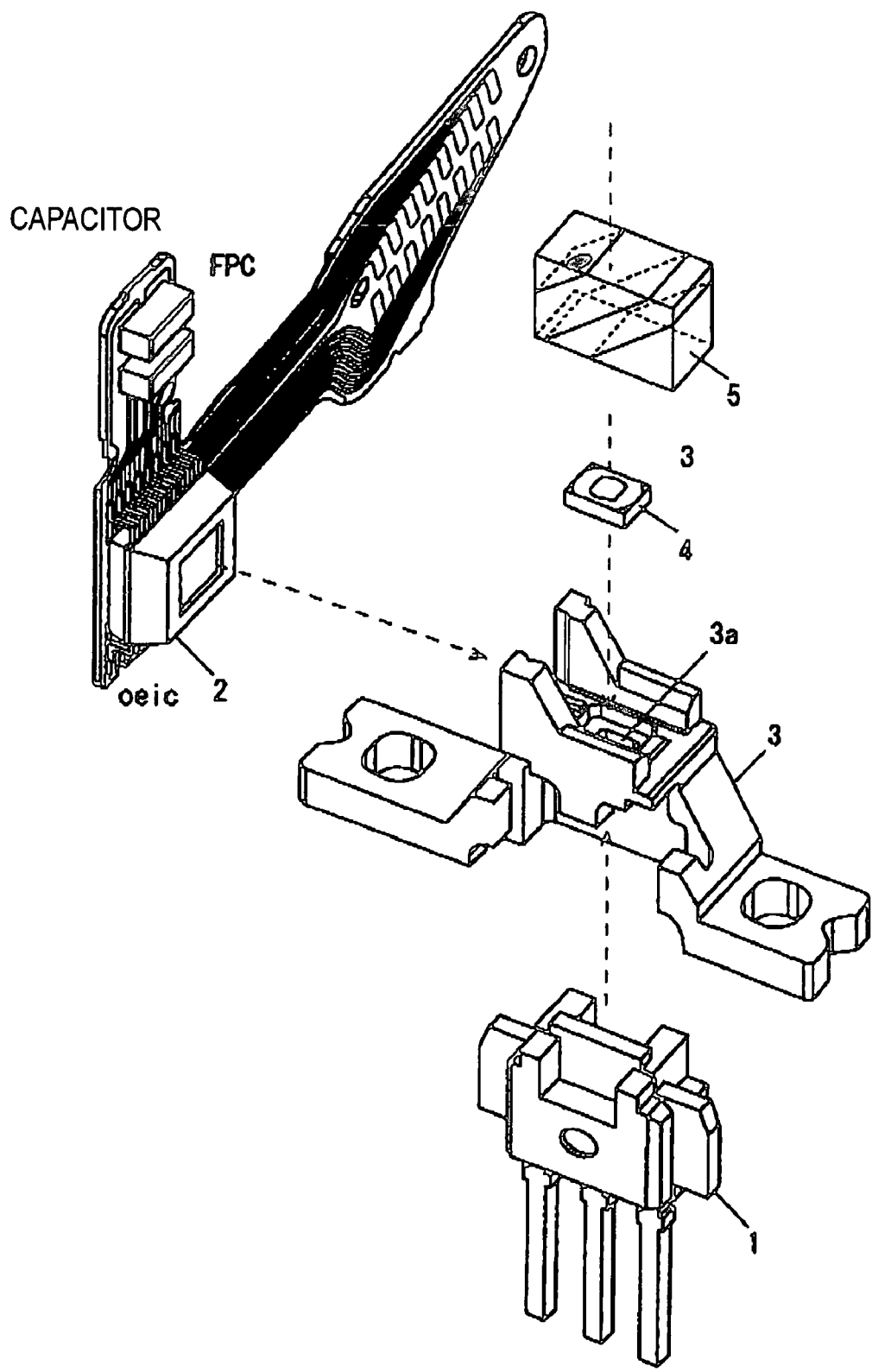
FIG. 2 is an exploded perspective view showing an optical pickup in an embodiment of the present invention.

FIGS. 1 and 2 are a perspective view and an exploded perspective view of an optical pickup in an embodiment of the present invention.

Referring to FIGS. 1 and 2, there are shown a light source 1, a light-receiving element 2, a coupling base 3 and optical members 4 and 5. The light source 1, the light-receiving element 2 and the optical members 4, 5 are adjoined to the coupling base 3. Between the light source 1 and the optical members 4, 5, a penetrating hole 3a is provided in the coupling base 3. A light emitted from the light source 1 passes through the penetrating hole 3a and enters the optical members 4, 5, and a light emerging from the optical member 5 irradiates an unillustrated optical disk through condensing means including at least an unillustrated objective lens and the like thereby executing a predetermined information recording on the optical disk.

Also a light reflected from the optical disk passes through at least an objective lens and the like, then enters the optical member 5, and, after one or plural reflections in the optical member 5, enters the light-receiving element 2. The light-receiving element 2 converts the incident light into an electrical signal, which is supplied to a circuit portion of a signal generating system for generating therein a tracking error signal, a focus error signal, an RF signal and so on, and a tracking control and a focus control of the optical pickup are executed based on these signals, while desired information is generated from the RF signal.

The light source 1 is mounted from a rear portion of the coupling base 3, in such a manner that a light emerging portion at a front end of the light source 1 and the optical member 4 mounted on the coupling base 3 are mutually opposed. Also a light entering face of the light-receiving element 2 is opposed at least to a lateral portion of the optical member 5, of which a bottom portion is opposed to the optical member 4.

In the following, each component will be explained in detail.

At first there will be given an explanation on the light source 1.

Figure 3:
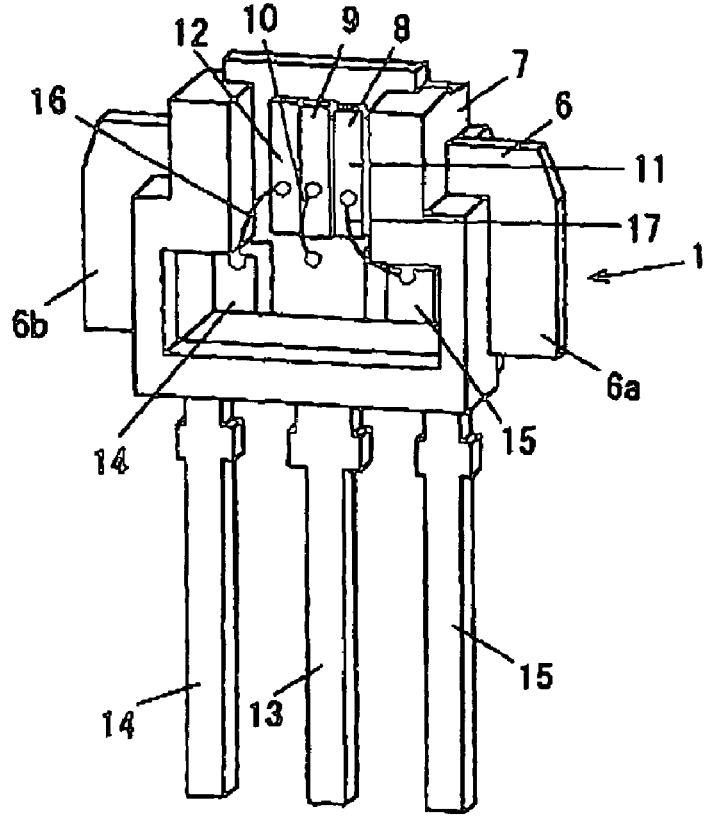
FIG. 3 is a perspective view showing an optical source of an optical pickup in an embodiment of the present invention.
Figure 4:
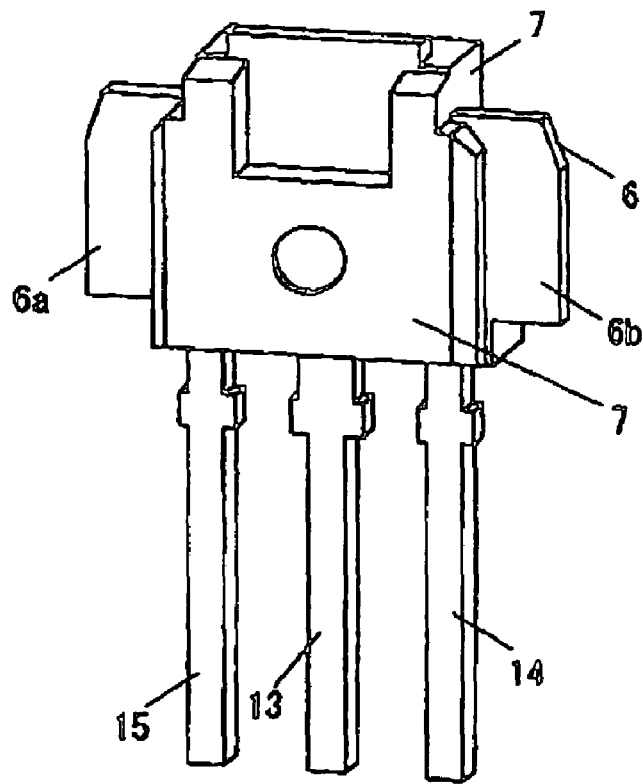
FIG. 4 is a perspective view showing an optical source of an optical pickup in an embodiment of the present invention.

As the light source, for example a frame laser as shown in FIGS. 3 and 4 is employed advantageously. The frame laser light source as the light source 1 is constituted by covering a part of a plate 6 with a mold member 7. As the plate 6, a plate-shaped member of a metal such as copper, a copper alloy, aluminum, an aluminum alloy, iron or an iron alloy is preferably employed, and is more preferably coated thereon with a solderable material for example by plating or evaporation. In the present embodiment, the plate-shaped member is formed by a metal material, but a non-metal material with a satisfactory thermal conductivity and a satisfactory electric conductivity such as electroconductive ceramics can also be employed. In the present embodiment, the plate 6 is provided with lateral portions 6a, 6b protruding to both lateral sides, which are formed so as to stimulate heat radiation or to improve a mounting property to other members.

On the plate 6, a semiconductor laser element 9 is mounted across a submount 8 having an insulating portion, and an upper face of the semiconductor laser element 9 is magnetically connected with the plate 6 by a wire such as of gold. In this state, a light emitting face of the semiconductor laser element 9 is positioned in an upper part of the frame laser light source. The submount 8 has a base constituted of an insulating material, and is also provided, on a face on which the semiconductor laser element 9 is formed, with electrodes 11, 12 on which the semiconductor laser element 9 is electrically adjoined.

The semiconductor laser element 9 has a monoblock structure, emitting one to plural lights of different wavelengths from a single block. In the present embodiment, there is employed a semiconductor laser element 9 emitting a laser beam of a wavelength of about 650 nm (for example for DVD) and a laser beam of a wavelength of about 780 nm (for example for CD). The semiconductor laser element 9 may emit a single light or three or more lights of mutually different wavelengths. The optical pickup of the present invention is suitable particularly to the use of a semiconductor laser element 9 which emits plural lights of mutually different wavelengths. In the present embodiment, for emitting plural lights of mutually different wavelengths, a monoblock structure is employed in the semiconductor laser element 9, but it is also possible to mount a semiconductor laser element 9, emitting a light beam of a wavelength by a block, in plural units on plural plates 6, thereby emitting plural lights of mutually different wavelengths. In such case, though the size of the light source 1 may become somewhat larger, it is possible to mount semiconductor laser elements 9 emitting light beams of mutually different arbitrary wavelengths, thereby facilitating emission of plural light beams of significantly different wavelengths.

13, 14 and 15 indicate terminal portions, and a terminal portion 13 is integrally formed with the plate 6. Thus the plate 6 and the terminal portion 13 are electrically connected. Also the terminal portions 14 and 15 are formed separate from the plate 6 and the terminal portion 13, and are mutually fixed by a mold member 7. An end portion of the terminal portion 14 is electrically adjoined with the electrode 12 by a conductive wire 16, and the terminal portion 15 is electrically adjoined mutually with the electrode 11 through a wire 17.

For example in case the semiconductor laser element 9 emits a light beam for executing at least either of information recording/reproduction on a DVD-type optical disk and a light beam for executing at least either of information recording/reproduction on a CD-type optical disk, the terminal portion 13 is connected to the ground, while the terminal portion 14 is connected to a current supplying circuit for causing a DVD-type light beam to be emitted, and the terminal portion 15 is connected to a current supplying circuit for causing a CD-type light beam to be emitted. Thus, in case of emitting a DVD-type light beam, a current flows in the order of the terminal portion 14, the wire 16, the electrode 12, the semiconductor laser element 9, the wire 10, the plate 6 and the terminal portion 13. In case of emitting a CD-type light beam, a current flows in the order of the terminal portion 15, the wire 17, the electrode 11, the semiconductor laser element 9, the wire 10, the plate 6 and the terminal portion 13.

As the mold member 7, there is advantageously employed an insulating material such as a resinous material or a ceramic material, particularly preferably a resinous material, and the use of a resinous material much facilitates preparation of the light source 1. Among the resinous material, there is preferred a material having a high heat resistance (250° C. or higher) and generating little burr or the like. The present embodiment employs PPS (polyphenylenesulfide). Advantageously employable resinous materials include an epoxy resin, an urethane resin, and a liquid crystal polymer.

The mold member 7 mutually fix the plate 6 integral with the terminal portion 13, and the terminal portions 14 and 15, and is provided, as shown in FIG. 3, with a wall portion having an aperture at the side of a light emitting face in front of the light source 1. In the wall portion, there are provided the submount 8, the semiconductor laser element 9, a part of the plate 6, the wire 10, the wire 16, the wire 17, a part of the terminal portion 14, and a part of the terminal portion 15. Also on a rear face of the light source 1, as shown in FIG. 4, a mold member 7 is provided so as to expose a part of a face of the plate 6 opposite to the side on which the semiconductor laser element 9 is provided. The mold member 7 on the front side and the mold member on the rear side are constructed integrally.

In the following, the coupling base 3 will be explained in detail with reference to FIGS. 5 and 6.

The coupling base 3 is preferably formed with a material of a relatively light weight, a shaping property with a high precision and a heat radiating property, and for example zinc, a zinc alloy, aluminum, an aluminum alloy, titanium or a titanium alloy can be advantageously employed. In the present embodiment, the coupling base is constituted of zinc die-cast in consideration of the cost.

The coupling base 3 is provided with fixing portions 18, 19 for fixing the coupling base 3 to another member, and the fixing portions 18, 19 are respectively provided with penetrating holes 18a, 19a for inserting binding means such as screws or caulking pins to another member. In the present embodiment, screws are inserted into the penetrating holes 18a, 19a and are inserted to screw holes of another member for achieving fixation.

In the present embodiment, the mounting to another member is achieved by screws, but the coupling base 3 may be mount on the another member by an adjoining material such as an organic adhesive or a solder, or welding means such as ultrasonic welding, and, in such case, the penetrating holes 18a, 19a may be dispensed with and the adhered or adjoined surface may be provided with irregularities, a predetermined surface roughness or grooves for improving the strength of adhesion or adjoining.

In the present embodiment, the penetrating holes 18a, 19a are provided respectively in the fixing portions 18, 19, but there may also be adopted a configuration of only providing for example a fixing portion 18 with the penetrating hole 18a and not providing another fixing portion 19 with the penetrating hole 19a. In such case, there can be employed a method of fixing the coupling base 3 to another member by fixing the fixing portion 18 to another member for example with a screw and engaging the fixing portion 19 with another member by forming an inserting portion for the fixing portion 19. Also in the present embodiment, the penetrating holes 18a, 19a is formed in a cross-sectional shape of a circular shape, a substantially square shape with rounded corners or an oval shape, but they may also be provided with a slit in a part for forming a substantially C-shaped or semicircular cross section.

Figure 5:
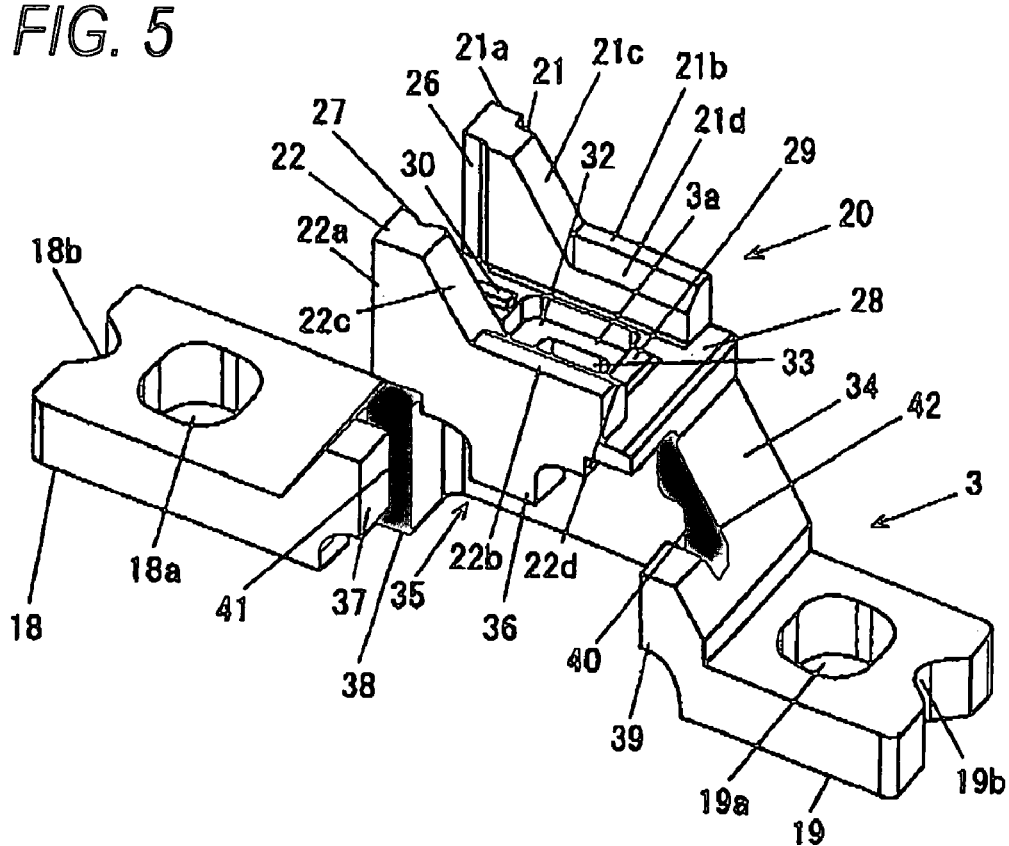
FIG. 5 is a perspective view showing a coupling base of an optical pickup in an embodiment of the present invention.
Figure 6:
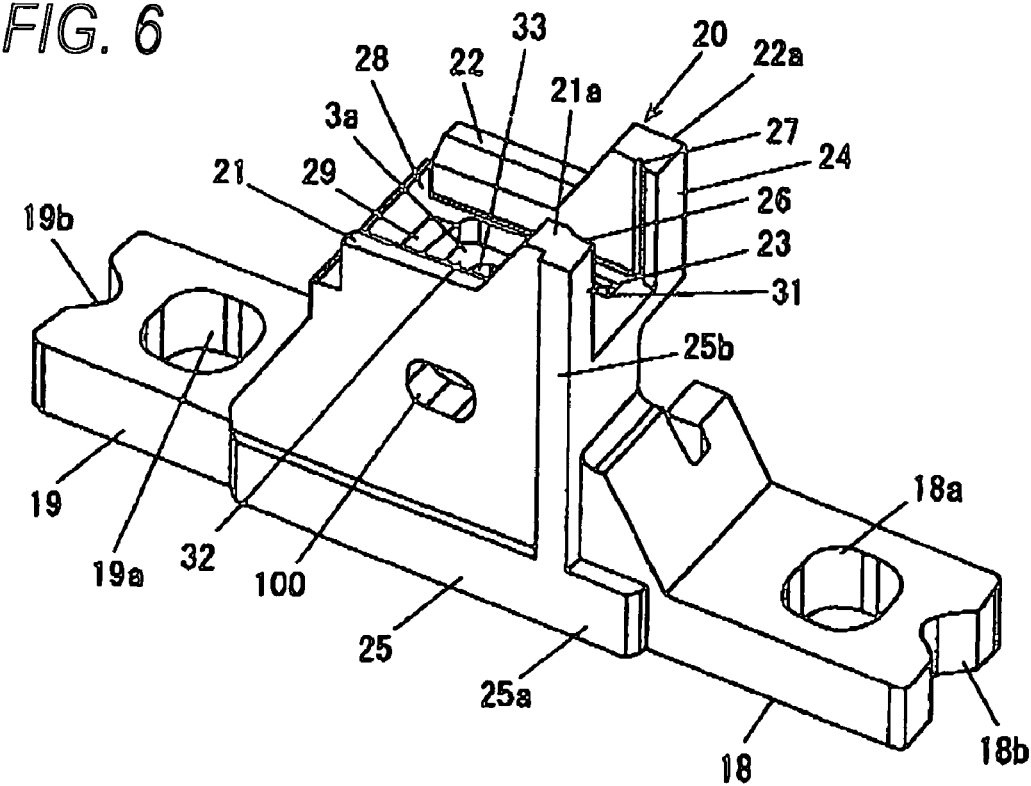
FIG. 6 is a perspective view showing a coupling base of an optical pickup in an embodiment of the present invention.

Also as shown in FIGS. 5 and 6, the fixing portions 18, 19 may be provided, on external ends thereof, with a substantially V- or U-shaped recesses 18b, 19b. Such recesses 18b, 19b may be provided for positioning in mounting the coupling base 3 on another member or may be utilized as a reference for the assembling operation for mounting the light source 1, the light-receiving element 2 and the optical members 4, 5 on the coupling base 3. The present embodiment is provided with the recesses 18b, 19b, but such recess may be provided on at least either of the fixing portions 18, 19, or the recesses 18b, 19b need not be provided in case the assembly of the optical pickup or the mounting thereof on another member is executed with another jig or the like. However, in case the recesses 18b, 19b are required for another reason, they may be provided on the fixing portions 18, 19 even in case the assembly is executed with another jig or the like.

Between the fixing portions 18, 19, there is provided a main body portion 20 for mounting at least the light source 1, the light-receiving element 2 and the optical members 4, 5, and the fixing portions 18, 19 are integrally provided on both sides of the main body portion 20. In the present embodiment, the main body portion 20 and the fixing portions 18, 19 are constructed integrally, but it is also possible to form a separate member corresponding to the fixing portions 18, 19 and to mount the member corresponding to the fixing portions 18, 19 to the main body portion 20 by any one of adhering, latching, engaging, welding and the like.

On the main body portion 20, there are provided a pair of mutually opposed standing lateral walls 21, 22, between which the optical member 5 is positioned. The lateral wall 21 is provided with wall portions 21a, 21b, in which the wall portion 21a is made higher than the wall portion 21b and the wall portions 21a and 21b are integrally connected by an inclined portion 21c. Similarly, the lateral wall 22 is provided with wall portions 22a, 22b, in which the wall portion 22a is made higher than the wall portion 22b and the wall portions 22a and 22b are integrally connected by an inclined portion 22c. Also the wall portions 21b, 22b are respectively provided with mutually opposed tapered portions 21d, 22d.

Also on a side of the wall portions 21a, 22a opposite to the inclined portions 21c, 22c, there are provided substantially flat mounting portions 23, 24 for the light-receiving element 2, which is fixed on such mounting portions 23, 24 for example by adhesion. The mounting portions 23, 24 are preferably in a substantially same plane. The mounting portions 23, 24 are connected, at a bottom part, by a connecting portion of a substantially same plane. The wall portions 21a, 22a, provided with the mounting portions 23, 24 for mounting the light-receiving element 2, are required to have a certain mechanical strength. As a measure for this purpose, the inclined portions 21c, 22c are provided to increase a bottom width of the wall portions 21.a, 22a thereby increasing the mechanical strength of the wall portions 21a, 22a.

The tapered portions 21d, 22d are provided for facilitating insertion of the optical members 4, 5 or avoiding damage thereon, at the mounting thereof on the main body portion 20. Also in the presence of such tapered portions 21d, 22d, in case of placing the optical member 5 and fixing the optical member 5 to the main body portion 20 by an adhesive, it is rendered possible to include the adhesive material in the tapered portions 21d, 22d thereby increasing the adhesion strength.

On a lateral face of the main body portion 20, there is provided a heaped portion 25 which protrudes from other portions, and such heaped portion 25 includes a first heaped portion 25a provided at a bottom portion of the main body portion 20 and between the fixing portions 18, 19, and a second producing portion 25b provided at a lateral part of the main body portion 20 and extending to a lateral face of the wall portion 21a. The first heaped portion 25a and the second heaped portion 25b are mutually connected and are constructed in a substantially inverted-T shape as shown in FIG. 6.

The presence of the heaped portion 25 allows to increase a thickness of the part, thereby increasing the mechanical strength for example of the main body portion 20 and suppressing a bending or a distortion of the coupling base 3. Also the presence of the second heaped portion 25b on the lateral part of the wall portion 21a can further reinforce the mechanical strength of the wall portion 21a, thereby enabling stable fixation of the light-receiving element 2.

Such heaped portion 25 may be dispensed with depending on a material, a size and a shape of the coupling base 3, and the heaped portion 25, in case provided, is not limited to the shape shown in FIG. 6 but can be formed in various shapes such as circular, square, substantially C-shaped, substantially oval, substantially F-shaped, or substantially E-shaped form.

Also the wall portion 21a has a recessed portion 26 reaching an end thereof, and the wall portion 22a is a substantially V- or U-shaped groove 27. These are provided for the purpose, in adjoining the light-receiving element 2 to mounting portions 23, 24 with an adhesive material as will be explained later, that the adhesive material does not easily reach the optical member 4. The wall portion 21a is provided with the recessed portion 26 reaching the end thereof, since the mounting portion 23 of a sufficient area can be secured because of the presence of the aforementioned heaped portion 25, but the wall portion 22a is provided with the groove 27 not extended to the end thereof, as the area of the mounting portion 24 will become small if a recessed portion reaching an end is formed, corresponding to the absence of such heaped portion 25. Also the recessed portion 26 and the groove 27 may be dispensed with depending on the specifications.

Also the lateral walls 21, 22 are so provided that the wall portions 21a, 22a are mutually opposed and that the wall portions 21b, 22b are mutually opposed.

The main body portion 20 is provided with a placing portion 28 for the optical members 4, 5, and the lateral walls 21, 22 stand integrally on both sides of the placing portion 28. In the present embodiment, the lateral walls 21, 22 stand integrally on both sides of the placing portion 28, but it is also possible to constitute the lateral walls 21, 22 in separate members and to mount such lateral walls 21, 22 on both sides of the placing portion 28 by any one of adhering, latching, engaging, welding and the like.

The placing portion 28 is provided with a penetrating hole 3a, which is constituted of a large diameter portion 32 of a larger cross section and a smaller diameter portion 33 of a smaller cross section. In the present embodiment, the large diameter portion 32 and the smaller diameter portion 33 are formed as substantially rectangular forms with rounded corners of a similar shape, but such cross section may be formed in another form such as circular, oval, pentagonal or more polygonal form, and the large diameter portion 32 and the smaller diameter portion 33 may have different cross sectional forms. More specifically, the large diameter portion 32 may be shaped in a substantially rectangular form as described above while the small diameter portion 33 may be shaped as a substantially circular form.

The large diameter portion 32, for accommodating the optical member 4, has such a cross section and a depth as to accommodate the optical member 4. In the present embodiment, the large diameter portion 32 and the smaller diameter portion 33 are formed to provide an advantage of preventing the optical member 4 from dropping when it is accommodated in the large diameter portion 32, however, by a consideration in the process so as to retain the optical member 4 in the penetrating hole 3a by another jig or the like, the penetrating hole 3a may be shaped as a straight structure without the large diameter portion 32 and the smaller diameter portion 33. For example, the penetrating hole 3a may have a cross section, in all areas, of a circular shape of a predetermined radius.

Also in case the penetrating hole 3a has a straight structure as explained above, an internal wall constituting the penetrating hole 3a may be provided with a heaped portion in an integral or separate structure, so as to prevent dropping of the optical member 4 from the penetrating hole 3a. Such structure allows to prevent dropping of the optical member 4, thereby improving the assembling property.

In a rim portion of the aperture of the penetrating hole 3a on the placing portion 28, there are provided protruding portions 29, 30, 31 which are formed on the placing portion 28 as integral or separate structure. In case of a separate structure, a protruding piece may be mounted on the rim of the aperture of the penetrating hole 3a of the placing portion 28 by any one of adhering, latching, engaging, welding and the like.

In the present embodiment, the penetrating hole 3a is provided in the coupling base 3, but such penetrating hole 3a is not restrictive and there may be provided an aperture such as a U-shaped notch.

In the present embodiment, as shown in FIGS. 5 and 6, a relatively large protruding portion 29 is provided in an area of the aperture of the penetrating hole 3a not opposed to the lateral walls 21, 22, while relatively small protruding portions 30, 31 are provided parallel in another area. The protruding portions 29, 30, 31 are provided preferably with a substantially same height. The optical member 5 is placed on the protruding portions 29, 30, 31, and is therefore separated by a predetermined distance, by the height of the protruding portions 29, 30, 31 from the optical member 4, whereby the optical members 4, 5 are maintained mutually non-contact.

In the present embodiment, the protruding portion 29 is provided in a side of the aperture of the penetrating hole 3a while the protruding portions 30, 31 are provided parallel in the other side thereby enabling a three-point support for the optical member 5 to achieve a stable supporting, however it is also possible to form a projection or to form plural protrusions on each side. Also in case of mounting the optical member 5 intentionally in an inclined state at an optical adjustment or the like, the protrusions may have different heights at left and right. More specifically, in the configuration shown in FIGS. 5 and 6, the optical member 5 is mounted in an inclined state for example by forming the protruding part 29 higher and the protruding portions 30, 31 lower.

In the present embodiment, the protruding portions 29, 30, 31 have a substantially square form, but it may be suitable changed according to the specifications and the steps such as a substantially circular shape, a substantially polygonal shape or a substantially triangular shape.

In the present embodiment, there are provided the protruding portions 29, 30, 31 but, by increasing the depth of the large diameter portion 32 larger than the thickness of the optical member 4 to generate a gap between the aperture and the optical member 4 when the optical member 4 is accommodated in the large diameter portion 32, the optical member 5 can be supported by the placing portion 28 without the protruding portions 29, 30, 31 while the optical member 4 can be completely accommodated in the large diameter portion 32, whereby a gap can be formed easily between the optical members 4, 5.

In the present embodiment, the penetrating hole 3a is constituted of the large diameter portion 32 and the small diameter portion 33, but a medium diameter portion may be provided between the large diameter portion 32 and the small diameter portion 33 so as to form two steps. Also in the present embodiment, a step is formed between the large diameter portion 32 and the small diameter portion 33, but there may be adopted a configuration in which the diameter continuously decreases with an increase in the distance from the placing portion 28. More specifically, the penetrating hole 3a is so constructed as to have a larger cross section of the aperture at the side of the placing portion 28 than a cross section of the aperture at the other side.

Furthermore, there may be adopted a configuration having a portion of a smaller diameter in the penetrating hole 3a, such as a large diameter portion 32, a smaller diameter portion 33 and a large diameter portion 32 from the side of the placing portion 28.

In case the penetrating hole 3a has a cross section other than a circular form, for example a square or polygonal form, the large diameter portion 32 and the small diameter portion 33 mean that the large diameter portion 32 has a larger cross section and the small diameter portion 33 has a smaller cross section.

The main body portion 20 is provided, at a bottom side of the placing portion 28, with a support portion 34 for integrally connecting the placing portion 28 and the fixing portions 18, 19, and a space 35 for inserting the light source 1 in parallel manner. The placing portion 28 is provided with a protruding portion 36 protruding toward the space 35. The protruding portion 36 and the support portion 34 are mutually opposed across a space. The support portion 34 and the space 35 are provided between the fixing portions 18, 19.

The space 35 communicates with the penetrating hole 3a. Also protruding portions 38, 39 protrude from the fixing portions 18, 19 toward the space 35, and gaps 38, 40 are formed between the protruding portions 37, 39 and the support portion 34. In the gaps 38, 40, lateral portions 6a, 6b of the light source 1 are principally inserted. Also on the support portion 34 opposed to the gaps 38, 40 there are provided adjoining portions 41, 42 in which the lateral portions 6a, 6b are to be adjoined.

Also the main body portion 20 is provided, at a side of the heaped portion 25, with a penetrating hole 100 communicating with the space 35, in order to enable observation at the alignment of the light source 1. Also the penetrating hole 100 may be covered with a transparent glass or a transparent resinous film or filled with a transparent resin or glass, though the process becomes somewhat complex.

Figure 7:
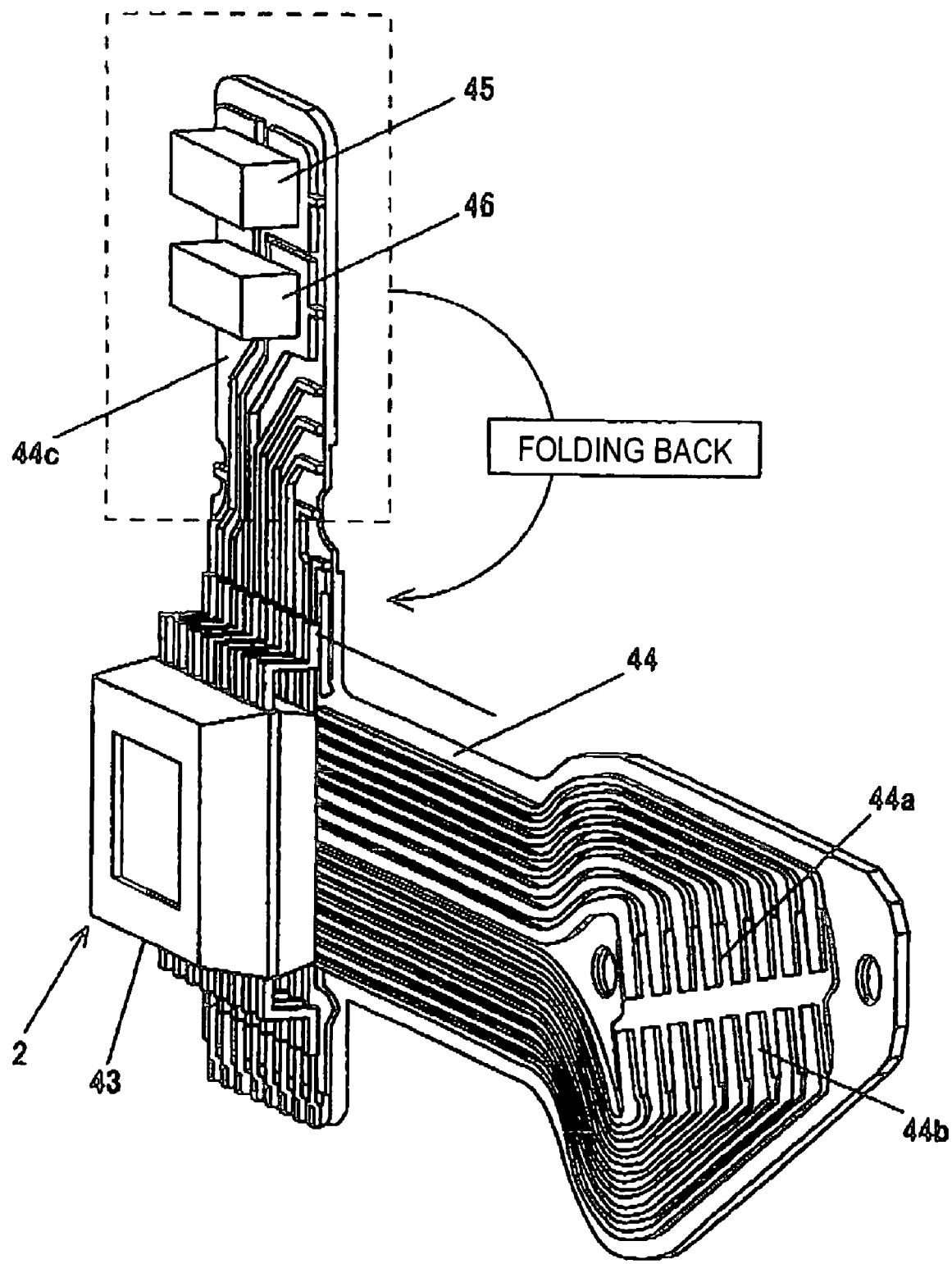
FIG. 7 is a perspective view showing a light-receiving element of an optical pickup in an embodiment of the present invention.
Figure 8:
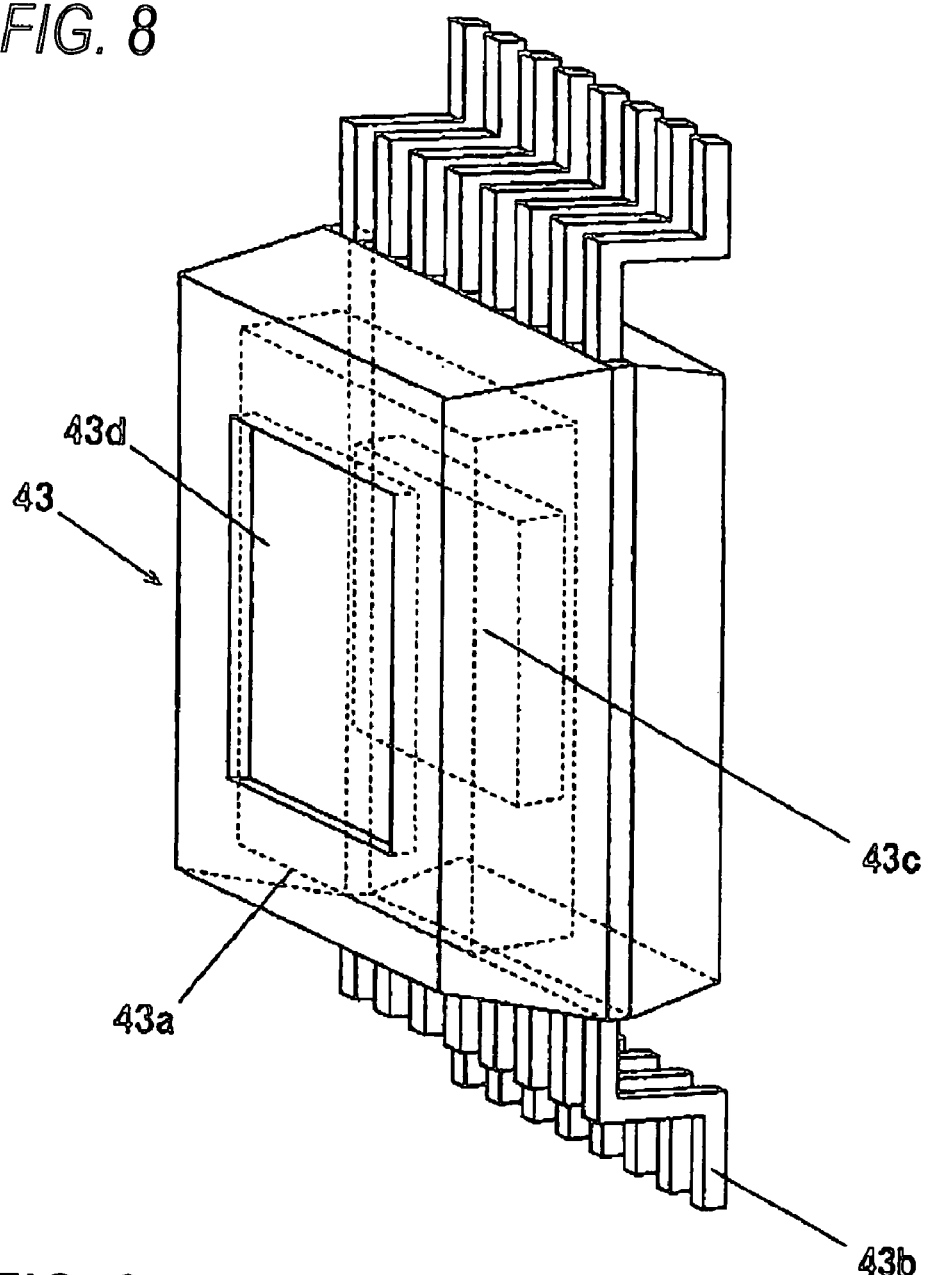
FIG. 8 is a perspective view showing a light-receiving element of an optical pickup in an embodiment of the present invention.

In the following the light-receiving element 2 will explained in detail with reference to FIGS. 7 and 8.

The light-receiving element 2 is provided with a photosensor element 43 receiving a reflected light from an optical disk or a light emitted from the light source 1 and incoming without passing the optical disk, a board 44 for mounting the photosensor element 43, and capacitors 45, 46 mounted on the board 44 for stabilizing a power supply voltage.

The photosensor element 43 incorporates a photosensor substrate 43c having a photodetector in a case 43a formed with a molding resin, and, on the photosensor substrate 43c, plural detectors are provided in a predetermined pattern according to the specifications. From the case 43a, plural leads 43b are exposed, which are electrically connected with the photosensor substrate 43c. The leads 43b serve to transmit an electrical power required for driving the photosensor element 43 to the internal photosensor substrate 43c and to guide electrical signals, converted from the light received by the photosensor substrate 43c, to the exterior. The case 43a is so constructed to be transparent or semi-transparent in at least a window portion 43d opposed to the photosensor substrate 43c. More preferably, at least a portion having the sensor in the photosensor substrate 43c is opposed to the window portion 43d. Also the case 43a may be entirely formed by molding a transparent resin such as a clear resin, thereby constructing the transparent window portion 43d without requiring a separate member. Also in order to avoid entry of unnecessary light such as a stray light from a portion other than the window portion 43d, there may be adopted a configuration of constituting portions other than the window portion 43d with an opaque resin or ceramic material and to provide a transparent glass or a transparent resinous film in the part of the window portion 43d. In the present embodiment, the case 43a is formed by a transparent clear resin, in which the window portion 43d is recessed and made thinner so as to become transparent while other portion is made opaque by embossing or by forming a coarser surface roughness. Also dust prevention is achieved by another means, the window portion 43d may be made void to expose the sensor portion of the photosensor substrate 43c.

In the present embodiment, the board 44 was constructed with a flexible substrate such as a flexible printed board or a multi-layered flexible printed board. In case the board 44 need not be variable in shape, it may be constructed with an elastic or rigid board such as a ceramic board, a multi-layered ceramic board, a glass-epoxy board, or a multi-layered glass-epoxy board.

The board 44 is formed in a substantially L-shaped or T-shaped form, is provided with a connecting portion 44a, having an external connection terminal 44b for external connection, and a mounting portion 44c for mounting components such as the photosensor element 43 and the capacitors 45, 46, and the mounting portion 44c and the connecting portion 44a are integrally formed substantially vertically or with a certain inclination. Such integral configuration of the mounting portion 44c and the connecting portion 44a facilitates the manufacture of the board 44 and improves the productivity, as there is only required a preparation of the board 44 of a desired shape. In the present embodiment the board 44 is formed in a substantially L-shaped or T-shaped form, but various forms are naturally adoptable depending for example on the specifications.

In the present embodiment, the mounting portion 44c and the connecting portion 44a are constructed integrally, but it is also possible to form the mounting portion 44c and the connecting portion 44a separate, to mount components on the mounting portion 44c and then to mount the connecting portion 44a to the mounting portion 44c, or to employ a disc-, rectangular- or stripe-shaped substrate as the board 44 and to mount the connecting terminal 44b and the light-receiving element 43 on such board 44.

In the present embodiment, an area of the external connecting terminal 44b, namely a front end of the connecting portion 44a is made wider than other portion for facilitating the connection.

The capacitors 45, 46 are advantageously constituted for example of ceramic capacitors, and are provided for preventing an oscillation generated by an operational amplifier provided in the photosensor element 43. In the present embodiment, the capacitors 45, 46 are constituted of ceramic capacitors, but there may be employed laminar ceramic capacitors, tantalum capacitors or electrolytic capacitors according to the specifications.

Figure 9:
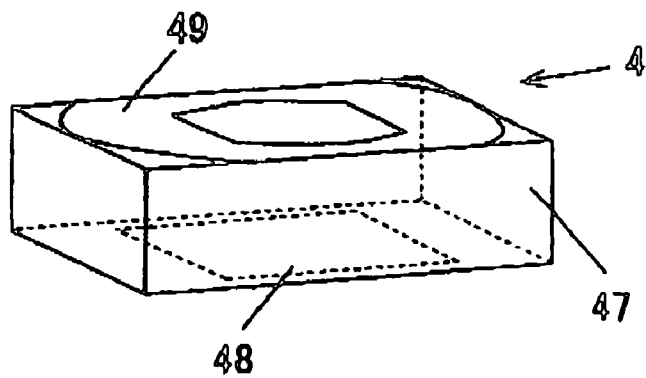
FIG. 9 is a perspective view showing an optical member of an optical pickup in an embodiment of the present invention.
Figure 10:
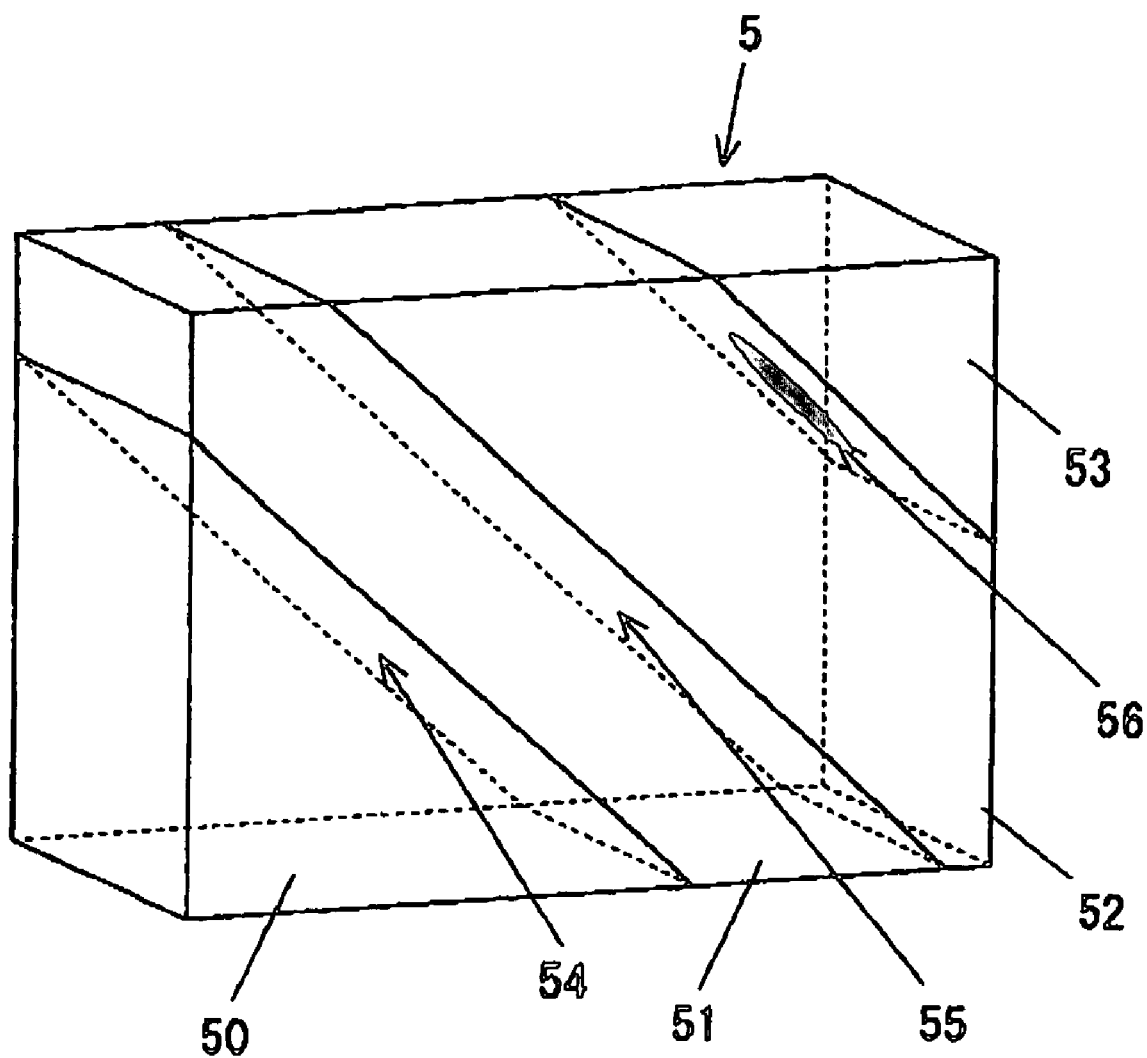
FIG. 10 is a perspective view showing an optical member of an optical pickup in an embodiment of the present invention.
Figure 11:
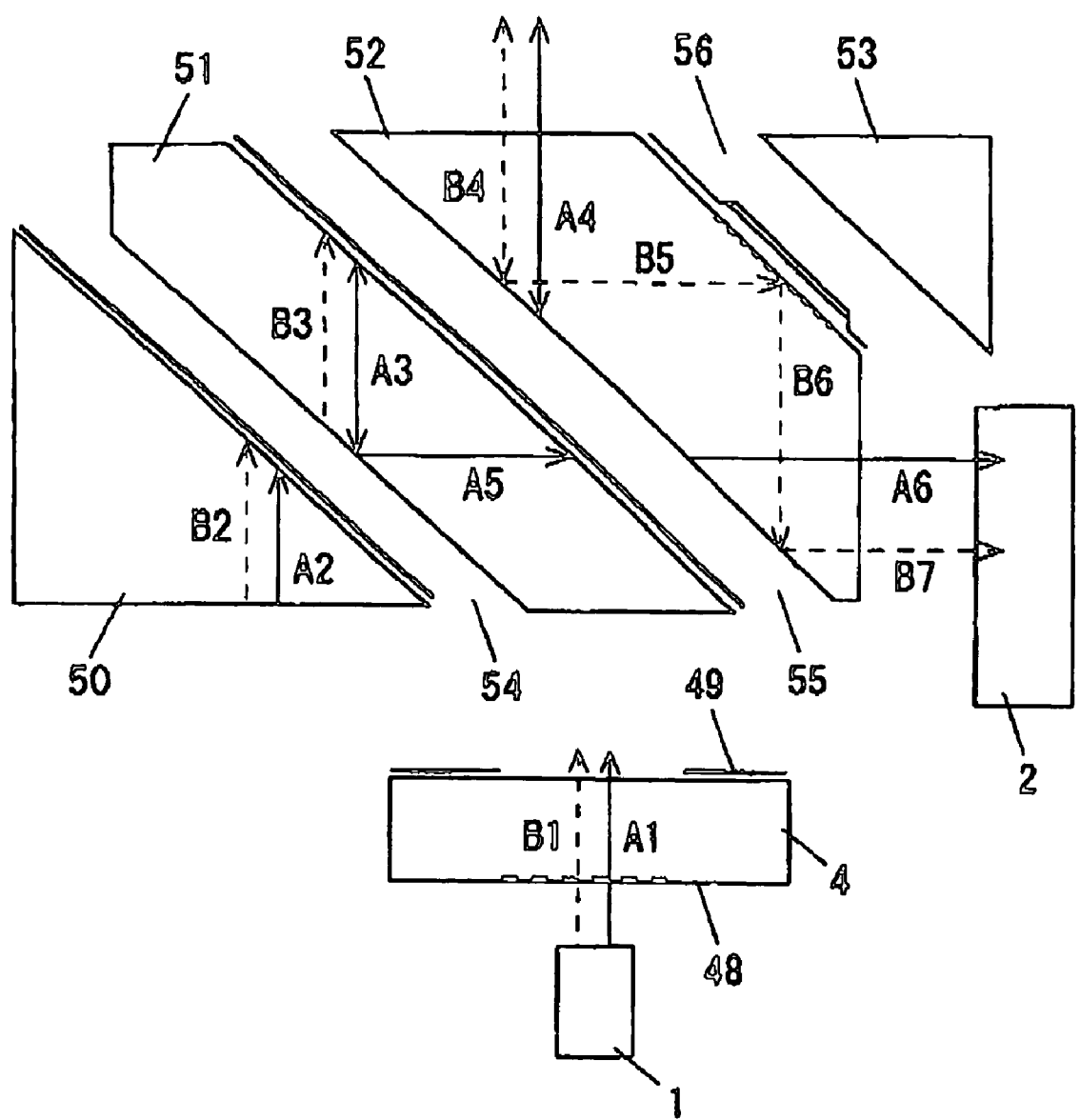
FIG. 11 is a view showing an optical member of an optical pickup in an embodiment of the present invention.

In the following, the optical members 4, 5 will be explained in detail with reference to FIGS. 9 to 11.

The optical member 4 is provided with a substrate 47 constituted of a transparent optical glass of a substantially rectangular parallelopiped form, a diffraction grating 48 provided on a surface of the substrate 47 opposed to the light source 1 for separating the light emitted therefrom into 3 beams, and an aperture limiting film 49 on a surface of the substrate 47 opposite to the surface opposed to the light source 1 (namely a surface opposed to the optical member 5).

The aperture limiting film 49 is constituted by alternately laminating a $SiO_2$ film and at least either of an Si film and a Ti film, and is provided in a substantially annular form. Thus, a light transmitted by an area surrounded by the aperture limiting film 49 becomes an emergent light of a desired cross section. Thus the cross section of the light emitted from the light source 1 can be regulated by regulating the central aperture of the aperture limiting film 49. In the present embodiment, the aperture limiting film 49 is provided for limiting the aperture, but a limiting aperture may be provided by adhering a sheet-shaped aperture limiting member or another opaque block. Also as the aperture limiting portion, the size of the cross section of the penetrating hole 3a may be regulated. More specifically, by a regulation of the cross section of the penetrating hole 3a at the side of the light source 1, the penetrating hole 3a itself functions as an aperture limiting portion so that the aperture limiting film 49 may be dispensed with on the optical member 4.

In the present embodiment, the aperture formed by the aperture limiting film 49 has a substantially square form, but according to the optical design of the optical pickup, there may be employed a circular, polygonal or oval shape. Also the substrate 47 may be of a cubic or semi-spherical form instead of the substantially rectangular parallelopiped form. Also the diffraction grating 48 is provided on the surface of the substrate 47, but, for the purpose of protecting the diffraction grating 48, a transparent substrate of a material same as that of the substrate 47, a transparent film or a transparent protective film may be provided on the surface having the diffraction grating 48.

Figure 22:
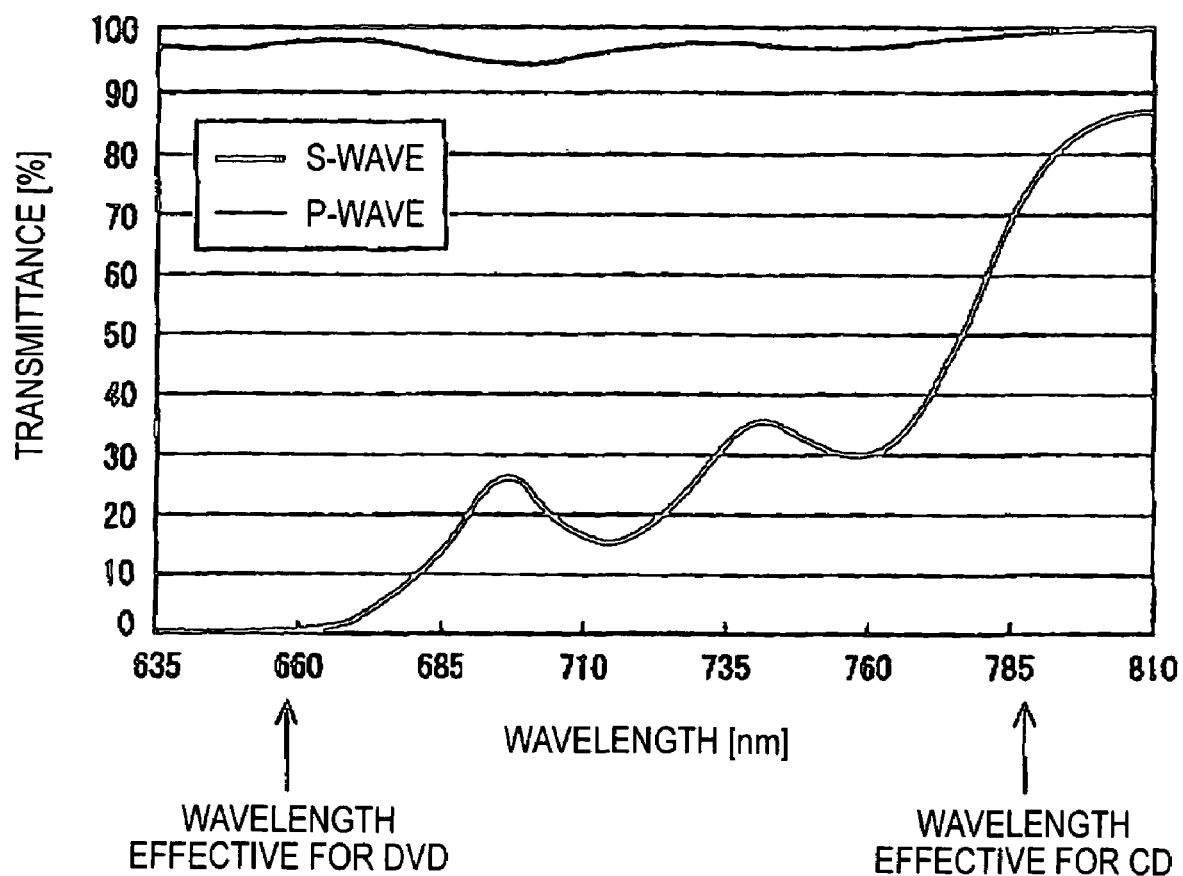
FIG. 22 is a graph showing a relationship of transmittance to wavelength.
Figure 23:
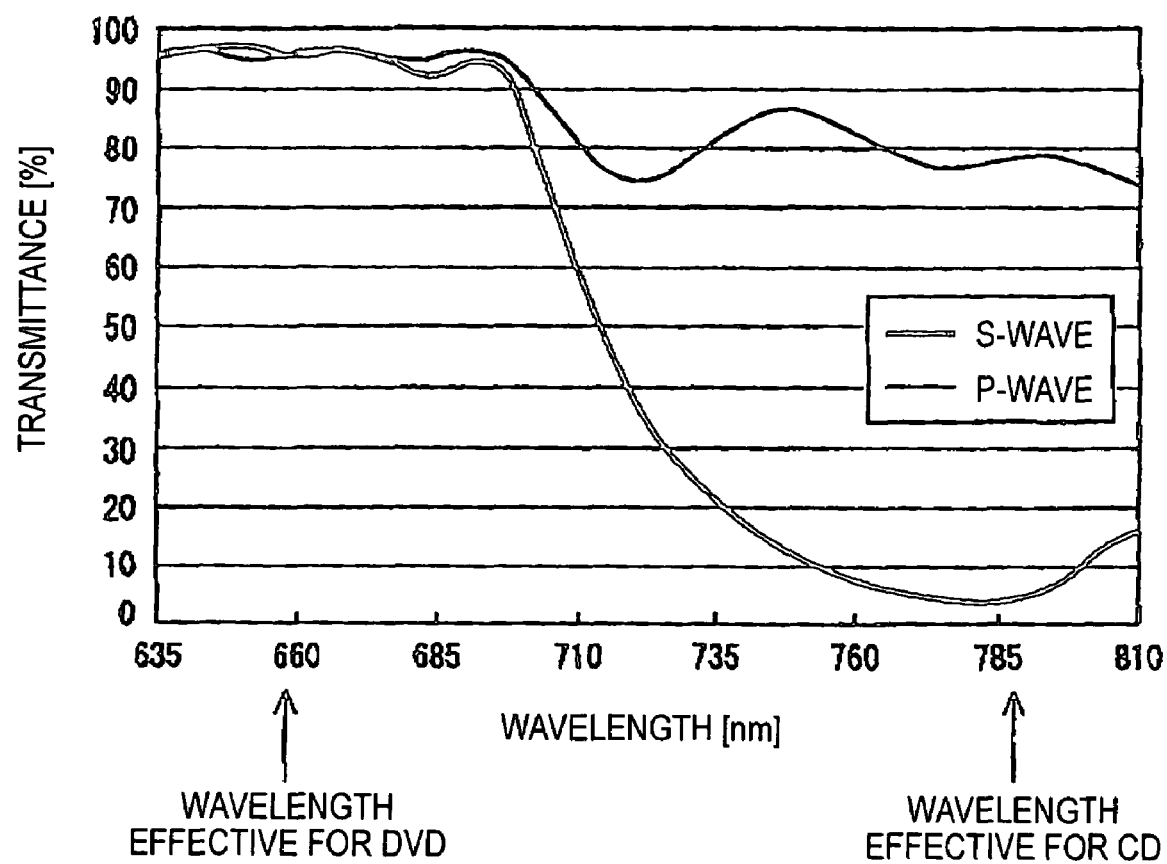
FIG. 23 is a graph showing a relationship of transmittance to wavelength.

The optical member 5 is formed by adjoining blocks 50, 51, 52, 53 of a transparent optical glass or an optical resin with a glass or a UV settable resin and is constituted entirely as a substantially rectangular parallelopiped. The optical member 5 incorporates mutually substantially parallel inclined faces 54, 55, 56. The inclined face 54 is formed between the blocks 50, 51 and corresponds to an adjoining face thereof. The inclined face 54 is provided with a polarizing separation film, which is provided on at least either of the blocks 50, 51, and, as shown in FIG. 22, for a light of a short wavelength (for example for DVD), substantially transmits a P-wave and reflects an S-wave, while, for a light of a long wavelength (for example for CD), substantially transmits the P-wave and the S-wave. The inclined face 55 is formed between the blocks 51, 52 and corresponds to an adjoining face thereof. The inclined face 55 is provided with a polarizing separation film, which is provided on at least either of the blocks 51, 52 and, as shown in FIG. 23, for a light of a short wavelength (for example for DVD), substantially transmits the P-wave and the S-wave, while, for a light of a long wavelength (for example for CD), transmits the P-wave and reflects the S-wave. The inclined face 56 is formed between the blocks 52, 53 and corresponds to an adjoining face thereof. The inclined face 56 is provided with a hologram to be employed for a servo operation, which is provided on at least either of the blocks 52, 53.

In the present embodiment, the optical member 4 is formed by four blocks, but it may be constituted of five or more blocks, and may thus include four or more inclined faces therein.

In the following there will be explained a specific structure of the polarizing separation films respectively provided on the inclined faces 54 and 55.

At first there will be explained the polarizing separation film provided on the inclined face 54.

On the polarizing separation film provided on the inclined face 54, as a result of investigation of a combination of a film H of a high refractive index (nH) and a film of a film L of a low refractive index (nL) in case of employing a transparent glass for optical components such as BK-7 for the blocks 50, 51, 52 and 53, it is found that a polarizing separation film having a wavelength selectivity in a wide incident angle range such as transmitting the P-wave by 90% or more within an incident angle range at least of 38 to 52° for the laser light from the CD side, and transmitting the P-wave of the laser light of the DVD side by 90% within an incident angle at least of 35 to 55° and reflecting the S-wave within an incident angle range of 35 to 55°, can be realized by laminating a $TiO_2$ film of a high refractive index (nH=2.43) and a $SiO_2$ film of a low refractive index (nL=1.45). For example a basic structure is given by BK-7 (block 50)/a1H·b1L·a2H·b2L . . . amH·bmH·bmL/BK-7 (block 51) (wherein a1, a2, . . . , am and b1, b2, . . . , bm are coefficients of λ/4 [optical film thickness]). In such structure, for laminating a light-guide member (block 51) on the aforementioned optical film constituting a polarizing separation film, there is employed an adhesive having a refractive index close to that of the light-guide member (block 51) thereby not deteriorating the optical characteristics. In such film structure, an optical thin film formed by alternately laminating the films H and the film L with 38 layers in total, and with a film thickness of 4.0 μm has spectral characteristics as shown in FIG. 22.

In the aforementioned polarizing separation film realizes a P-wave transmittance at 785 nm of 90% or higher, a P-wave transmittance at 660 nm of 90% or higher, and an S-wave transmittance of 10% or less.

A high refractive film H satisfying such incident angle characteristics can be, in addition to a $TiO_2$ film, a $Ta_2O$ film, a compound thereof with a medium refractive index material, $Nb_2O_5$ or ZnS, and a low refractive film L can be, in addition to $SiO_2$, $MgF_2$.

Also on the polarizing separation film provided on the inclined face 55, as a result of investigation of a combination of a film H of a high refractive index (nH), a film of a film L of a low refractive index (nL) and a film M of a medium refractive index (nM) in case of employing a transparent glass for optical components such as BK-7 for the blocks 50, 51, 52 and 53, it is found that a polarizing separation film having a wavelength selectivity in a wide incident angle range such as transmitting the P-wave of the first laser light by 50 to 90% within an incident angle range at least of 38 to 52°, and reflecting the S-wave by 70% or more within an incident angle range of 25 to 55°, and transmitting the S- and P-waves of the reflected light from the optical disk of the second laser light by 80% or more within an incident angle at least of 35 to 55° on the inclined face of the second light-guide member, can be realized by a laminated film configuration of three refractive indexes of a $TiO_2$ film of a high refractive index (nH=2.43), a $SiO_2$ film of a low refractive index (nL=1.45) and an $Al_2O_3$ film of a medium refractive index (nM=1.66). The $Al_2O_3$ film is particularly effective for obtaining a high reflectance at a low incident angle. For example a basic structure can be a film structure of 43 layers ($TiO_2$: 17 layers, $Al_2O_3$: 12 layers, and $SiO_2$: 14 layers) with a film thickness of 5.1 μm (however adjacent layers being preferably laminated with different materials), or a film structure of 46 layers ($TiO_2$: 16 layers, $Al_2O_3$: 14 layers, and $SiO_2$: 16 layers) with a film thickness of 5.4 μm (however adjacent layers being preferably laminated with different materials). In these cases, as in the polarizing separation film formed on the inclined face 54, an adhesive for laminating the block 52 on the optical thin film has a refractive index close to the light-guiding member (block 52) in order not to deteriorate the optical characteristics. The optical thin film of such configuration shows excellent reflecting and transmitting characteristics at wavelengths of 660 and 785 nm.

FIG. 23 shows measured results of a wavelength dependence of the S- and P-wave transmittances at an incident angle 45° in a film configuration of 43 layers with a film thickness of 5.1 μm. As will be apparent from FIG. 23, there is realized an S-wave transmittance at 785 nm of 20% or less. Also a P-wave transmittance at 660 nm of 60 to 90% is realized, including a direfringence. Also there is realized an S- and P-wave transmittances at 660 nm as high as 90% or more.

A high refractive film H satisfying such incident angle characteristics can be, in addition to a $TiO_2$ film, a $Ta_2O$ film, a compound thereof with a medium refractive index material, $Nb_2O_5$ or ZnS, and a low refractive film L can be, in addition to $SiO_2$, $MgF_2$.

In the present embodiment, the optical member 4 may be dispensed with. In case of executing at least either of recording/reproduction with a single beam, the diffraction grating 48 is unnecessary, and, in case an aperture limitation is not required, the aperture limiting film 49 is unnecessary. Also in case the aperture limiting film 49 alone is necessary, it may be integrally provided on a light incident surface of the optical member 5 at the side of the light source 1.

Optical paths in case of employing the optical members 4,5 of the aforementioned configuration will be explained with reference to FIG. 11. In FIG. 11, since the optical member 5 is illustrated in a separated state for the purpose of explanation, the optical paths are somewhat different from the actual state. Also in the present embodiment, the light source 1 is assumed to emit a light of a wavelength effective for DVD and a light of a wavelength effective for CD. When a light of a wavelength capable of at least either of the information recording/reproduction is emitted from the light source 1 to the DVD, it is passed by the diffraction grating 48 and the aperture limiting film 49 provided on the optical member 4 thereby separated into 3 beams of a predetermined aperture (A1). After passing the optical member 4 and upon entering the optical member 5, the light emitted from the light source 1, being a P-wave, is transmitted by the polarizing separation films on the inclined faces 54, 55 having polarizing separation films, and is emitted from an upper face of the block 52 (light being transmitted in the order of A2, A3 and A4). In practice, the optical paths A1-A4 are substantially linear. In a light reflected by the optical disk, an S-component is transmitted by the polarizing separation film provided on the inclined face 55. The light linearly enters the inclined face 54 in the order of optical paths A4 and A3, and is reflected by the polarizing separation film provided on the inclined face 54 having a reflecting property for the S-wave component of a shorter wavelength, then transmitted by the inclined face 55 at an optical path A5, and enters the light-receiving element 2 through an optical path A6.

Also when a light of a wavelength capable of at least either of the information recording/reproduction is emitted from the light source 1 to the CD, it is passed by the diffraction grating 48 and the aperture limiting film 49 provided on the optical member 4 thereby separated into 3 beams of a predetermined aperture (B1). After passing the optical member 4 and upon entering the optical member 5, the light emitted from the light source 1, being a P-wave, is transmitted by the polarizing separation films on the inclined faces 54, 55 having polarizing separation films, and is emitted from an upper face of the block 52 (light being transmitted in the order of B2, B3 and B4). In practice, the optical paths B1-B4 are substantially linear. In a light reflected by the optical disk, upon entering the inclined face 55 through an optical path B4, an S-component is reflected by the polarizing separation film provided on the inclined face 55, then enters the inclined face 56 by an optical path B5, thus entering the hologram for servo control and further reflected, then proceeds along an optical path B6, reflected by the inclined face 55 and enters the light-receiving element 2 by an optical path B7.

An assembling method for the optical pickup of the aforementioned configuration will be explained with reference to the accompanying drawings.

Figure 12:
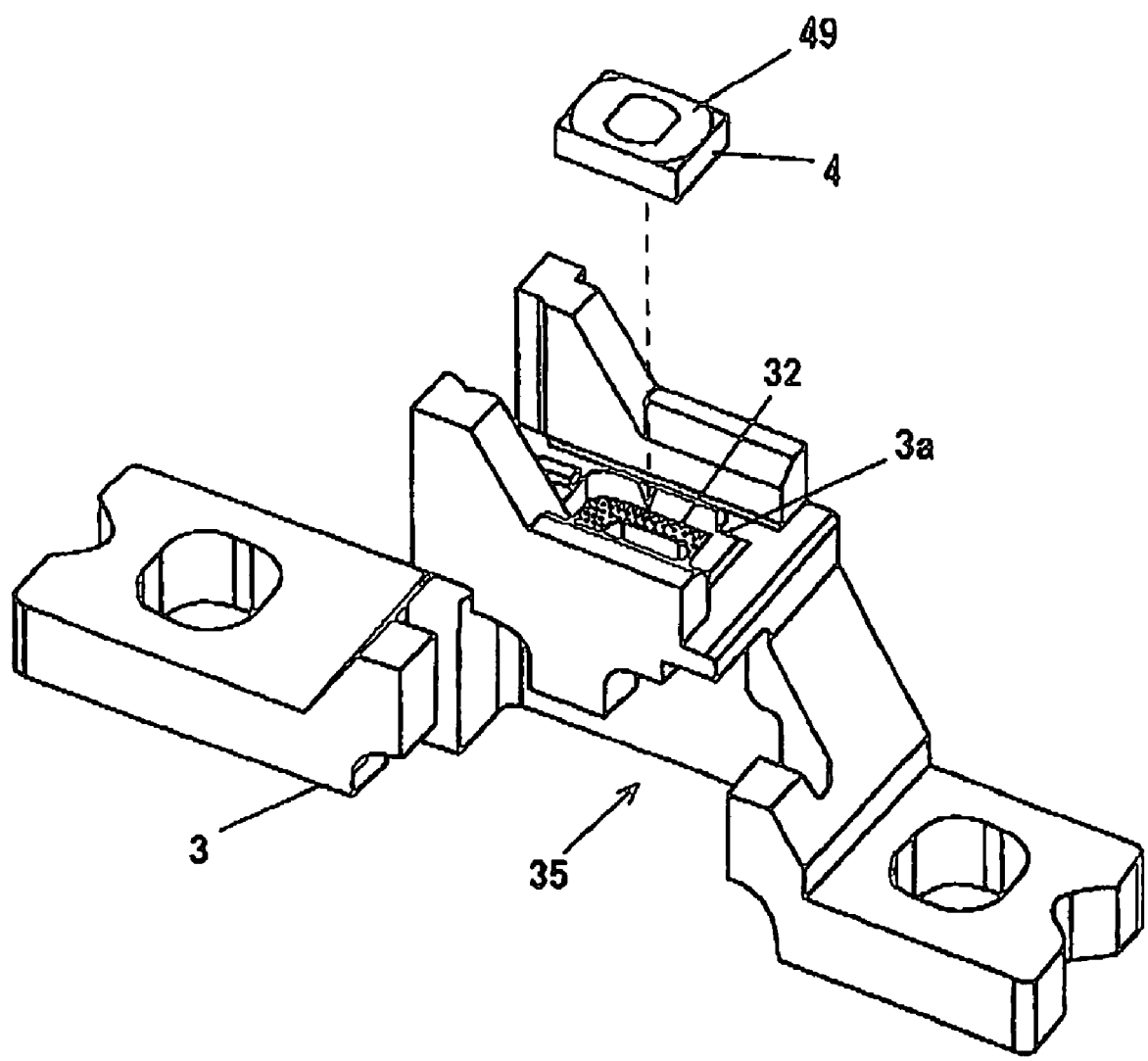
FIG. 12 is a view showing an assembling method for an optical pickup in an embodiment of the present invention.

As shown in FIG. 12, an adhesive material such as an instant adhesive is coated on at least either of the stepped portion in the penetrating hole 3a and a face of the optical member 4 having the diffraction grating (face opposite to the side of the aperture limiting film 49), and the optical member 4 is inserted into the large diameter portion 32 to adjoin the optical member 4 and the coupling base 3 so as to close the penetrating hole 3a.

Figure 13:
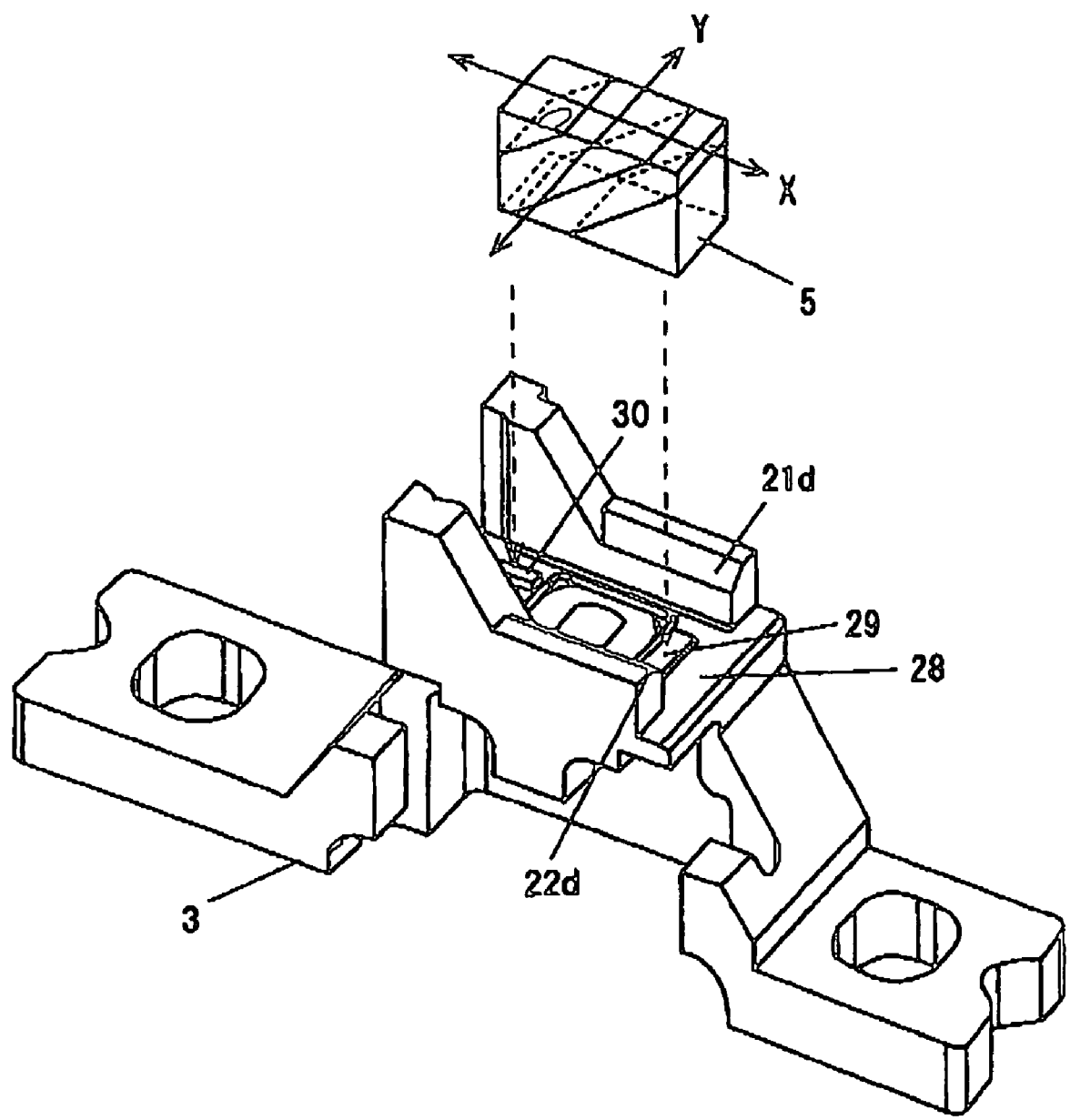
FIG. 13 is a view showing an assembling method for an optical pickup in an embodiment of the present invention.
Figure 14:
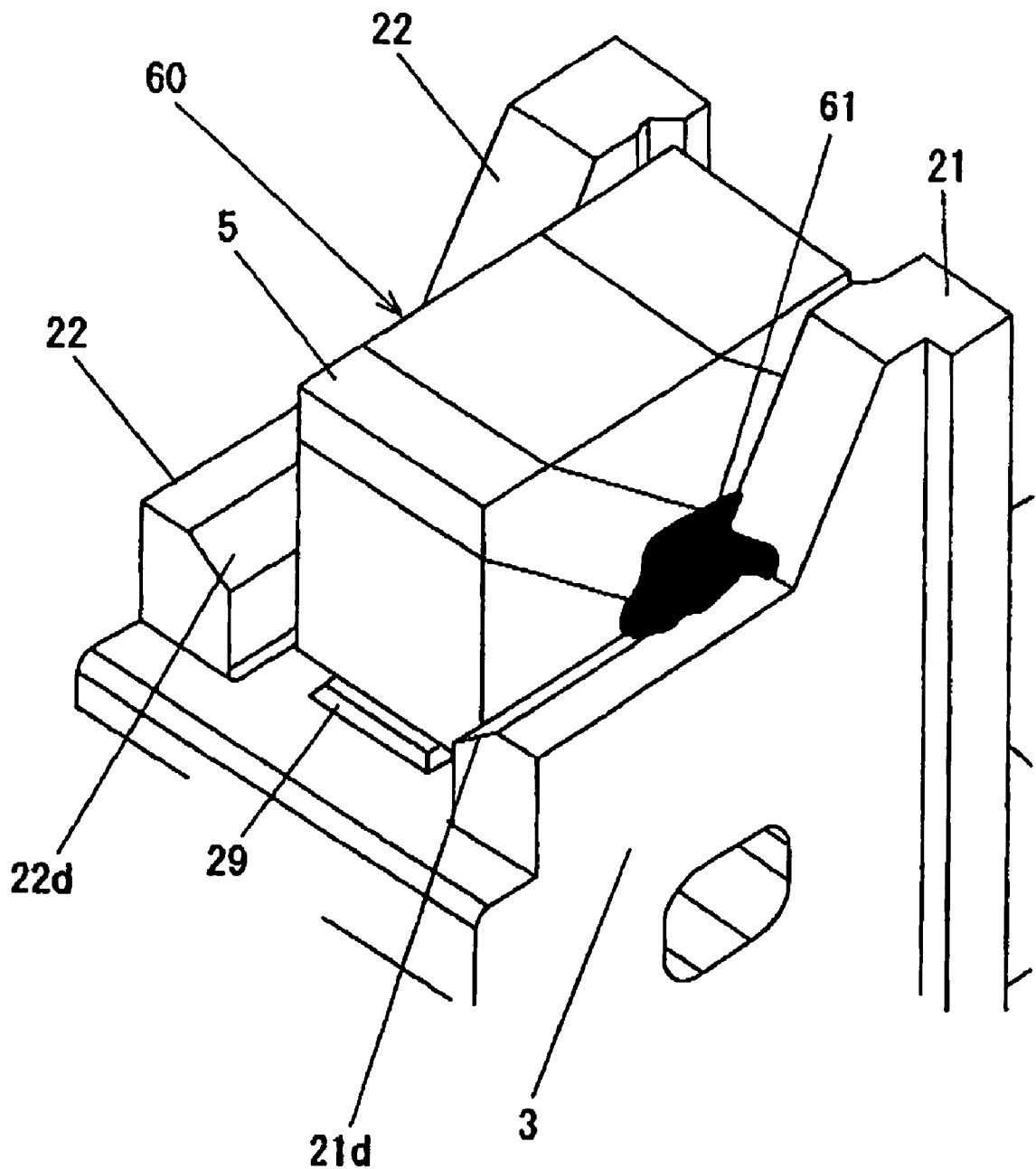
FIG. 14 is a view showing an assembling method for an optical pickup in an embodiment of the present invention.

Then, as shown in FIG. 13, the optical member 5 is placed on the placing portion 28. In this state, the optical member 5 is so placed on the protruding portions 29, 30, 31 as that lateral portions are pinched between the lateral walls 21, 22. Then optical member 5 is placed on a predetermined position by a displacement in an X-Y direction shown in FIG. 13, and, as shown in FIG. 14, adhesive materials 60, 61 are supplied between the lateral walls 21, 22 and the optical member 5 so as to fix the positioned optical member 5 and the coupling base 3 within a short time. The adhesives 60, 61 employed in this operation are advantageously one containing an ultraviolet settable resin or one having water-absorbing property and setting instantaneously. In this operation, lateral walls 21, 22 having wall portions 21a, 21b, 22a, 22b having differences in height allow an easy positional regulation of the optical member 5 in the X-Y direction, and tapered portions 21d, 22d allow to prevent a flow of the adhesives 60, 61 to other locations and to hold the adhesives 60, 61 between the optical member 65 and the lateral walls 21, 22, thereby achieving secure adjoining of the components and preventing a flow to other locations thereby minimizing the influences to other components.

Also the presence of the protruding portions 29, 30, 31 allows to form a gap of 0.05-0.17 mm between the optical members 4, 5 and to exclude the adhesives 60, 61 from such gap, whereby it is rendered possible to prevent an optical aberration generated by the presence of the adhesives 60, 61 in such gap and to improve optical characteristics.

Figure 15:
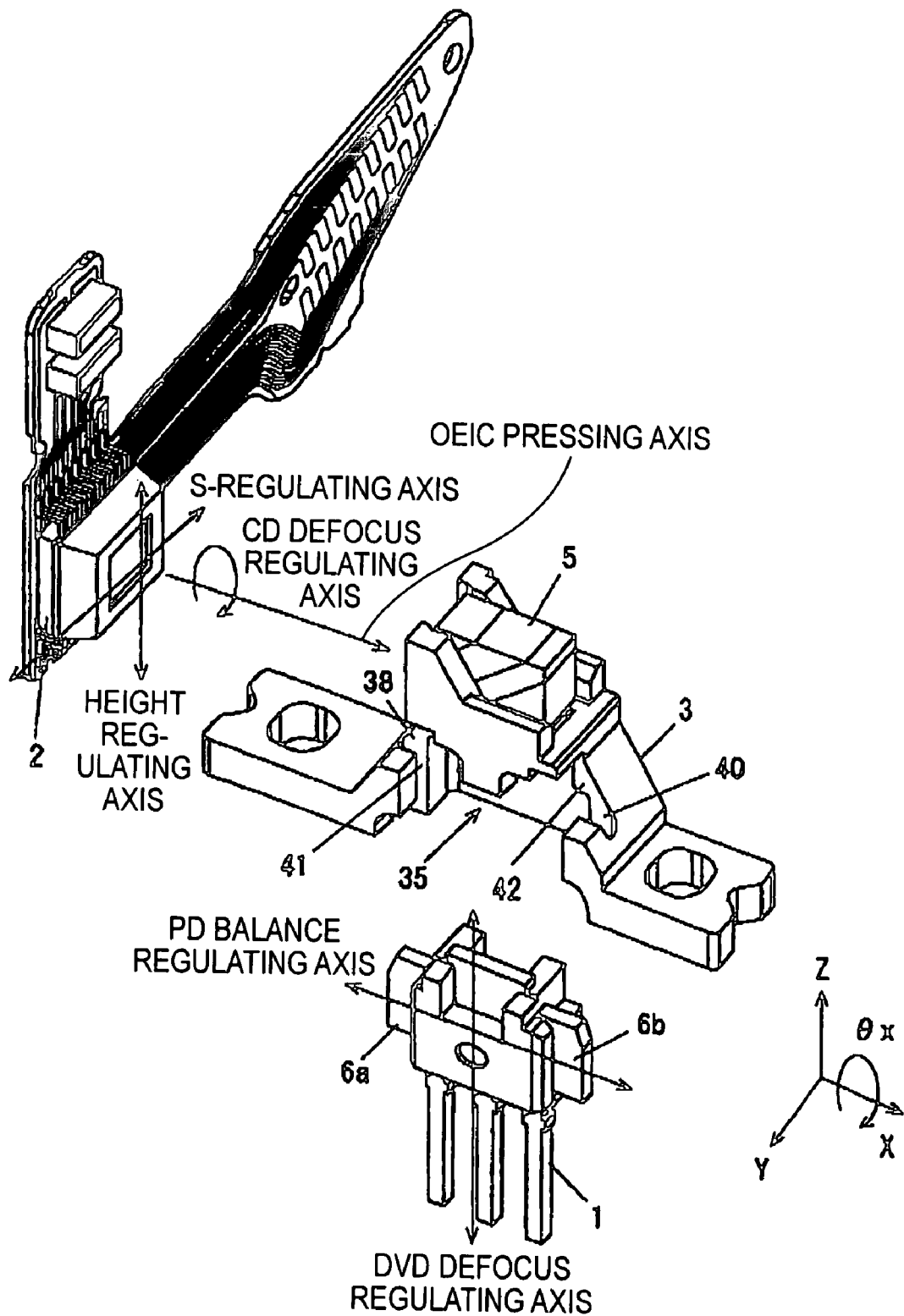
FIG. 15 is a view showing an assembling method for an optical pickup in an embodiment of the present invention.

Then, as shown in FIG. 15, the light source 1 is inserted into the space 35 from the bottom side of the coupling base 3, and the lateral portions 6b, 6a are positioned in the gaps 38, 40. Also the light-receiving element 2 is contacted with the mounting portions 23, 24 of the lateral walls 21, 22, and an ultraviolet settable adhesive is coated on at least either of the light-receiving element 2 and the mounting portions 23, 24. Then the light source 1 is caused to emit light and is displaced in an X-axis direction for a balance adjustment, and the light-receiving element 2 is displaced in Y- and Z-axis direction for a height adjustment and an S-adjustment. For example, in case the light source 1 emits two lights of different wavelengths with an extremely small gap, it is possible to securely and precisely position the light source 1 and the light-receiving element 2. Such positional adjustments can be executed for example with an automatic apparatus to improve the productivity.

Figure 16:
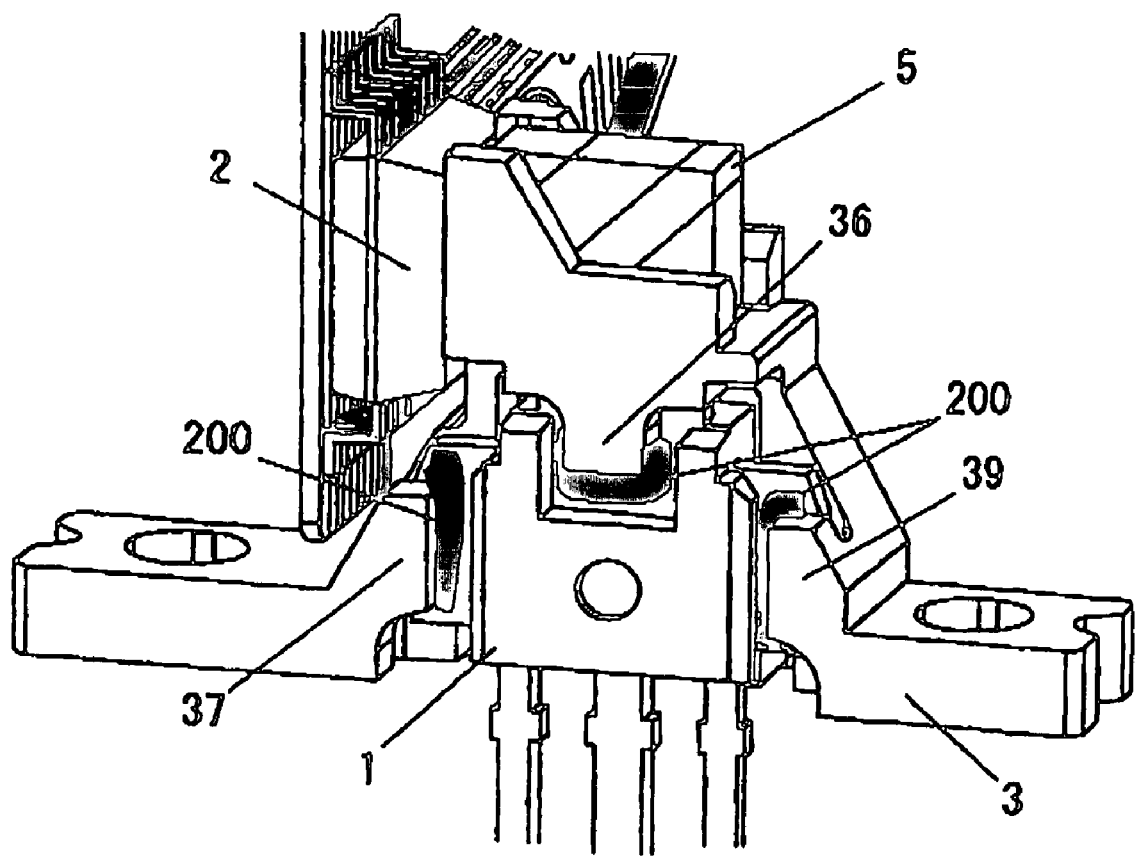
FIG. 16 is a view showing an assembling method for an optical pickup in an embodiment of the present invention.

When it is practically confirmed that the components are regulated at predetermined positions and, in the positional relationship of the light source 1 and the light-receiving element 2, the light from the light source 1 is securely guided to the optical disk and a light therefrom enters the light-receiving element 2, an ultraviolet settable resin or an Ag paste is coated between the light source 1 and the coupling base 3, and the light source 1 is displaced along a Z-axis direction shown in FIG. 16 for executing a defocus adjustment for the light to be used for the DVD. After the defocus adjustment, the light source 1 and the coupling base 3 are temporarily fixed by an ultraviolet irradiation or by a direct or indirect heat application. The ultraviolet settable resin or the Ag paste is coated on at least either of the lateral portions 6a, 6b and the adjoining portions 41, 42. Also the positional adjustment of the light source 1 is executed by a visual observation or by an image recognition by an automatic apparatus through the penetrating hole 100. When the light source 1 and the coupling base 3 are temporarily fixed, an adjoining material 200 of a relatively high viscosity or a bulk state (including powder or granular state) such as Ag paste, cream solder or solder foil is supplied to an interface of the protruding portions 37, 38, 39 and the plate 6, and such adjoining material is fused by applying a heat gun or a laser beam thereby securing adjoining the light source 1 and the coupling base 3. The metallic adjoining material 200 of solder or Ag paste of relatively high thermal conduction can dissipate the heat generated in the light source 1 effectively to the coupling base 3 by the high thermal conductivity, and is effective as thermal measure for the light source 1. In case the light source 1 does not require such thermal measure, the ultraviolet settable adhesive for temporary fixation may also be used for the main fixation, or the adjoining material 200 used for main fixation after the temporary fixation can be an organic adhesive such as an epoxy resin adhesive, an instant adhesive or an ultraviolet settable adhesive.

In the present embodiment, there is utilized an adjoining by melting a coated layer or an adjoining with cream solder, to be explained in the following.

Then, as shown in FIG. 15, the light source 1 is inserted into the space 35 from the bottom side of the coupling base 3, and the lateral portions 6b, 6a are positioned in the gaps 38, 40. Also the light-receiving element 2 is contacted with the mounting portions 23, 24 of the lateral walls 21, 22, and an ultraviolet settable adhesive is coated on at least either of the light-receiving element 2 and the mounting portions 23, 24. Then the light source 1 is caused to emit light and is displaced in an X-axis direction for a balance adjustment, and the light-receiving element 2 is displaced in Y- and Z-axis direction for a height adjustment and an S-adjustment. Thus, by a configuration enabling a relative displacement of the light source 1 and the light-receiving element 2, even in case the light source 1 emits two lights of different wavelengths with an extremely small gap, allows to securely and precisely position the light source 1 and the light-receiving element 2. Such positional adjustments can be executed for example with an automatic apparatus to improve the productivity.

Figure 17:
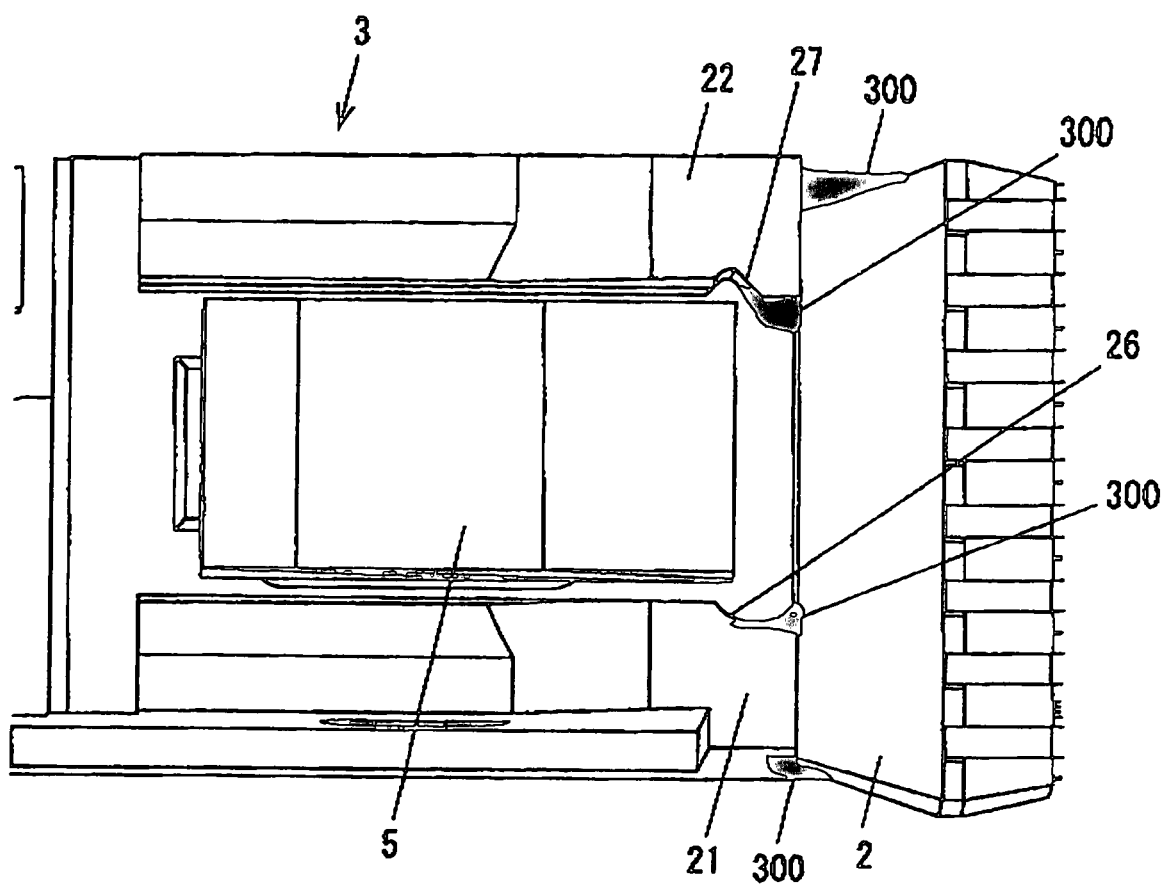
FIG. 17 is a view showing an assembling method for an optical pickup in an embodiment of the present invention.

Also in case an ultraviolet settable adhesive is provided between the light-receiving element 2 and the coupling base 2 as shown in FIG. 17, such adjoining material 300 may flow into between the optical members 4, 5, or at the setting of the adjoining material 300 in contact with the optical members 4, 5 (particularly the optical member 5) may cause a displacement of the optical members 4, 5 (particularly the optical member 5). For avoiding such drawback, the groove 27 and the recessed portion 26 are provided for preventing a flow of the adjoining material 300 toward the optical members 4, 5.

As explained in the foregoing, in the present embodiment, even in case of employing the light source 1 emitting two lights of different wavelengths with an extremely small gap, allows to achieve a positional relationship with the light-receiving element 2 by the coupling base, in precise and efficient manner, thereby attaining a high productivity and a high production yield.

Also the adjoining material 300 is made absent between the optical members 4, 5 and between the light source 1 and the optical member 4 thereby suppressing an optical aberration in the light and improving the optical characteristics.

Figure 18:
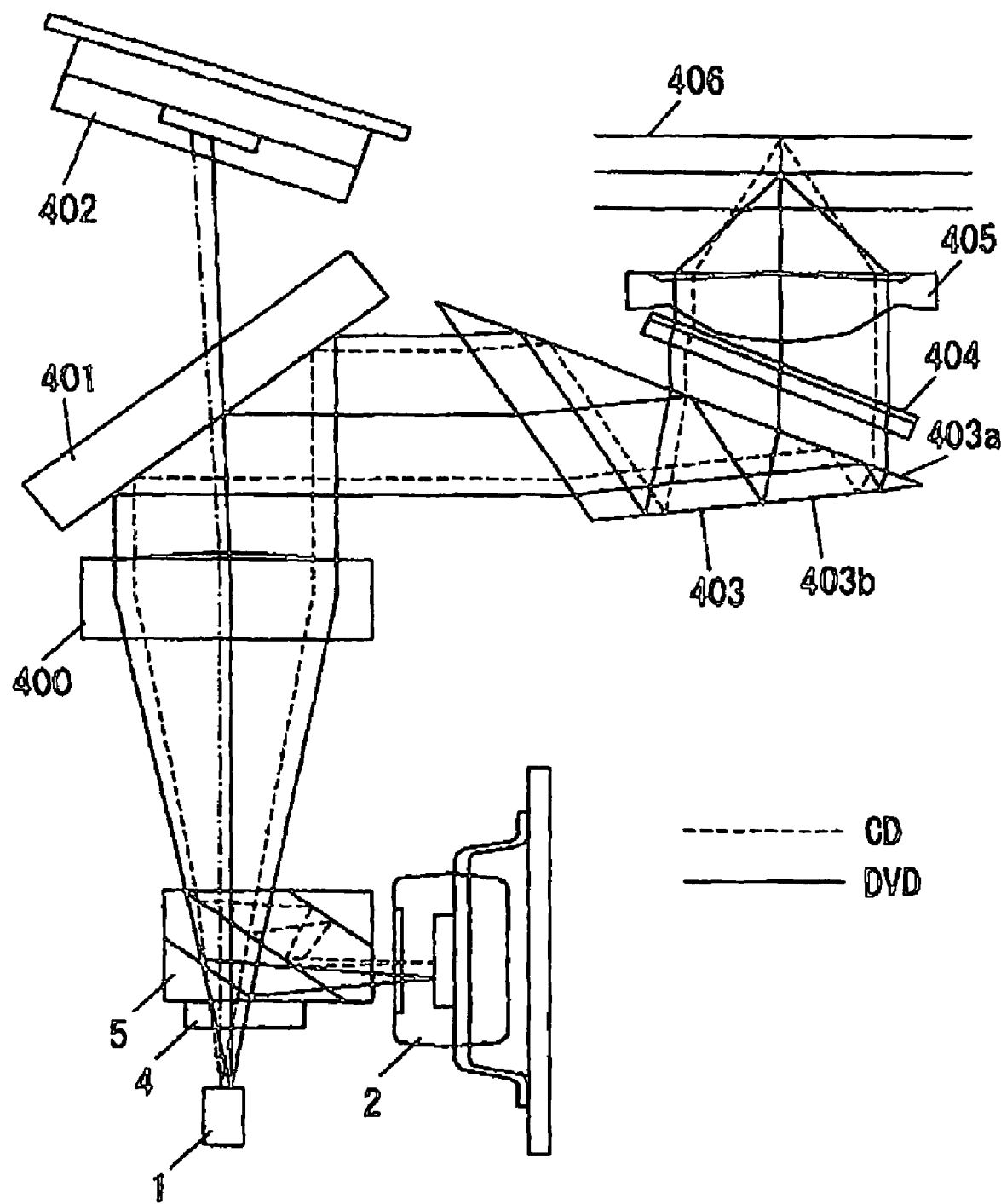
FIG. 18 is a view showing an example of an optical design for an optical pickup in an embodiment of the present invention.

Also a configuration of an optical system utilizing such optical pickup will be explained with reference to FIG. 18.

A light emitted from the light source 1 is passed by the optical members 4, 5, then enters a collimating lens 400, reflected by a BS plate 401 (beam splitter plate) and is guided to an upward-directing prism 403. In this state, a part of the emitted is transmitted by the BS plate 401 and is guided to a photosensor 402 for monitoring a light amount of the light source 1, and a light emitting power of the light source 1 is regulated by an output of the photosensor 402. The light from the BS plate 401 is reflected by a face 403a of the prism 403, further reflected by a face 403b, then transmitted by a face 403a to enter a hologram 404 sandwiching a liquid crystal, and is condensed on an optical disk 406. A light reflected by the optical disk 406 is transmitted through an objective lens 405 and the hologram, guided to the upward-directing prism 403, transmitted by the face 403a thereof, reflected by the faces 403b and 403a, further guided to and reflected by the BS plate 401, transmitted by the collimating lens 400 and guided to the optical member 5 thereby reaching the light-receiving element 2.

Figure 19:
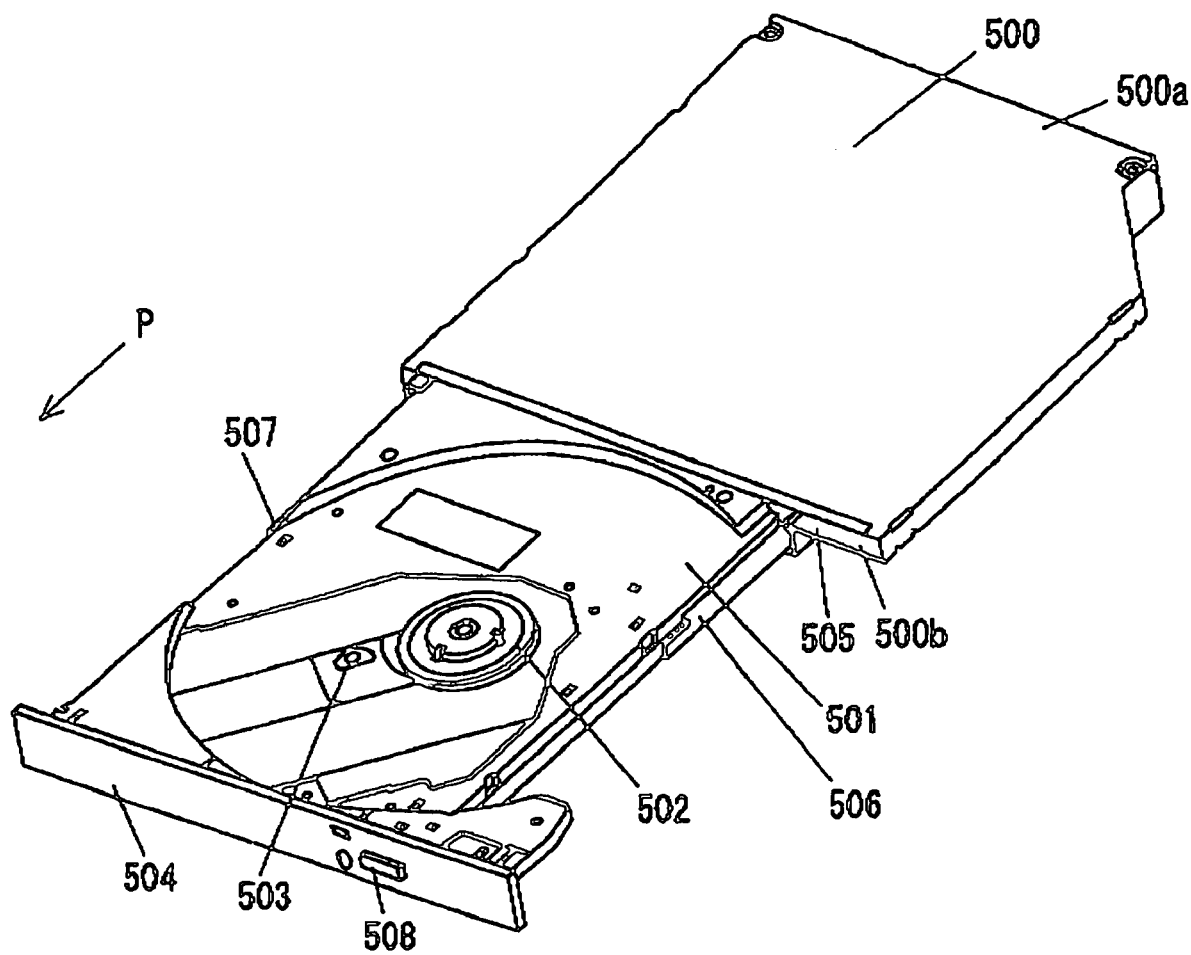
FIG. 19 is a view showing an optical disk apparatus employing an optical pickup in an embodiment of the present invention.

FIG. 19 is a view showing an optical disk apparatus utilizing an optical pickup embodying the present invention, wherein a casing 500 is constituted by combining an upper casing portion 500a and a lower casing portion 500b. The upper casing portion 500a and the lower casing portion 500b are mutually fixed for example with screws. There are shown a tray 501 which can be extracted from or retracted in the casing 500, a spindle motor 502 provided in the tray 501, and an optical pickup 503, and the optical pickup 503 employs the optical pickup shown in FIGS. 1 to 18 and executes at least either of writing or reading information into or from the optical disk. The optical pickup 503 is mounted on a carriage (not shown) supported movably in a radial direction of the optical disk. A bezel 504 provided at a front end face of the tray 501 is so formed as to cover a slot 505 for the tray 501 when the tray 501 is retracted into the casing 500. Rails 506, 507 are slidably provided respectively in the tray 501 and the casing 500 and provided on both sides of the tray 501, and the tray 501 is mounted by means of such rails 506, 507 in an extractable and retractable manner out of and into the casing 500 in a direction indicated by an arrow P.

The bezel 504 provided at a front end face of the tray 501 is provided with an ejection switch 508, of which depression disengages an engaging portion (not shown) provided in the casing 500 and an engaging portion (not shown) provided in the tray 501.

In the following, there will be explained a method of using the fixing portions 18, 19 provided in the coupling base 3, with reference to FIGS. 20 and 21.

Figure 20:
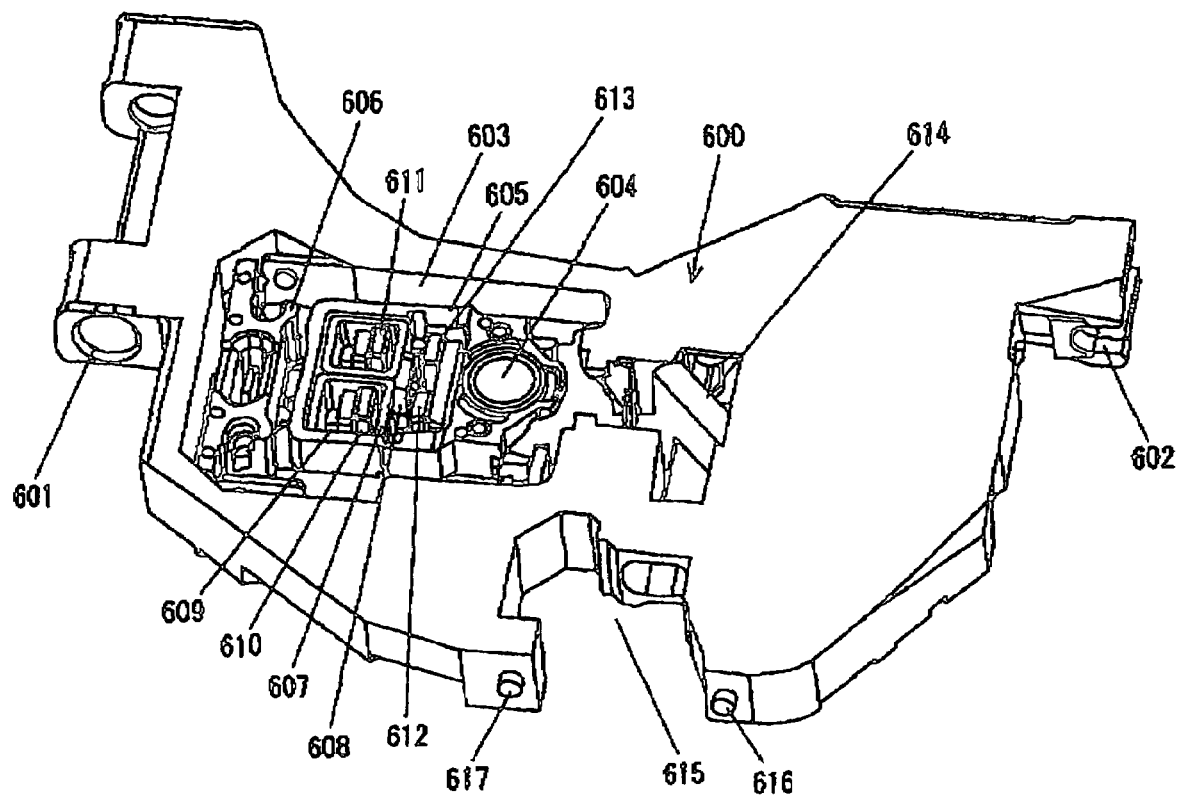
FIG. 20 is a view showing a mounting method for an optical pickup in an embodiment of the present invention.

As shown in FIG. 20, a carriage 600 is provided, at both ends thereof, with bearing portions 601, 602 for movably mounting a displacement shaft or a driving shaft (not shown). The carriage 600 has a penetrating hole 603 of a complex form, in which a lens supporting portion 605 supporting an objective lens 604 is movably supported.

The lens supporting portion 605 is movably supported by a supporting portion 606 for example via an unillustrated suspension wire, and the supporting portion 606 is fixed to the carriage 600 in the penetrating hole 603. The lens supporting portion 605 is provided with a penetrating hole 609 in which provided are a focusing coil 607 and a tracking coil 608. In the penetrating hole 609, there are inserted permanent magnets 610-613 which generate magnetic fields and which are not fixed to the lens supporting portion 605, and the lens supporting portion 605 is displaced by such permanent magnets 610-613, the focusing coil 607 and the tracking coil 608.

More specifically, the lens supporting portion 605, by flowing predetermined currents in the focusing coil 607 or the tracking coil 608, is displaced in the focusing direction or the tracking direction thereby displacing the objective lens 604 to a predetermined position. Also a reflecting mirror 614 is fixed in the penetrating hole 603. Also the carriage 600 is provided with a notched portion 614 for supporting the optical pickup, and the penetrating hole 603 and the notched portion 615 is connected at a communicating hole 619.

Protrusions 616, 617 are provided at an open side of the notched portion 615 and on an external periphery of the carriage 600.

Figure 21:
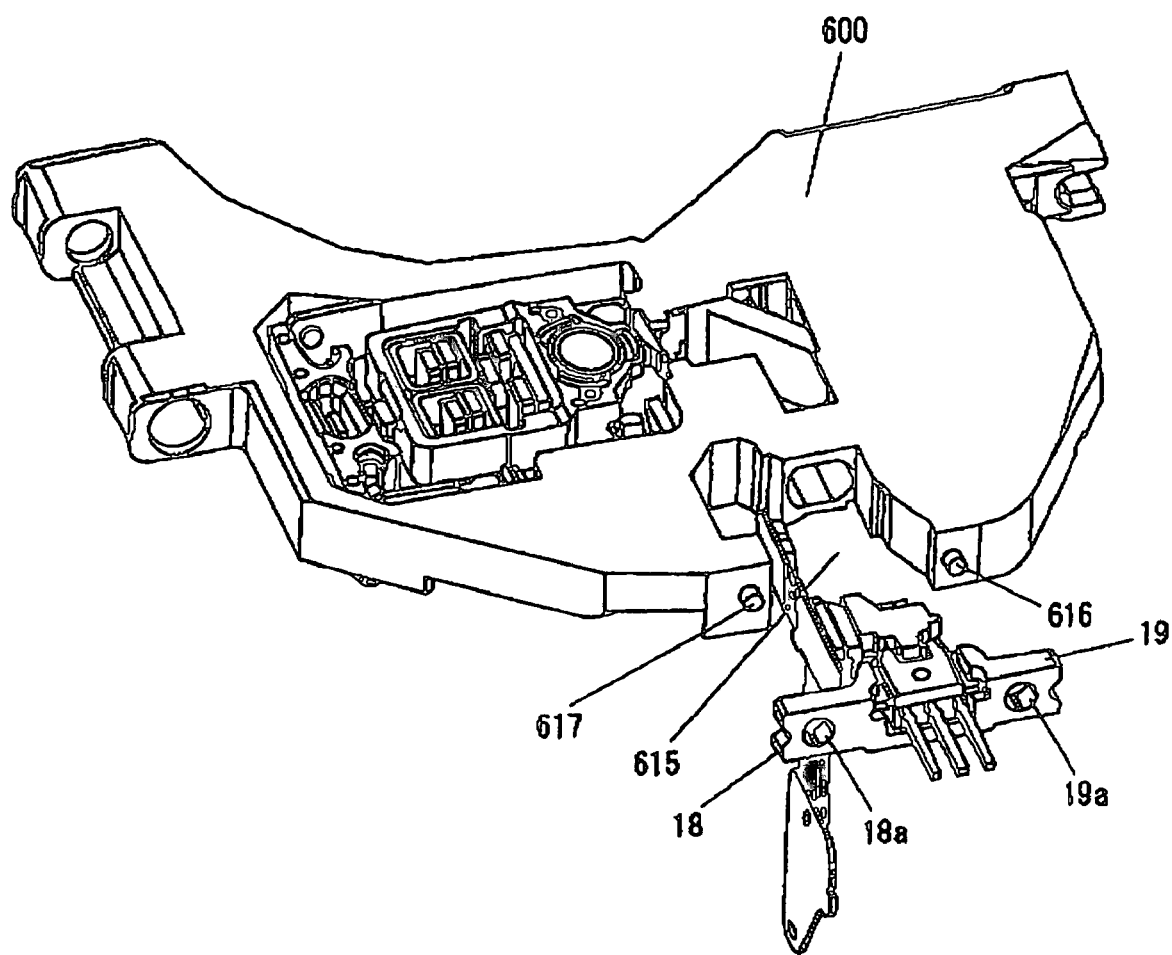
FIG. 21 is a view showing a mounting method for an optical pickup in an embodiment of the present invention.

As shown in FIG. 21, the optical pickup is inserted into the notched portion 615, and the protrusions 617, 618 are inserted into penetrating holes 18a, 19a. The protrusions 617, 618 have a diameter somewhat smaller than that of the penetrating holes 18a, 19a whereby the optical pickup is rendered movable in a certain extent even after the protrusions 617, 618 are inserted into the penetrating holes 18a, 19a. Therefore the optical pickup and the carriage 600 are rendered movable relatively within a certain range even after the mounting, whereby an optical axis adjustment can be executed precisely. After the optical axis adjustment or the like, the protrusions 617, 618 are caulked or fused to fix the carriage 600 and the optical pickup. Otherwise the mutual fixation is achieved for example by coating an adhesive material between the fixing portions 18, 19 and the carriage 600. In the present embodiment, the protrusions 616, 617 are formed in a cylindrical form, but they may also be formed as a tetragonal pillar or a pillar form with a cross section of a triangle or a pentagon or higher polygon. Otherwise, the protrusions 616, 617 may be pointed in a front end portion for facilitating insertion into the penetrating holes 18a, 19a. The cross sectional shape of the protrusions 616, 617 and that of the penetrating holes 18a, 19a are preferably similar, but they may be of different forms. Even in such case, it is preferable to observe a relation of the size of the penetrating holes 18a, 19a and the protrusions 616, 617 so as to enable a displacement of the optical pickup to a certain extent when the optical pickup is mounted in a non-fixed manner on the carriage 600.

In the present embodiment, the carriage 600 is provided with the protrusions 616, 617 and is mutually fixed with the optical pickup by inserting such protrusions into the penetrating holes 18a, 19a of the fixing portions 18, 19, but it is also possible to avoid the protrusions 616, 617, then to contact the fixing portions 18, 19 with an open external edge portion of the notched portion 615 of the carriage 600 and, after the optical axis adjustment, to execute mutual fixation by coating an adhesive or by a fusion, and, in such case, the penetrating holes 18a, 19a may be or may not be provided. Also at least either of the mutually contacting surfaces of the fixing portions 18, 19 and the carriage 600 may be roughened or provided with irregularities to increase an area of adhesion or fusion.

Such configuration of providing the coupling base 3, directly fixing the light source 1 and the optical members 4, 5 integrally with the fixing portions 18, 19 and adjoining such fixing portions 18, 19 directly to another member such as the carriage 600, enables a secure optical axis adjustment and a firm fixation of the optical pickup to the carriage 600.

Figure 24:
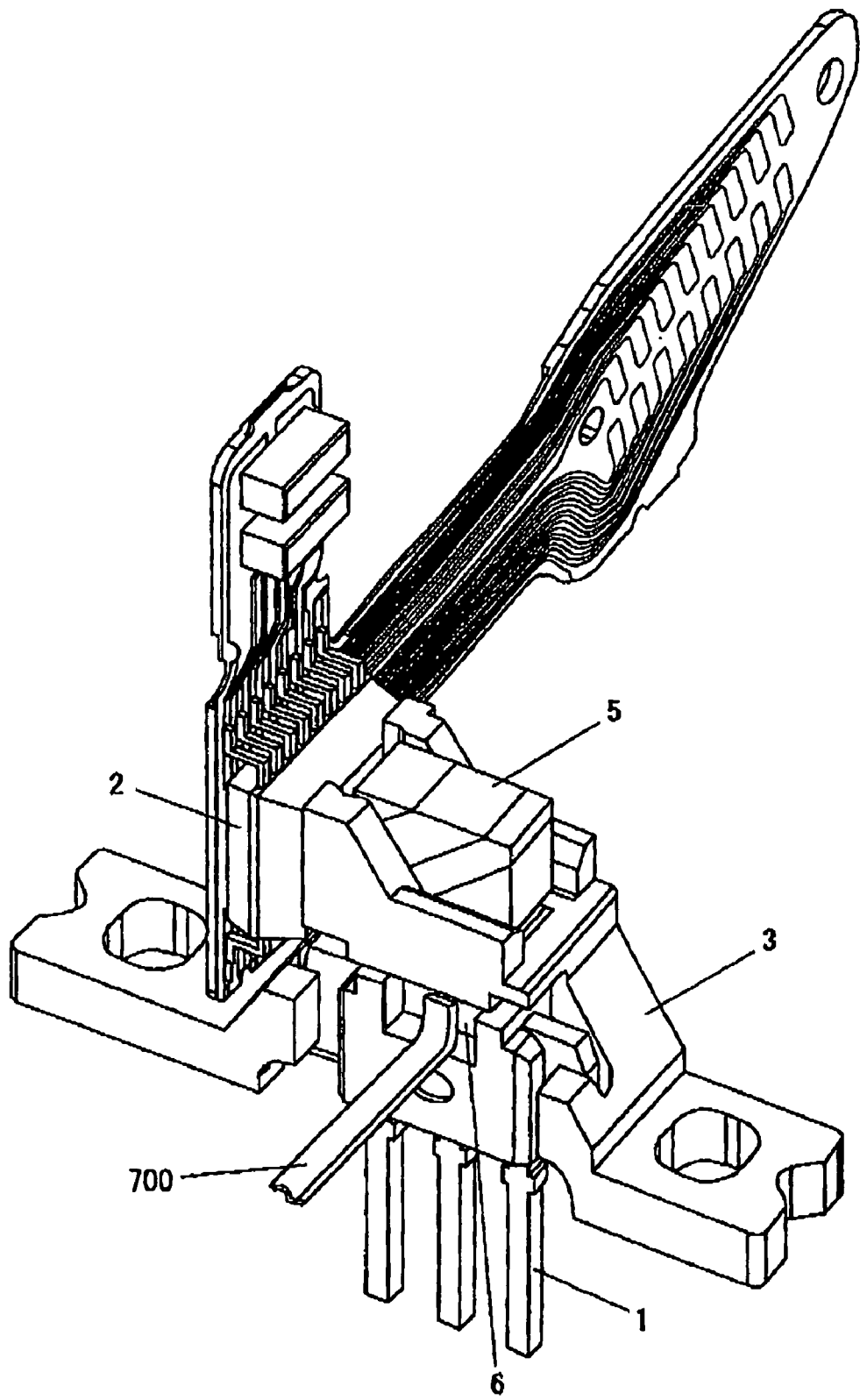
FIG. 24 is a perspective view showing an optical pickup in an embodiment of the present invention.

In the present embodiment, the coupling base 3 is provided with the protruding portion 36 which is adjoined to the side of the plate 6 opposite to the side supporting the semiconductor laser element 9 thereby effectively dissipating the heat from the semiconductor laser element 9 to the coupling base 3, but it is also conceivable, as shown in FIG. 24, without the protruding portion 36, to adjoin a heat-conducting member 700 of a relatively high thermal conductivity to a rear surface of the plate 6 opposite to the side supporting the semiconductor laser element 9 and to adjoin for example the other end of the heat-conducting member 700 to another member. Also in the present embodiment, the protruding portion 36 is omitted, but it is also possible to adjoin the heat-conducting member 700 to such retained protruding portion 36 without omitting the protruding portion 36 so as that the heat generated in the semiconductor laser element 9 is transmitted in the order of the plate 6, the protruding portion 36 and the heat-conductive member 700. Stated differently, the heat-conductive member 700 is not directly adjoined to the plate 6 but may be adjoined indirectly thereto In such case, the heat-conductive member 700 is advantageously constituted of a heat pipe, a carbon sheet containing carbon, a sheet-shaped, rod-shaped or plate-shaped member formed with a metal material of a relatively high thermal conductivity such as copper or a copper alloy. For example, in case the heat-conductive member 700 is constituted of a highly flexible member such as a metal sheet or a carbon sheet, a mounting property can be improved because of easy deformation. Also the heat-conductive member 700 may be connected, at the other side, to any part of the carriage 600, a cooling element such as a Peltier element, or a heat sink provided with plural fins. In case of connection to a heat sink, the cooling performance can be further improved for example by blowing air to the heat sink by a small fan. In the present embodiment, the heat-conductive member 700 is provided by one unit, but it may be provided in plural units.

Figure 25:
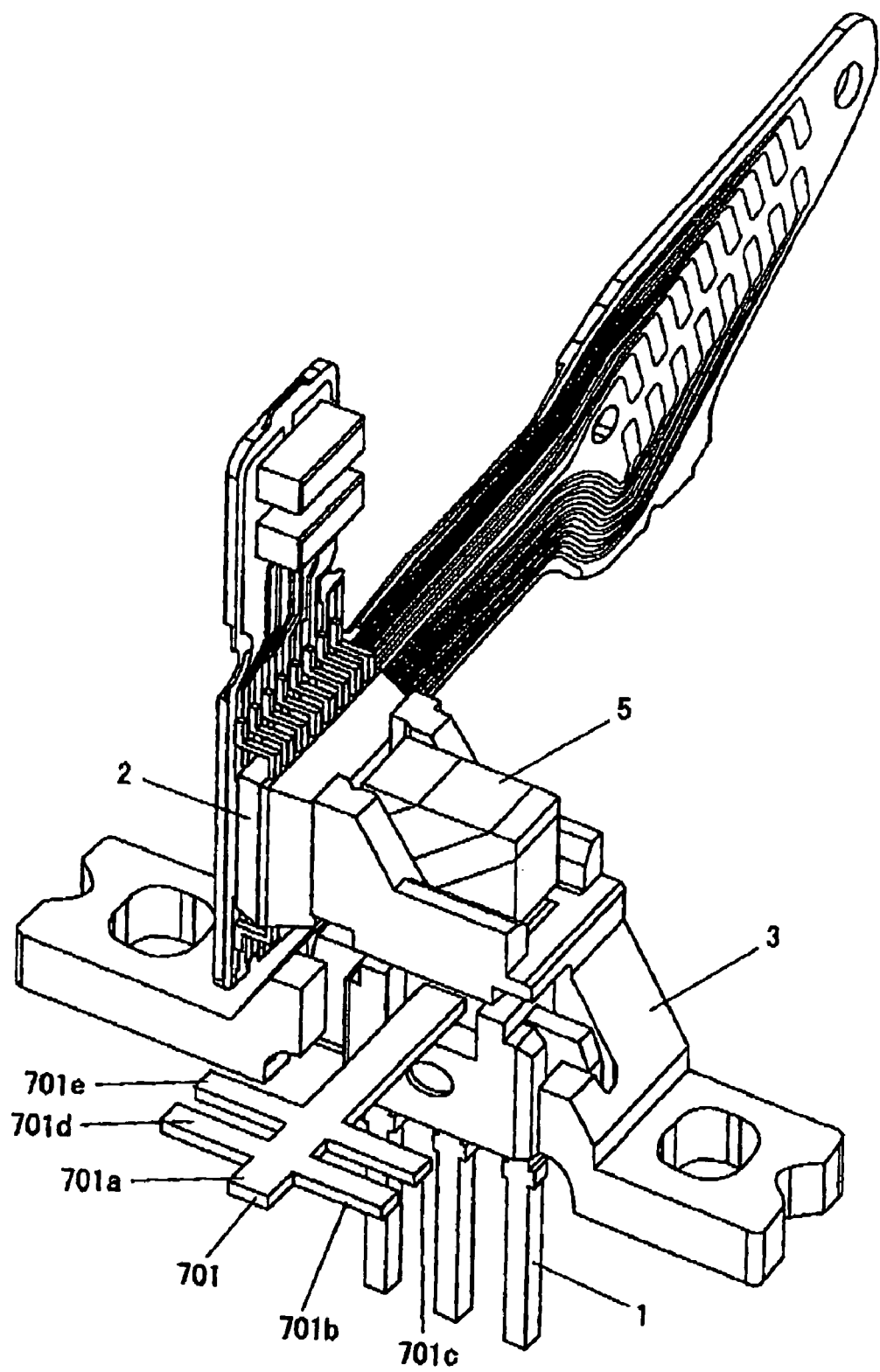
FIG. 25 is a perspective view showing an optical pickup in an embodiment of the present invention.

It is also possible, as shown in FIG. 25, to dispense with the protruding portion 36, to adjoin a heat-conducting member 701 of a relatively high thermal conductivity to a rear surface of the plate 6 opposite to the side supporting the semiconductor laser element 9 and to provide for example the other end of the heat-conducting member 701 with fins 701b-701e thereby improving the cooling effect When the heat is transmitted to the fins 701b-701e, a further cooling can be expected by a natural cooling or by an exposure to an air flow generated by the displacement of the carriage 600. In the present embodiment, the heat-conducting member 701 is provided in a core portion 701a thereof with the fins 701b-701e in a flat manner, but such fins may be formed sterically or a structure member similar to the fins may be provided. Also in the present embodiment, the protruding portion 36 is omitted, but it is also possible to adjoin the heat-conducting member 701 to such retained protruding portion 36 without omitting the protruding portion 36 so as that the heat generated in the semiconductor laser element 9 is transmitted in the order of the plate 6, the protruding portion 36 and the heat-conductive member 701.

In such case, the heat-conductive member 700 is constituted of a plate-shaped member, a block or a rod-shaped member of a metallic material of a relatively high thermal conductivity such as copper, a copper alloy, aluminum, an aluminum alloy, gold, or a gold alloy. In the present embodiment, the heat-conductive member 700 is provided by one unit, but it may be provided in plural units.

In the following the adjoining of the coupling base 3 and the light source 1 in the present embodiment will be explained in detail with reference to FIGS. 16 and 26.

Figure 26:
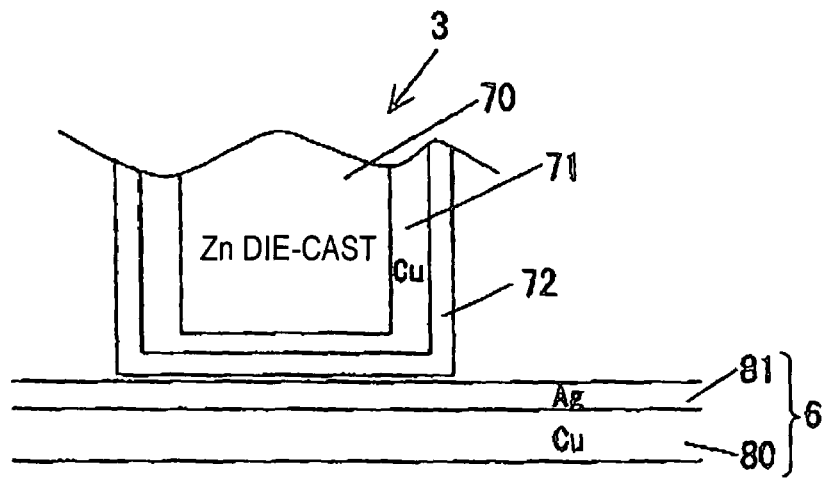
FIG. 26 is a view showing a state where a coated layer is formed on an adjoining member in an embodiment of the present invention.
Figure 26:
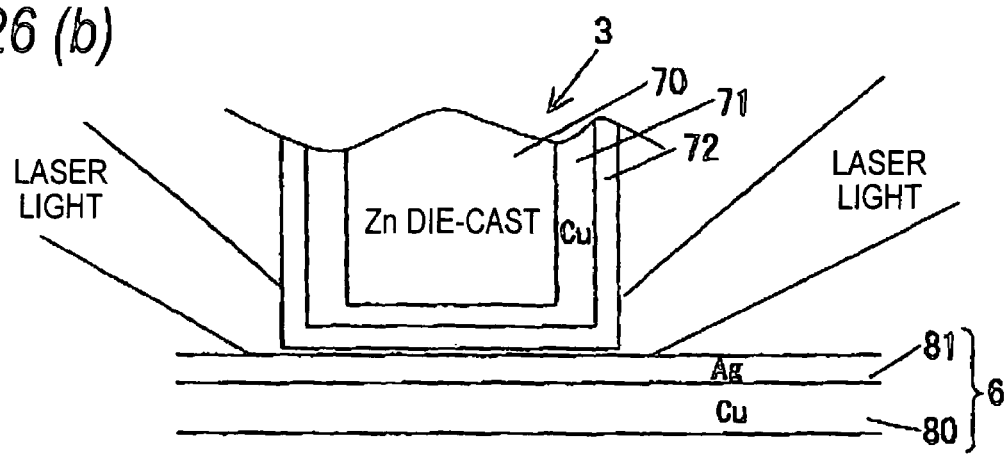
Figure 26:
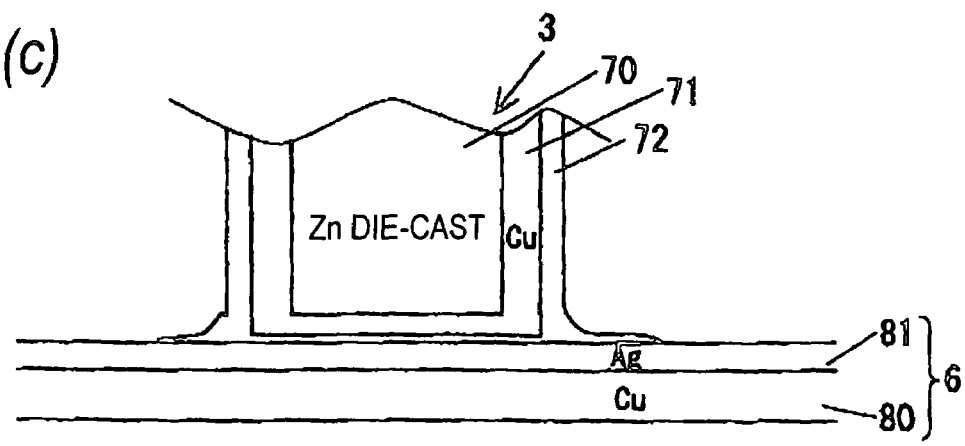

FIG. 16 is a view showing an assembling method of the optical pickup in an embodiment of the invention, and FIG. 26 is a view showing a state where a coating layer is formed on an adjoining member in an embodiment of the invention. For the substrate 70 of the coupling base 3 employed for mounting the lateral portions 6a, 6b of the plate 6 of the light source 1, there is preferably employed for example zinc, a zinc alloy, aluminum an aluminum alloy, titanium or a titanium alloy, but, in the present embodiment, as shown in FIG. 26, on a zinc die-cast provided with an undercoat layer 71 of plated copper, there is formed a coated layer 72 of a metal having a lower melting point than copper, such as a Sn—Cu alloy or a Sn—Bi alloy. A Sn—Bi alloy with a Cu content of 1-2% has a melting point of about 230° C., and a Sn—Bi alloy with a Bi content of 58% has a melting point of about 140° C. In addition to the Sn—Cu alloy or Sn—Bi alloy, a similar fixation is possible also with Sn—Ag, or Sn—Ag—Cu. The melting point is 227° C. at a Cu content of 0.7% and is elevated with an increase in the Cu content, resulting in a deteriorated flow of the fused alloy, thereby resulting in a defective adjoining. Therefore, the Cu content is preferably 2.0% or less in practice, though it is dependent on a location of adjoining and a purpose. Also the coated layer 72 preferably has a thickness of 5-10 μm both in case of Sn—Cu alloy and in case of Sn—Bi alloy. A larger thickness of the coated layer 72 deteriorates the dimensional precision of the component including the undercoat layer 71 and the coated layer 72 of the coupling base 3, while a smaller thickness of the coated layer 72 results in a reduction of an adjoining area formed by the fusion of the coated layer 72, thereby deteriorating the adjoining strength of the lateral portions 6a, 6b of the plate 6 of the light source 1 with the coupling base 3. As the thickness of the coated layer 72 has a different optimum value depending on the kind and the thickness of the undercoat layer 71, and whether it is formed on the substrate 70 either directly or across the undercoat layer 71, it is not limited to 5 to 10 μm. In case the coated layer 72 is formed as a film, it is formed by a plating method such as electroplating or electroless plating, but it may also be formed by other methods such as evaporation or sputtering.

On the other hand, the substrate for the plate 6 of the light source 1 is preferably constituted of a plate-shaped member of a metal such as copper, a copper alloy, silver, a silver alloy, aluminum, an aluminum alloy, iron or an iron alloy, but the present embodiment employs a member of copper or a copper alloy plated with silver.

For adjoining the light source 1 and the coupling base 3, at first there is conducted a temporary fixation with the ultraviolet settable adhesive or Ag paste mentioned in the foregoing. The temporary fixation is executed after an optical axis regulation as explained in FIG. 15. In the present embodiment, an ultraviolet settable adhesive of acrylic type is employed, and four temporary fixing portions are provided on the interface of the plate 6 of the light source 1 and the coupling base 3. As the adhesive to be employed in the temporary fixation may or may not match the articles to be adjoined, it is not limited to the foregoing example, and the location or portion of the temporary fixation is also not limited to the aforementioned example.

The temporary fixation of the light source 1 and the coupling base 3 may be conducted by a mechanical fixation. In such case, there may be employed a method of pressing the mold portion 7 of the light source 1, or a method of clamping the terminal portions 13, 14, 15 of the light source 1.

The light source 1 and the coupling base 3, subjected to the optical axis adjustment and the temporary fixation, are then subjected to a main fixation. In the main fixation, an area including the lateral portions 6a, 6b of the plate 6 of the light source 1 maintained in contact by the temporary fixation and a boundary portion of the coupling base 3 not subjected to the temporary fixation is irradiated, as shown in (a) of FIG. 26, with a laser light as shown in (b) of FIG. 26. The area irradiated with the laser light shows a temperature increase whereby the coated layer 72 starts to melt and the molten coated layer 72 fills without gap the space between the undercoat layer 71 on the surface of the coupling base 3 and the lateral portions 6a, 6b of the plate 6 as shown in (c) of FIG. 26. In this state, as the coated layer 72 is constituted of a Sn—Cu alloy or a Sn—Bi alloy while the undercoat layer 71 is constituted of Cu, the Sn—Cu alloy or the Sn—Bi alloy having a melting point lower than Cu, Zn or Ag positioned adjacent or close to the coated layer starts to melt at first, whereby the undercoat layer 71 on the surface of the coupling base 3 and the lateral portions 6a, 6b of the plate 6 can be adhered without a gap.

Then the irradiation of the laser light is terminated before the substrates 70, 80 of the plate 6 of the light source 1 and the coupling base 3 and the undercoat layer 71, 81 covering such substrates start to melt, the area of the elevated temperature by the laser light irradiation starts to show a temperature decrease toward the normal temperature, whereby the Sn—Cu alloy or the Sn—Bi alloy adhering the undercoat layer 71 on the surface of the coupling base 3 and the lateral portions 6a, 6b of the plate 6 without a gap starts to solidify. The laser light irradiation is applied on the area including the boundary portion not subjected to the temporary fixation in order to achieve the main fixation within a short time while retaining the supporting force of the temporary fixation.

The light source 1 and the coupling base 3 can be adjoined in this manner, and the lateral portions 6a, 6b of the plate 6 of the light source 1 and the coupling base 3 adjoined with the solder of a relatively good thermal conduction, can dissipate the heat generated in the light source 1 effectively to the coupling base 3 by the higher thermal conductivity than in the prior technology, and is effective as thermal measure for the light source 1.

In the present embodiment, the adjoining of the light source 1 and the coupling base 3 is achieved principally by melting the coated layer 72 formed on the coupling base 3, but the coated layer 72 may be provided on the lateral portions 6a, 6b of the plate 6 of the light source 1 or formed on both the coupling base 3 and the lateral portions 6a, 6b of the plate 6 of the light source 1. Also the melting of the coated layer 72 is not limited by a laser light but may also be achieved for example by approaching a heat source. In the present embodiment, the lateral portions 6a, 6b of the plate 6 of the light source 1 have a substantially rectangular parallelopiped form as small as about 2.5×1.0×0.5 mm, the coated layer 72 is preferably melted by a laser light.

Also the coated layer 72 is only required for fixing the coupling base and the light source 1 by melting, so that it may be provided at least in an area contributing to the adjoining.

The aforementioned configuration allows to suppress as far as possible a gap area generated at the adjoining of the light source including the light-emitting element and the coupling base for supporting the light source, also to transfer the heat generated in the light-emitting element effectively to the adjoined coupling base, and to secure a sufficient supporting strength between the light source and the coupling base. Furthermore, the main fixation for adjoining the light source including the light-emitting element and the coupling base for supporting the light source is executed in a shorter time and in a more partial area than in the prior technology, thereby alleviating the influence on the temporarily fixed portion and achieving the main fixation while maintaining the optical characteristics adjusted already at the temporary fixation.

Embodiment 2

There will be explained a case of employing cream solder for adjoining the light source 1 and the coupling base 3, instead of the molten coated layer 72.

Figure 27:
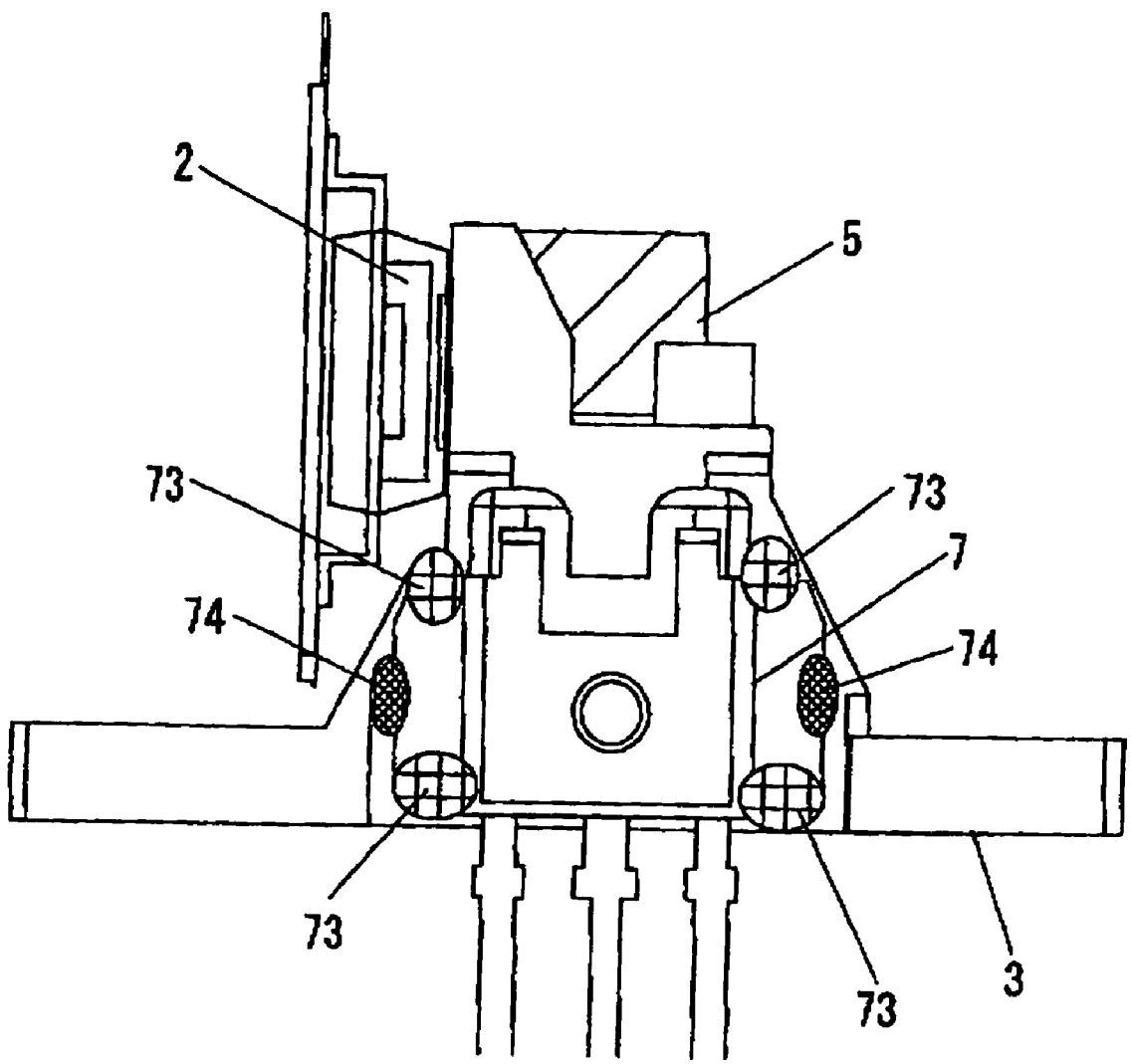
FIG. 27 is a view showing an assembling method for an optical pickup in an embodiment of the present invention.

FIG. 27 shows an assembling method for the optical pickup in an embodiment of the present invention, in which the configuration of the optical pickup and the entire optical disk apparatus is same as that in the embodiment 1.

In the following there will be explained feature portion of the embodiment 2 of the invention.

The substrate of the coupling base 3 employed for mounting the lateral portions 6a, 6b of the plate 6 of the light source 1 is preferably constituted of zinc, a zinc alloy, aluminum, an aluminum alloy, titanium or a titanium alloy, but in the present embodiment, as shown in FIG. 26, on a zinc die-cast member with a copper undercoat plating, a coated layer 72 of a metal of a melting point lower than that of copper, for example a Sn—Cu alloy or a Sn—Bi alloy. It is preferable, in order to achieve various purposes such as improving an adjoining property of the coupling base 3 with another member or providing a weather resistance, to provide an entire surface of a part thereof of the coupling base 3 with a thin film or a film constituted of Au, an Au alloy, Sn, or a Sn alloy (such as Sn—Cu alloy), and in case of forming as a film, it is formed by a plating method such as electroplating or electroless plating, but it may also be formed by other methods such as evaporation or sputtering.

On the other hand, the substrate for the lateral portions 18, 19 of the plate 6 of the light source 1 is preferably constituted of a plate-shaped member of a metal such as copper, a copper alloy, silver, a silver alloy, aluminum, an aluminum alloy, iron or an iron alloy, but the present embodiment employs a member of copper or a copper alloy plated with silver. For adjoining the light source 1 and the coupling base 3, at first there is conducted a temporary fixation with the ultraviolet settable adhesive or Ag paste mentioned in the foregoing. The temporary fixation is executed after an optical axis regulation as explained in FIG. 15. In the present embodiment, an ultraviolet settable adhesive of acrylic type is employed, and four temporary fixing portions are provided on the interface of the lateral portions 6a, 6b of the plate 6 of the light source 1 and the coupling base 3. As the adhesive to be employed in the temporary fixation may or may not match the articles to be adjoined, it is not limited to the foregoing example, and the location or portion of the temporary fixation is also not limited to the aforementioned example.

The temporary fixation of the light source 1 and the coupling base 3 may be conducted by a mechanical fixation. In such case, there may be employed a method of pressing the mold portion 7 of the light source 1, or a method of clamping the terminal portions 13, 14, 15 of the light source 1.

The light source 1 and the coupling base 3, subjected to the optical axis adjustment and the temporary fixation, are then subjected to a main fixation. In the main fixation, a cream solder 74 is coated as shown in FIG. 27. The cream solder 74 employs a Sn—Ag—Cu alloy, a Sn—Ag—Bi—In alloy, or a Sn—Bi alloy. A Sn—Ag—Cu alloy having an Ag content of 3% and a Cu content of 0.5% has a melting point of about 220° C., a Sn—Ag—Bi—In alloy having an Ag content of 3.5%, a Bi content of 0.5% and an In content of 8.0% has a melting point of about 190° C., and a Si—Bi alloy having a Bi content of 58% has a melting point of about 140° C. The cream solder 74 behaves differently in the melting point or the adjoining strength depending on the contents of Ag, Cu, Bi, In etc., different solders have to be used according to the shape of the coupling base 3, the shape of the light source 1, the fixing position and the number of the fixing positions. In the present embodiment, a Sn—Bi alloy with a Bi content of 58% is coated in two positions in an area including the lateral portions 6a, 6b of the plate 6 of the light source 1 maintained in contact by the temporary fixation and a boundary portion of the coupling base 3 not subjected to the temporary fixation, in consideration of the damage to the light source 1 and the temporary fixation portion, but the fixing position and the number thereof are not limited to such example.

Then an area coated with the cream solder, including the lateral portions 6a, 6b of the plate 6 of the light source 1 and the boundary portion of the coupling base 3 not subjected to the temporary fixation is irradiated. The area irradiated with the laser light shows a temperature increase whereby the cream solder 74 starts to melt and the molten cream solder 74 fills without gap the space between the undercoat layer on the surface of the coupling base 3 and the lateral portions 6a, 6b of the plate 6 as shown in (c) of FIG. 26. In this state, as the cream solder 74 is constituted of a Sn—Ag—Cu alloy, a Sn—Ag—Bi—In alloy or a Sn—Bi alloy while the undercoat layer is constituted of Cu, the Sn—Ag—Cu alloy, the Sn—Ag—Bi—In alloy or the Sn—Bi alloy having a melting point lower than Cu, Zn or Ag positioned adjacent or close to the coated layer starts to melt at first, whereby the undercoat layer 71 on the surface of the coupling base 3 and the lateral portions 6a, 6b of the plate 6 can be adhered without a gap.

Then the irradiation of the laser light is terminated before the substrates of the plate 6 of the light source 1 and the coupling base 3 and the undercoat layer covering such substrates start to melt, the area of the elevated temperature by the laser light irradiation starts to show a temperature decrease toward the normal temperature, whereby the Sn—Ag—Cu alloy, the Sn—Ag—Bi—In alloy or the Sn—Bi alloy adhering the undercoat layer on the surface of the coupling base 3 and the lateral portions 6a, 6b of the plate 6 without a gap starts to solidify. The laser light irradiation is applied on the area including the boundary portion not subjected to the temporary fixation in order to achieve the main fixation within a short time while retaining the supporting force of the temporary fixation.

The light source 1 and the coupling base 3 can be adjoined in this manner, and the lateral portions 6a, 6b of the plate 6 of the light source 1 and the coupling base 3 adjoined with the solder of a relatively good thermal conduction, can dissipate the heat generated in the light source 1 effectively to the coupling base 3 by the higher thermal conductivity than in the prior technology, and is effective as thermal measure for the light source 1.

In the present embodiment, the cream solder 74 is coated after the temporary fixation of the light source 1 and the coupling base 3, but it is also possible to execute the coating of the cream solder 74, then to execute the temporary fixation and then to execute the main fixation by the laser light. Also the melting of the cream solder 74 is not limited by a laser light but may also be achieved for example by approaching a heat source. In the present embodiment, the lateral portions 6a, 6b of the plate 6 of the light source 1 have a substantially rectangular parallelopiped form as small as about 2.5×1.0× 0.5 mm, the cream solder 74 is preferably melted by a laser light.

Also the cream solder 74 is only required for fixing the coupling base 3 and the light source 1 by melting, so that it may be provided at least in an area contributing to the adjoining.

Also the adjoining with the cream solder 74 may be used in combination with the embodiment 1, and, in such case, further improvements in the thermal conductivity and the adjoining strength can be anticipated because of an increased element for expanding the adjoining area.

The aforementioned configuration allows to suppress as far as possible a gap area generated at the adjoining of the light source including the light-emitting element and the coupling base for supporting the light source, also to transfer the heat generated in the light-emitting element effectively to the adjoined coupling base, and to secure a sufficient supporting strength between the light source and the coupling base. Furthermore, the main fixation for adjoining the light source including the light-emitting element and the coupling base for supporting the light source is executed in a shorter time and in a more partial area than in the prior technology, thereby alleviating the influence on the temporarily fixed portion and achieving the main fixation while maintaining the optical characteristics adjusted already at the temporary fixation.

Embodiment 3

Figure 28:
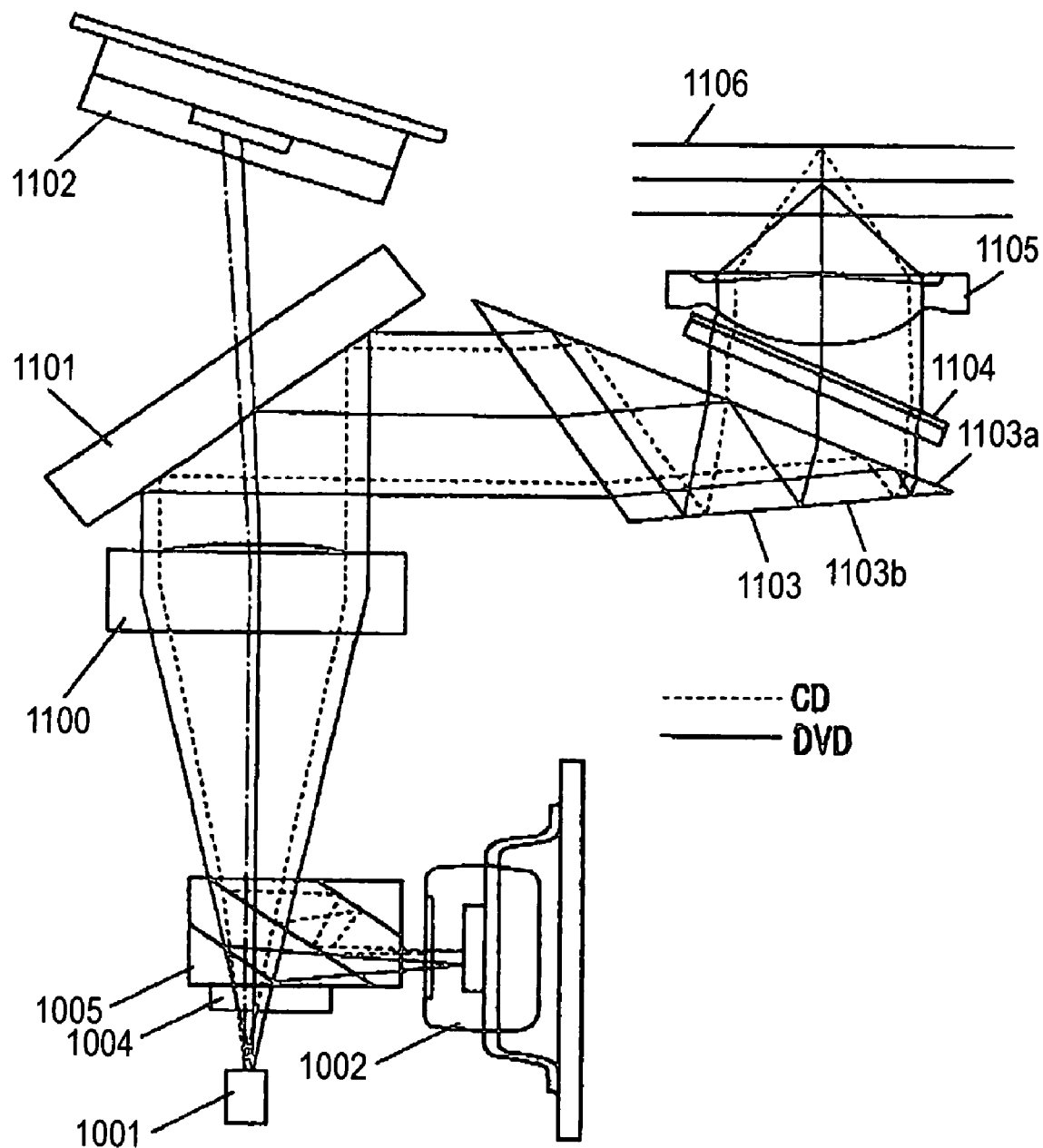
FIG. 28 is a view showing configuration of an optical system of an optical pickup in an embodiment of the present invention.
Figure 29:
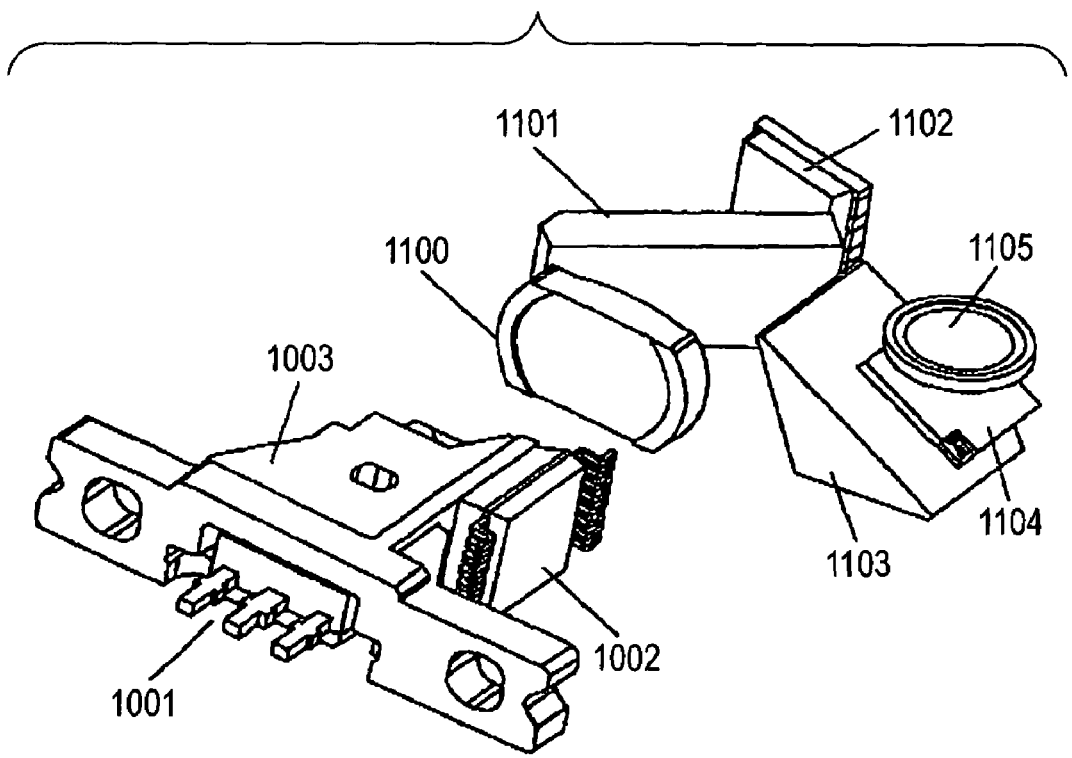
FIG. 29 is a view showing components constituting an optical pickup in an embodiment of the present invention.
Figure 29:
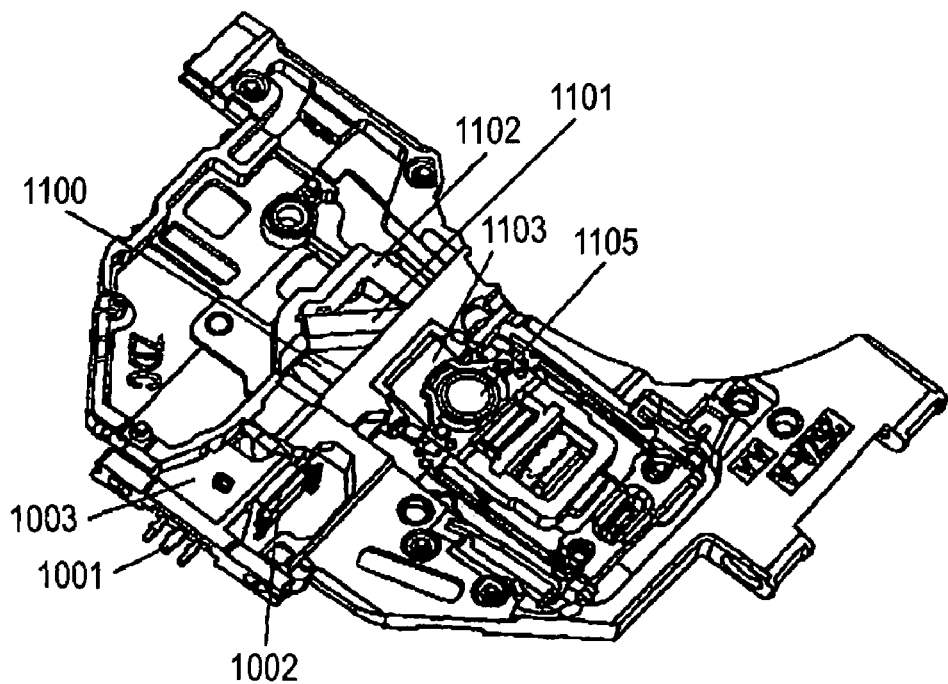

FIG. 28 is a view showing the configuration of an optical system of an optical pickup embodying the present invention, and, in FIG. 29(*a*) indicates components constituting an optical pickup in an embodiment of the present invention, and (*b*) shows a cartridge formed by incorporating these.

A light source 1001 incorporates a semiconductor laser for CD, emitting a laser light of a wavelength of about 780 nm, and a semiconductor laser for DVD, emitting a laser light of a wavelength of about 650 nm. In FIG. 28, an optical path for the laser light for CD is indicated by a broken line, and an optical path for the laser light for DVD is indicated by a solid line. Optical members 1004, 1005 shown in FIG. 28 are fixed in a coupling base 1003 shown in FIG. 29.

A light emitted from the light source 1001 is passed by the optical members 1004, 1005, then enters a collimating lens 1100, reflected by a beam splitter plate (BS plate) 1101 and is guided to an upward-directing prism 1103. In this state, a part of the emitted light is transmitted by the BS plate 1101 and is guided to a photosensor 1102 for monitoring a light amount of the light source 1001, and a light emitting power of the light source 1001 is regulated by an output of the photosensor 1102.

The light from the beam splitter plate 1101 is reflected by a face 1103*a* of the upward-directing prism 1103, further reflected by a face 1103*b*, then transmitted by a face 1103*a* to enter a hologram 1104 sandwiching a liquid crystal, and is condensed on an optical disk 1106. A light reflected by the optical disk 1106 is transmitted through an objective lens 1105 and the hologram, guided to the upward-directing prism 1103, transmitted by the face 1103*a* thereof, reflected by the faces 1103*b* and 1103*a*, further guided to and reflected by the beam splitter plate 1101, transmitted by the collimating lens 1100 and guided to the optical member 1005 thereby reaching a light-receiving element 1002.

Figure 30:
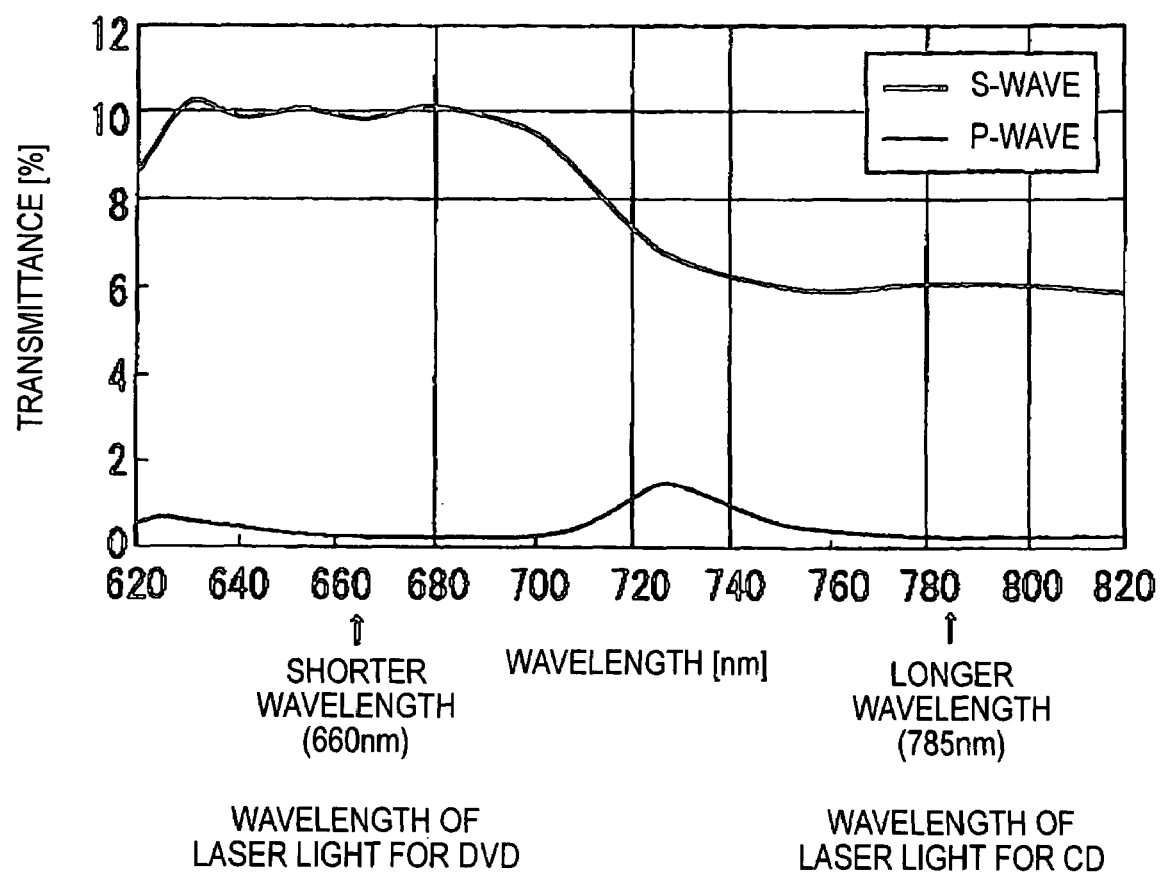
FIG. 30 is a view showing a wavelength dependence of light transmission characteristics of an optical film.

The beam splitter plate 1101 is provided with an optical film of transmission characteristics having a wavelength dependence as shown in FIG. 30, and the intensity of the laser light received by the photosensor 102 is regulated by transmitting the laser light for CD and the laser light for DVD through this optical film.

The optical pickup in an embodiment of the present invention assumes that the laser light for CD is used for both recording and reproduction of information while the laser light for DVD is used for reproduction of information only. As a recording and a reproduction of information require different intensities of the laser light, it is necessary that the intensity of the laser light for CD has a certain range for executing both recording and reproduction. On the other hand, the light source for DVD, used only for the reproduction can be limited to an intensity of a fixed value. In the embodiment of the present invention, an output level, corresponding to a light-receiving level of the laser light for DVD, obtained by using the optical film of the aforementioned characteristics and by conversion with the photosensor 1102, is regulated in such a manner that the intensity of the laser light for DVD is contained within a predetermined range of the intensity of the laser light for CD.

Figure 31:
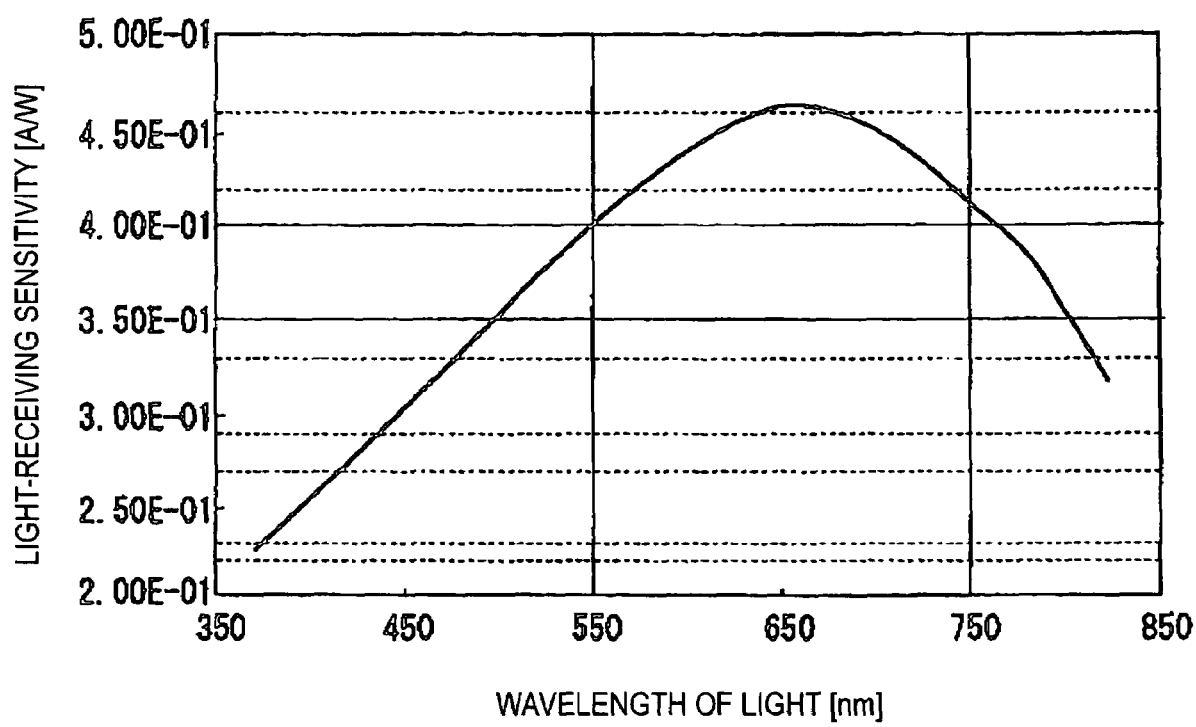
FIG. 31 is a view showing an example of a wavelength dependence of a light-receiving sensitivity of a photosensor.

FIG. 31 is a view showing an example of the wavelength dependence of the light-receiving sensitivity of the photosensor 1102. In this example, the light-receiving sensitivity is so set to have a maximum in the vicinity of 660 nm which is the wavelength of the laser light for DVD. Thus, based on the wavelength dependence of the light-receiving sensitivity of the photosensor 1102, the photoelectric conversion means of the photosensor 1102 sets a current value corresponding to the light-receiving level of the laser light for DVD, whereby the output level of the laser light for DVD converted into a current value can be set within a range of the light-receiving level of the laser light for CD.

Figure 32:
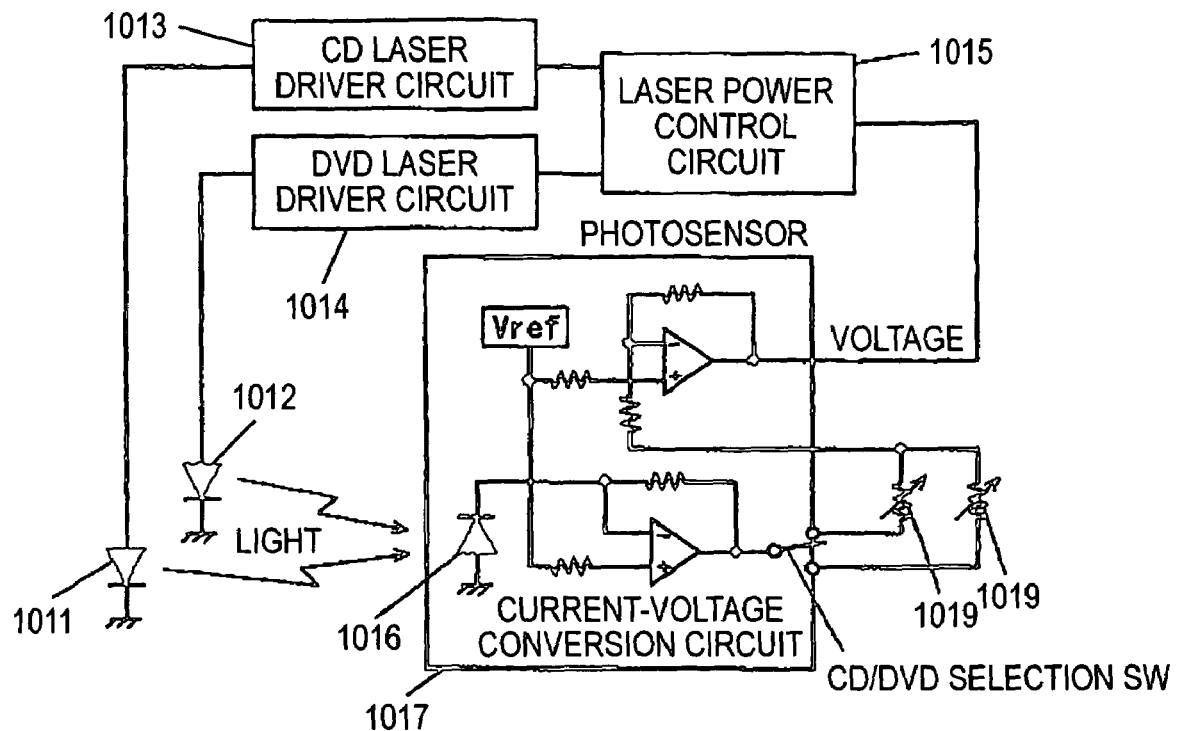
FIG. 32 is a block diagram for laser light control of the photosensor.
Figure 32:
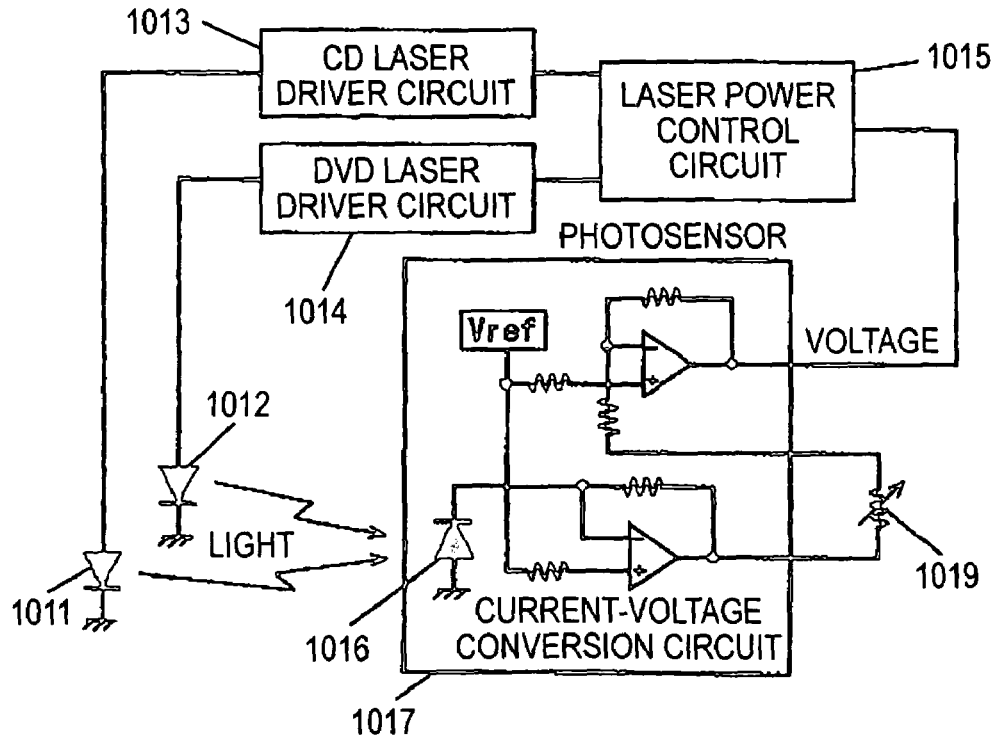

FIG. 32 is a block diagram for laser light control in the photosensor 1102. In FIG. 32(*a*) shows a prior case, while (*b*) shows a case of an embodiment of the present invention.

In a prior case, a laser light source 1011 for CD and a laser light source 1012 for DVD are respectively connected with laser driver circuits 1013, 1014, and the intensity of the laser light emitted from the laser light source 1011 for CD and the laser light source 1012 for DVD is converted by a light-current converting element 1016 of the photosensor 1102 into a current corresponding to the light-receiving intensity. The current thus obtained is converted by a current-voltage converting circuit 1017 into a voltage, and an amplification level is regulated by an amplification regulator 1019 for each of CD and DVD, by a CD/DVD selecting switch 1018. Thus the intensities of the laser light for CD and the laser light for DVD are independently controlled by a laser power control circuit 1015.

On the other hand, in an embodiment of the invention, a laser light source 1011 for CD and a laser light source 1012 for DVD are respectively connected with laser driver circuits 1013, 1014, and the intensity of the laser light emitted from the laser light source 1011 for CD and the laser light source 1012 for DVD is converted by a light-current converting element 1016 of the photosensor 1102 into a current corresponding to the light-receiving intensity The current thus obtained is converted by a current-voltage converting circuit 1017 into a voltage, but, since the output level of the laser light for DVD after conversion is so selected in advance as to be within the range of the output level of the laser light for CD after conversion by the aforementioned means, the amplification level is regulated by the amplification regulator 1019 only for the CD, without requiring the CD/DVD selecting switch 1018 and without executing the switching operation as in the prior configuration. Therefore, in the embodiment of the invention, by a regulation of the amplification level for the CD only, the laser power control circuit 1015 can regulate at least either of the intensity of the laser light for CD and the intensity of the laser light for DVD.

Figure 33:
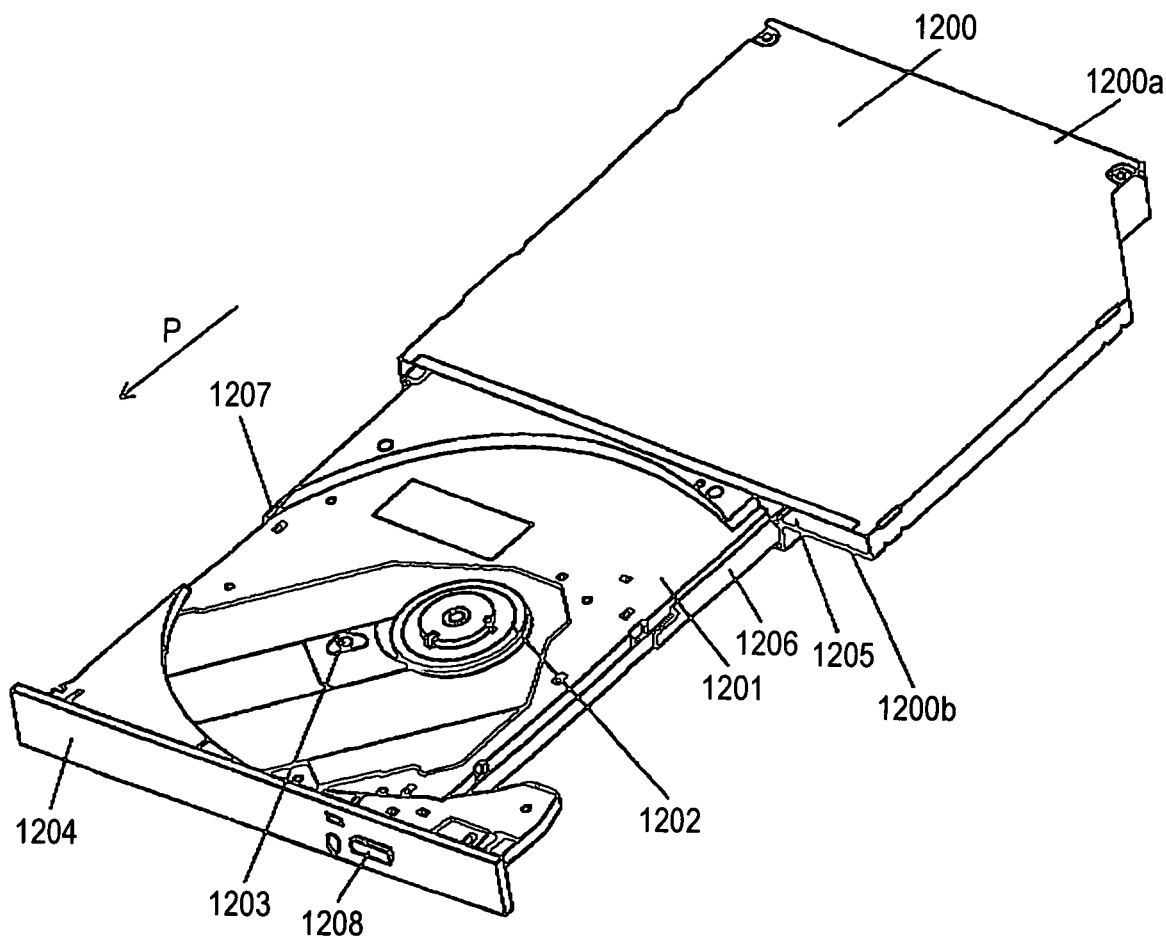
FIG. 33 is a view showing an optical disk apparatus utilizing an optical pickup in an embodiment of the invention.

FIG. 33 is a view showing an optical disk apparatus utilizing an optical pickup embodying the present invention. In FIG. 33, a casing 1200 is constituted by combining an upper casing portion 1200a and a lower casing portion 1200b. The upper casing portion 1200a and the lower casing portion 1200b are mutually fixed for example with screws. There are shown a tray 1201 which can be extracted from or retracted in the casing 1200, a spindle motor 1202 provided in the tray 1201, and an optical pickup 1203, and the optical pickup 1203 executes at least either of writing or reading information into or from the optical disk The optical pickup 1203 is mounted on a carriage (not shown) supported movably in a radial direction of the optical disk. A bezel 1204 provided at a front end face of the tray 1201 is so formed as to cover a slot 1205 for the tray 1201 when the tray 1201 is retracted into the casing 1200.

Rails 1206, 1207 are slidably provided respectively in the tray 1201 and the casing 1200 and provided on both sides of the tray 1201, and the tray 1201 is mounted by means of such rails 1206, 1207 in an extractable and retractable manner out of and into the casing 1200 in a direction indicated by an arrow P.

The bezel 1204 provided at a front end face of the tray 1201 is provided with an ejection switch 1208, of which depression disengages an engaging portion (not shown) provided in the casing 1200 and an engaging portion (not shown) provided in the tray 1201.

Embodiment 4

Figure 34:
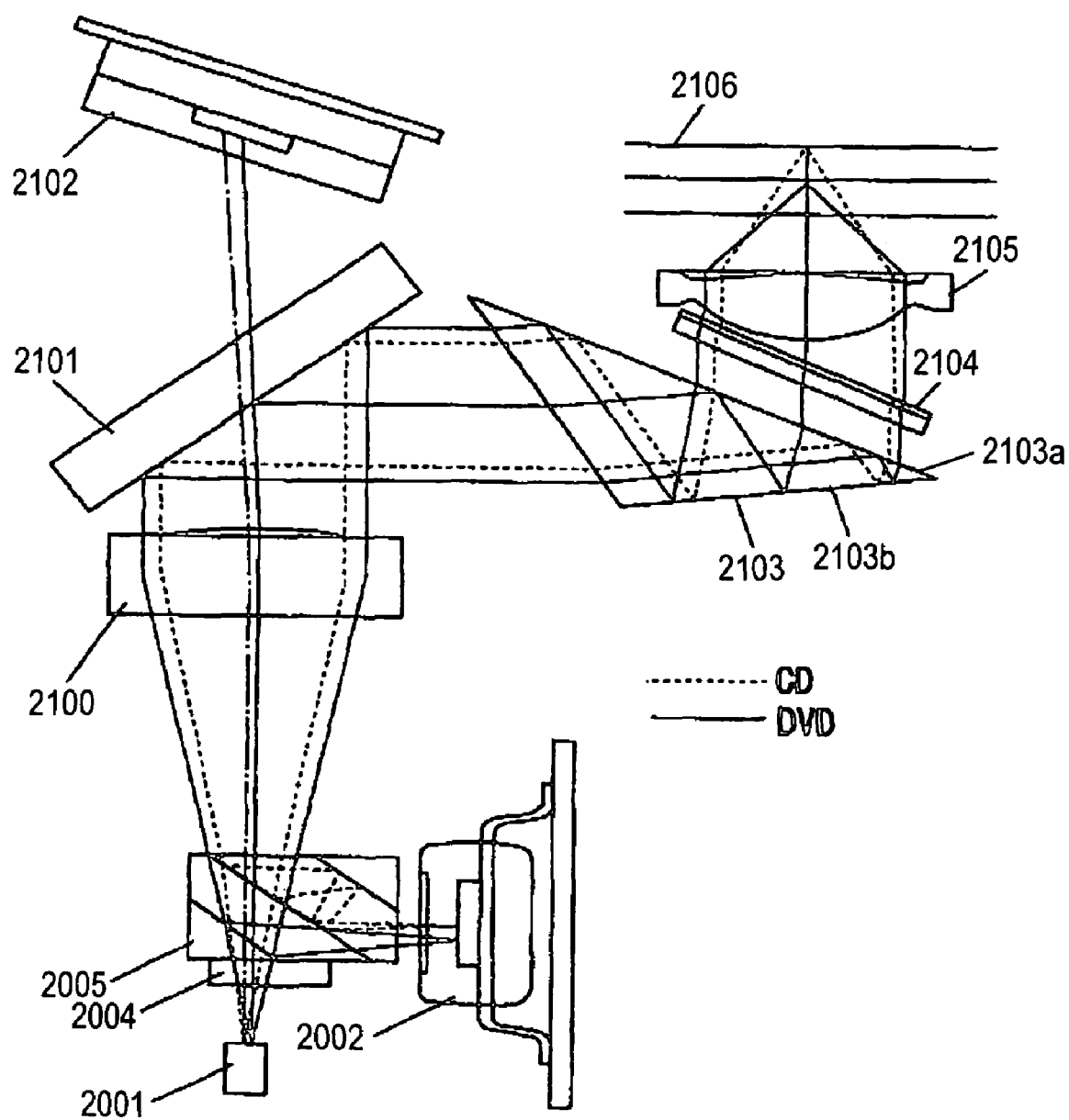
FIG. 34 is a view showing configuration of an optical system of an optical pickup in an embodiment of the present invention.
Figure 35:
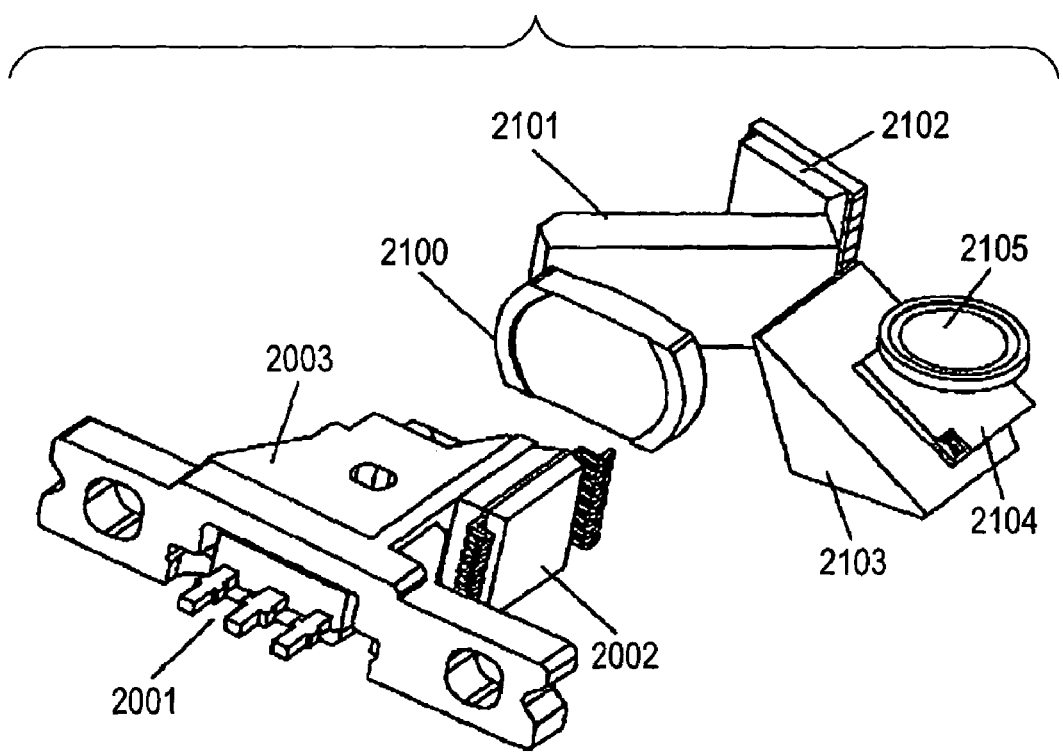
FIG. 35 is a view showing components constituting an optical pickup in an embodiment of the present invention.
Figure 35:
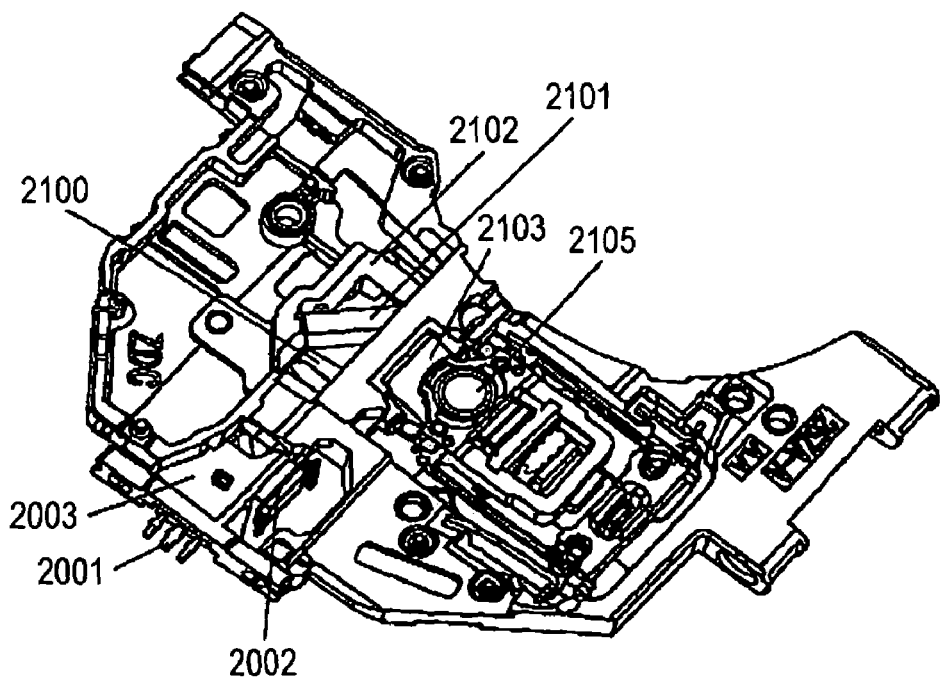

FIG. 34 is a view showing the configuration of an optical system of an optical pickup embodying the present invention, and, in FIG. 35, (a) indicates components constituting an optical pickup in an embodiment of the present invention, and (b) shows a cartridge formed by incorporating these.

Figure 42:
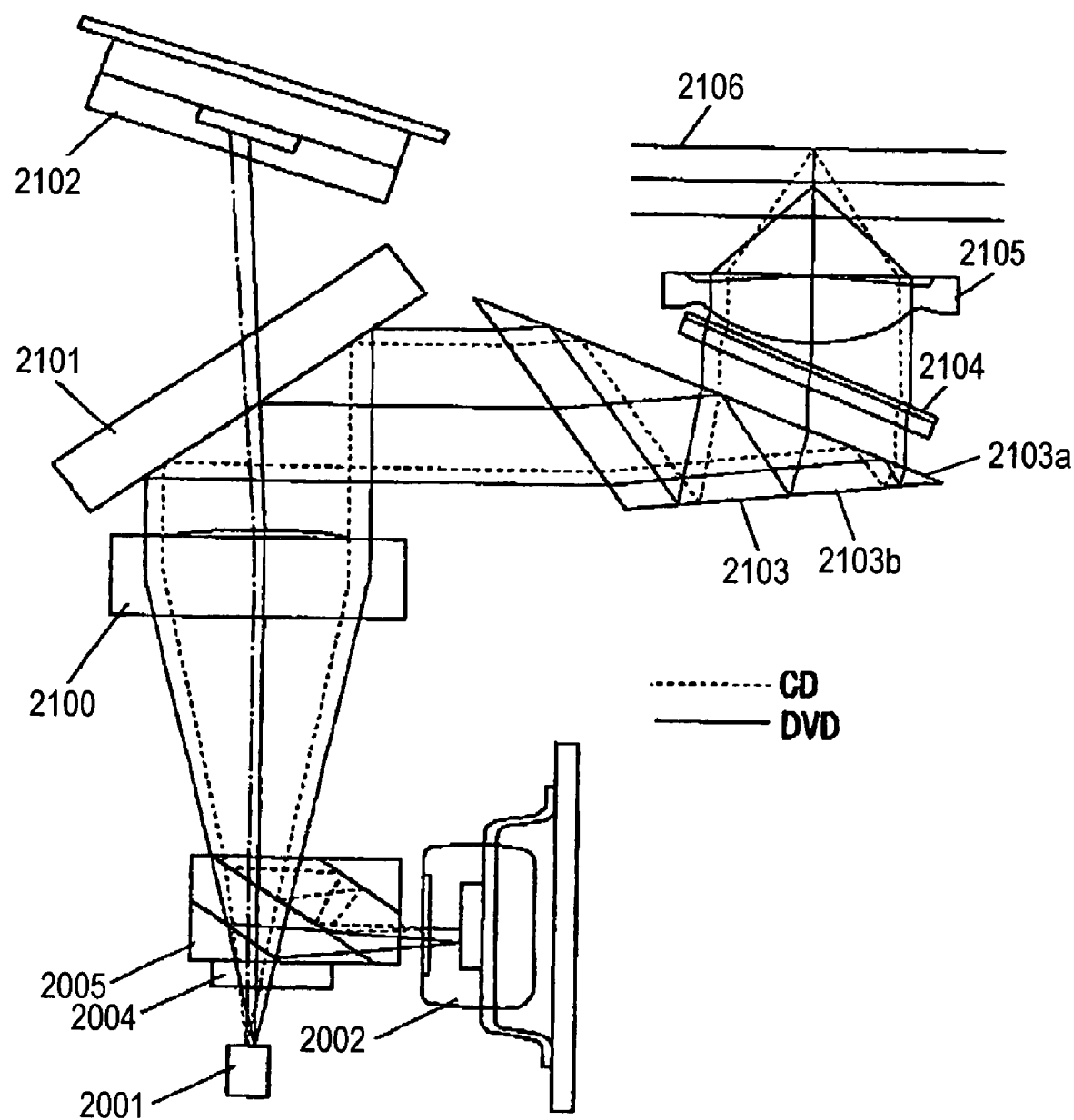
FIG. 42 is a view showing an example of an optical system of an optical pickup.

The optical structure of the optical pickup in the embodiment 4 of the invention shown in FIG. 34 is similar to that of the optical pickup shown in FIG. 42, but is different in the structure of a beam splitter plate 101 (beam splitter plate 2010 in FIG. 42) to be explained in the following.

A light source 2001 incorporates a semiconductor laser for CD, emitting a laser light of a wavelength of about 780 nm, and a semiconductor laser for DVD, emitting a laser light of a wavelength of about 650 nm. In FIG. 34, an optical path for the laser light for CD is indicated by a broken line, and an optical path for the laser light for DVD is indicated by a solid line. Optical members 2004, 2005 shown in FIG. 34 are fixed in a coupling base 2003 shown in FIG. 35.

A light emitted from the light source 2001 is passed by the optical members 2004, 2005, then enters a collimating lens 2100, reflected by a beam splitter plate (BS plate) 2101 and is guided to an upward-directing prism 2103. In this state, a part of the emitted light is transmitted by the BS plate 2101 and is guided to a photosensor 2102 for monitoring a light amount of the light source 2001, and a light emitting power of the light source 2001 is regulated by an output of the photosensor 2102.

The light from the beam splitter plate 2101 is reflected by a face 2103a of the upward-directing prism 2103, further reflected by a face 2103b, then transmitted by a face 2103a to enter a hologram 2104 sandwiching a liquid crystal, and is condensed on an optical disk 2106. A light reflected by the optical disk 2106 is transmitted through an objective lens 2105 and the hologram, guided to the upward-directing prism 2103, transmitted by the face 2103a thereof, reflected by the faces 2103b and 2103a, further guided to and reflected by the beam splitter plate 2101, transmitted by the collimating lens 2100 and guided to the optical member 2005 thereby reaching a light-receiving element 2002.

Figure 36:
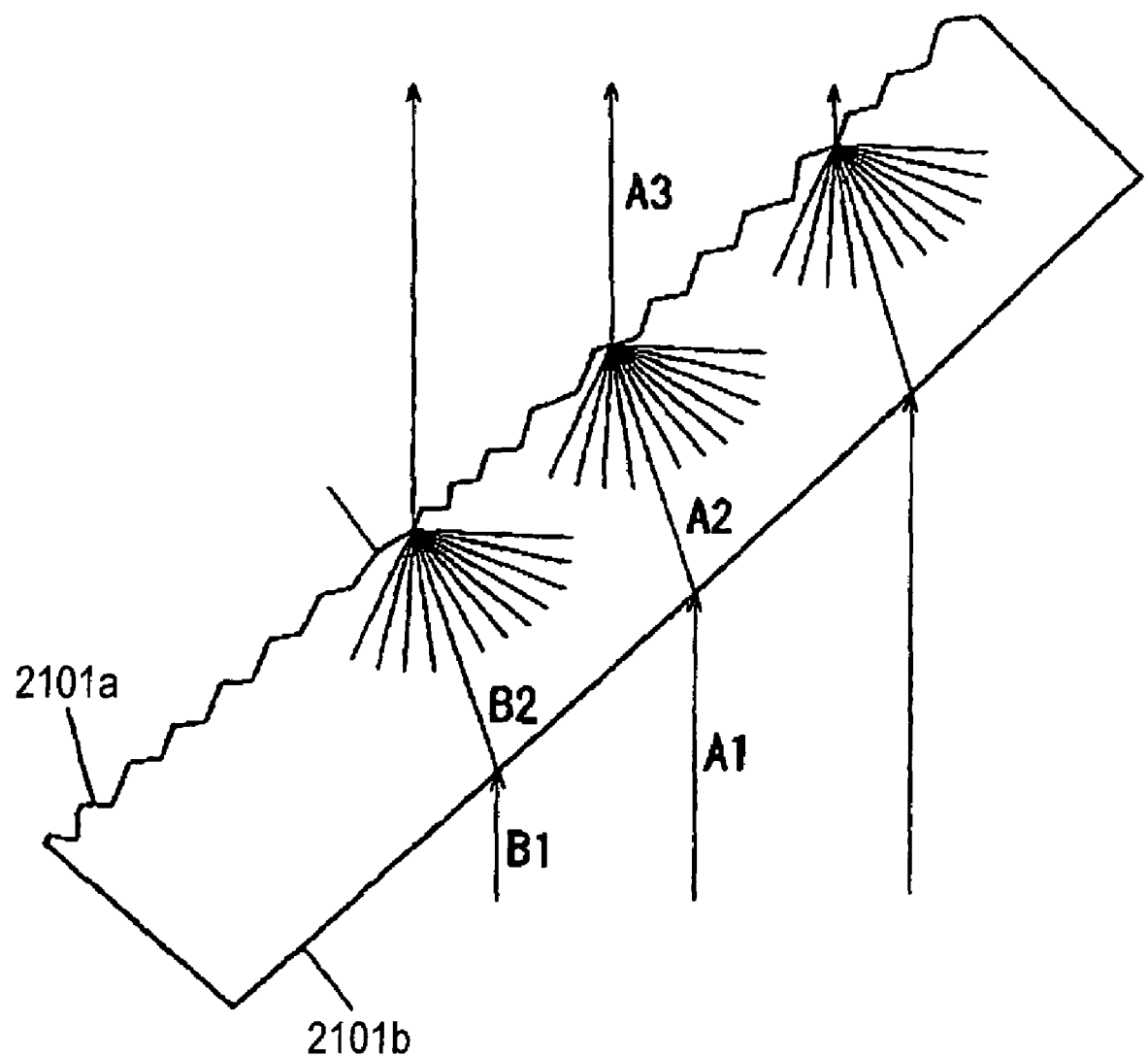
FIG. 36 is a view showing a beam splitter plate in the optical pickup in an embodiment of the present invention.

The beam splitter plate 2101 is provided with an optical film of transmission characteristics having a wavelength dependence as shown in FIG. 36, and the intensity of the laser light received by the photosensor 2102 is regulated by transmitting the laser light for CD and the laser light for DVD through this optical film.

In the following, characteristic parts of the embodiment 4 of the invention will be explained.

FIG. 36 is a view showing a beam splitter plate of the optical pickup in the embodiment 1 of the invention, indicating that, when a collimating lens 2100 for converting a diffused light emitted from the light source 2001 is converted into a parallel light is positioned in the optical path between the light source 2001 and the beam splitter plate 2101, a rough surface 2101C is provided in a principal plane 2101a of the beam splitter plate 2101.

A diffuse light emitted from the light source 2001 is converted into a parallel light by passing the collimating lens 2100, and such parallel light enters the beam splitter plate 2101 through a principal plane 2101b at the side of the collimating lens 2100, then passes through the interior of the beam splitter plate 2101 and reaches a principal plane 2101a at the side of the photosensor 2102.

The beam splitter plate 2101 has a substantially rectangular parallelpiped form having a substantially square face of 5 mm and a thickness of about 3 mm, and is preferably constituted of a glass material such as borosilicate crown glass.

At least a partial rough surface 2101C is provided on at least one of the principal planes 2101a and 101b of the beam splitter plate 2101.

In the present embodiment, the rough surface 2101C is provided on the principal plane 2101a of the beam splitter plate 2101 at the side of the photosensor 2102, has a center line averaged roughness Ra of 0.1 to 3.0 μm, and is provided over the entire principal plane 101a of the beam splitter plate 2101 at the side of the photosensor 2102. The rough surface 2101C is capable of scattering or diffusing the light or converting a proceeding angle of a part of the light. Usually, the surface of the beam splitter plate 2101 is a mirror surface with a center-line average roughness Ra of 0.01 μm or less, and a smaller Ra increases the transmitted light and the reflected light, and a larger Ra decreases the transmitted light and the reflected light.

Now there will be explained an optical path through a prior beam splitter plate 2101, in which the principal plane 2101a at the side of the photosensor 2102 is not provided with the rough surface 2101C.

Figure 40:
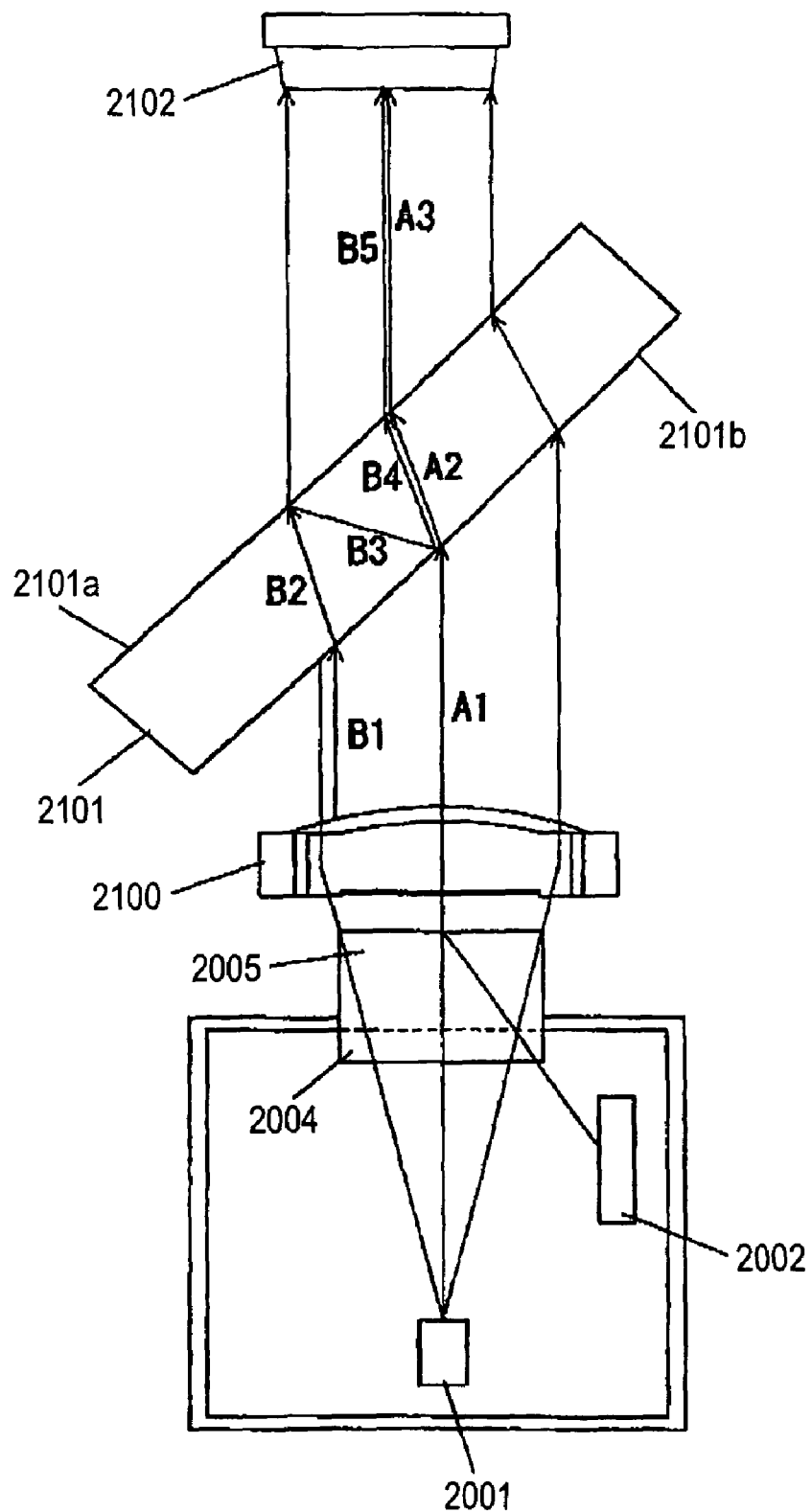
FIG. 40 is a view showing configuration of an optical system of an optical pickup in a prior structure.

FIG. 40 is a view showing an optical structure of a optical pickup of a prior configuration. A light emitted from the light source 2001 is passed by optical members 2004, 2005, enters the collimating lens 2100, reflected by the beam splitter plate 2101 and is guided to an upward-directing prism 2103. In the BS plate 2101, a part of the emitted light is reflected and guided to a photosensor 2102 for monitoring the light amount of the light source 2001, and the light emission power of the light source 2001 is regulated by the output of the photosensor 20002, and, in the following, there will be explained a part where a part of the emitted light is transmitted by the beam splitter plate 2101 and is guided to the photosensor 2102 for monitoring the light amount of the light source 2001 and the light emission power of the light source 2001 is regulated by the output of the photosensor 2102. Also for the purpose of clarity, the optical path of the light is divided into a light (A) emerging from the vicinity of a center of the collimating lens and a light (B) emerging from the vicinity of a peripheral portion of the collimating lens.

The light (A) emerging from the central part of the collimating lens 2100 enters the beam splitting plate 2101 through a central part of the principal plane 2101b at the side of the collimating lens 2100, then, after passing through the interior of the beam splitter plate 2101, emerges from a central part of the principal plane 2101a at the side of the photosensor 2102 and is guided to the photosensor 2102 (order of A1, A2 and A3). On the other hand, the light (B) emerging from a peripheral part of the collimating lens 2100 enters the beam splitting plate 2101 through a peripheral part of the principal plane 2101b at the side of the collimating lens 2100, then, after passing through the interior of the beam splitter plate 2101, reaches the principal plane 2101a of the beam splitter plate 2101 at the side of the photosensor 2102 (order of B1 and B2). A part of the light reaching the principal plane 2101b of the beam splitter plate 2101 is reflected and returns to the principal plane 2101b of the beam splitter plate 101 at the side of the collimating lens 2100, further reflected by the principal plane 2101b of the beam splitter plate 2101 at the side of the collimating lens 2100, then, after passing through the interior of the beam splitter plate 2101, emerges from a central part of the principal plane 2101b of the beam splitter plate 2101 at the side of the photosensor 2102 and is guided to the photosensor 2102 (order of B1, B2 and B3). In this state, because of a difference in the optical path to the photosensor 2102 for the light (A) emerging from the central part of the collimating lens and the light (B) emerging from the peripheral part of the collimating lens, the light (A) emerging from the central part of the collimating lens receives an optical interference by a difference in phase, thereby giving erroneous information to the photosensor 102.

Figure 37:
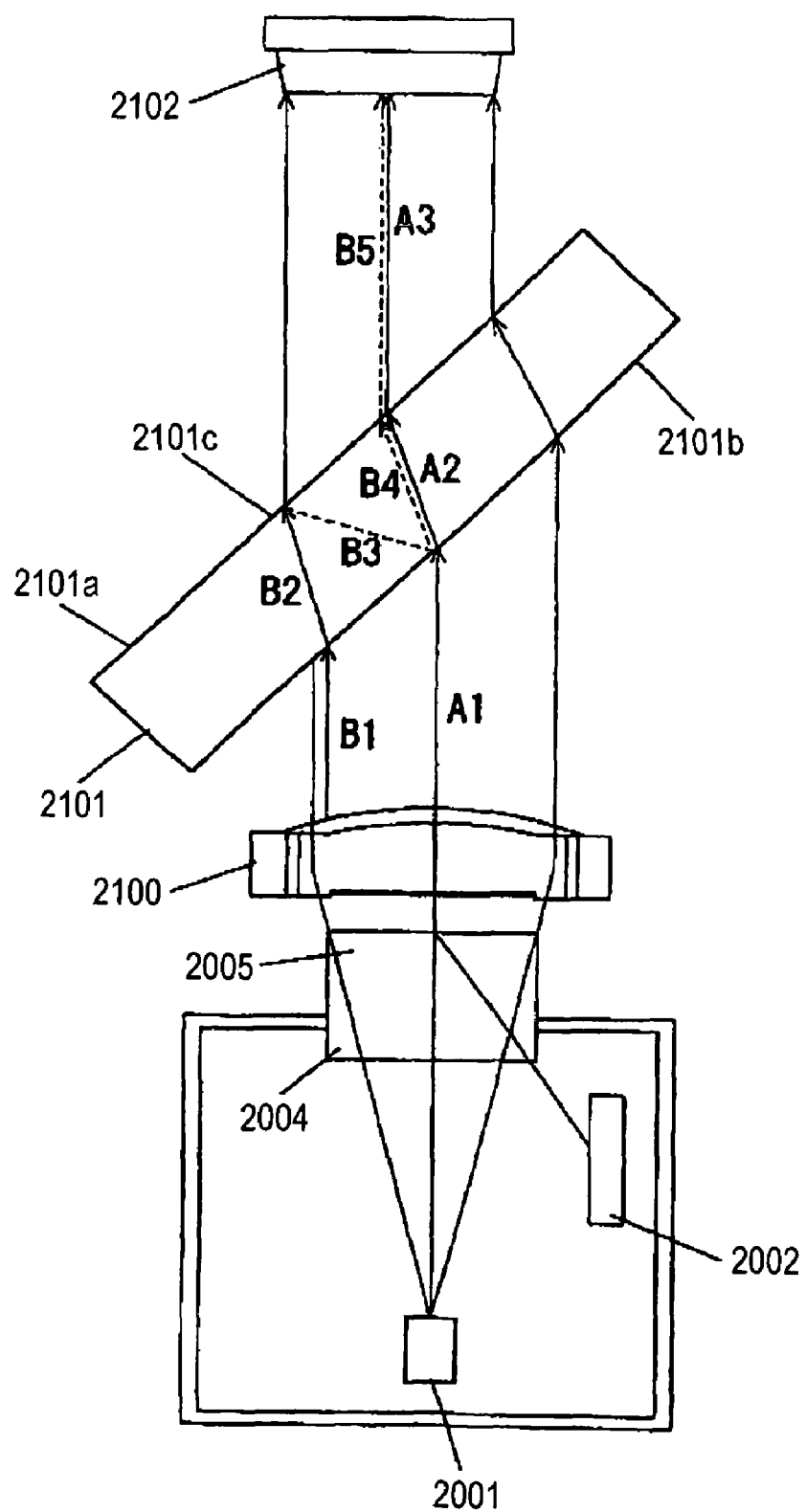
FIG. 37 is a view showing configuration of an optical system of an optical pickup in an embodiment of the present invention.

However, in the embodiment 4 of the invention shown in FIG. 37 indicating the optical structure of the optical pickup, in which a rough surface 2101C is provided on a principal plane of the beam splitter plate 2101 at the side of the photosensor 2102, the light (B) emerging from a peripheral part of the collimating lens 2100 enters the beam splitting plate 2101 through a peripheral part of the principal plane 2101b at the side of the collimating lens 2100, and, after passing through the interior of the beam splitter plate 2101, reaches the principal plane 2101a of the beam splitter plate 2101 at the side of the photosensor 2102 (order of B1 and B2), and, owing to the presence of such rough surface (C), the lights transmitted and reflected by the principal plane 2101a are scattered, diffused or converted in the proceeding angle of the reflected light at the surface having the rough surface 2101C of the principal plane 2101a of the beam splitter plate 2101 at the side of the photosensor 2102. The reflected light weaker in the light amount shows a significant attenuation in the light amount at the scattering, diffusing or converting in the proceeding angle, thus showing significantly smaller influence as an interfering light (light passing B3, B4 and B5 becoming almost zero). As it is possible to suppress the reflected light generated in the beam splitter plate when the light emitted from the light source passes through the beam splitter plate, the photosensor can reduce reception of erroneous information including interference light resulting from such reflected light, and there can be realized an optical pickup capable of precisely regulating the light emission intensity of the laser light source for executing at least either of information recording and reproduction on an optical disk.

In the present embodiment, the rough surface 2101C has a center-line averaged roughness Ra of 0.1 to 3.0 μm and is provided on the entire surface of the principal plane 2101a of the beam splitter plate 2101 at the side of the photosensor, but the rough surface 2101C is only required to cover an area passed by the parallel light toward the photosensor 2102 on either of the principal plane 2101a of the beam splitter plate 2101 at the side of the photosensor 2102 or the principal plane 2101b of the beam splitter plate 2101 at the side of the collimating lens 2100, so that the rough surface 2101C may be provided on either or both of the principal planes 2101a, 2101b of the beam splitter plate 2101, and the area of the rough surface 2101C may be a part of the area passed by the parallel light toward the photosensor 2102. In order to minimize the optical interference as far as possible, the area of the rough surface 2101C preferably covers an entire area passed by the parallel light toward the photosensor 2102, thereby increasing the attenuation of the reflected light. Also the center-line average roughness Ra of the rough surface 2101C provides the amount of the transmitted light and the attenuation of the reflected light at the same time in the range of 0.1-3.0 μm, but the center-line average roughness Ra of the rough surface 2101C may preferably be displaced depending upon a material constituting the beam splitter plate 2101.

Also the rough surface 2101C provided on the principal planes 2101a, 2101b of the beam splitter plate 2101 may be constituted of another member such as a film having a center-line average roughness Ra equivalent to the rough surface 2101C.

Figure 39:
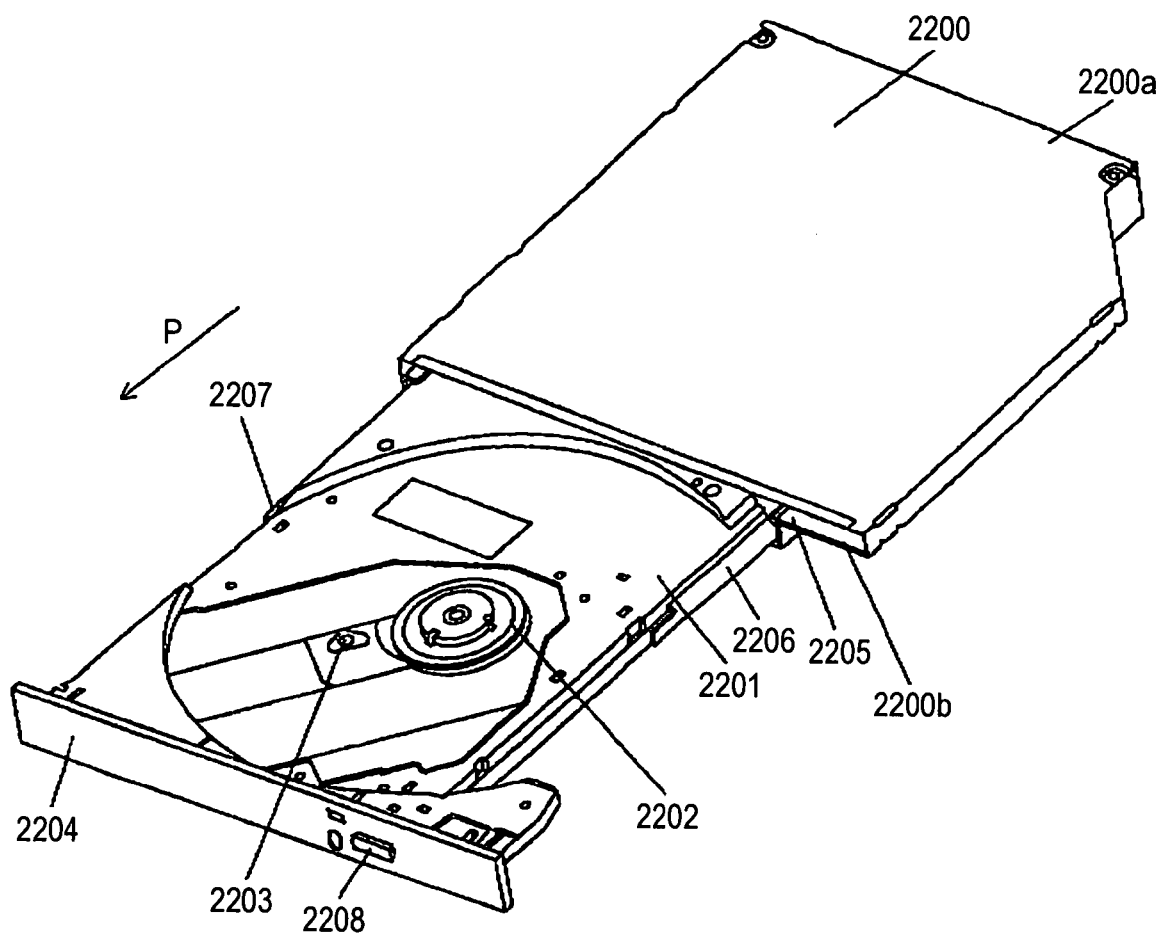
FIG. 39 is a view showing an optical disk apparatus utilizing an optical pickup of an embodiment of the present invention.

FIG. 39 is a view showing an optical disk apparatus utilizing an optical pickup embodying the present invention. In FIG. 39, a casing 2200 is constituted by combining an upper casing portion 200a and a lower casing portion 2200b. The upper casing portion 2200a and the lower casing portion 200b are mutually fixed for example with screws. There are shown a tray 2201 which can be extracted from or retracted in the casing 2200, a spindle motor 2202 provided in the tray 2201, and an optical pickup 2203, and the optical pickup 2203 executes at least either of writing or reading information into or from the optical disk. The optical pickup 2203 is mounted on a carriage (not shown) supported movably in a radial direction of the optical disk. A bezel 2204 provided at a front end face of the tray 2201 is so formed as to cover a slot 2205 for the tray 2201 when the tray 2201 is retracted into the casing 2200.

Rails 2206, 2207 are slidably provided respectively in the tray 2201 and the casing 2200 and provided on both sides of the tray 2201, and the tray 2201 is mounted by means of such rails 2206, 2207 in an extractable and retractable manner out of and into the casing 2200 in a direction indicated by an arrow P.

The bezel 2204 provided at a front end face of the tray 2201 is provided with an ejection switch 2208, of which depression disengages an engaging portion (not shown) provided in the casing 2200, and an engaging portion (not shown) provided in the tray 2201.

Embodiment 5

There will be explained a case where the principal plane 2101a of the beam splitter plate 2101 at the side of the photosensor 2102 and the principal plane 2101b at the side of the collimating lens 2100 are made non-parallel in at least a part.

Figure 38:
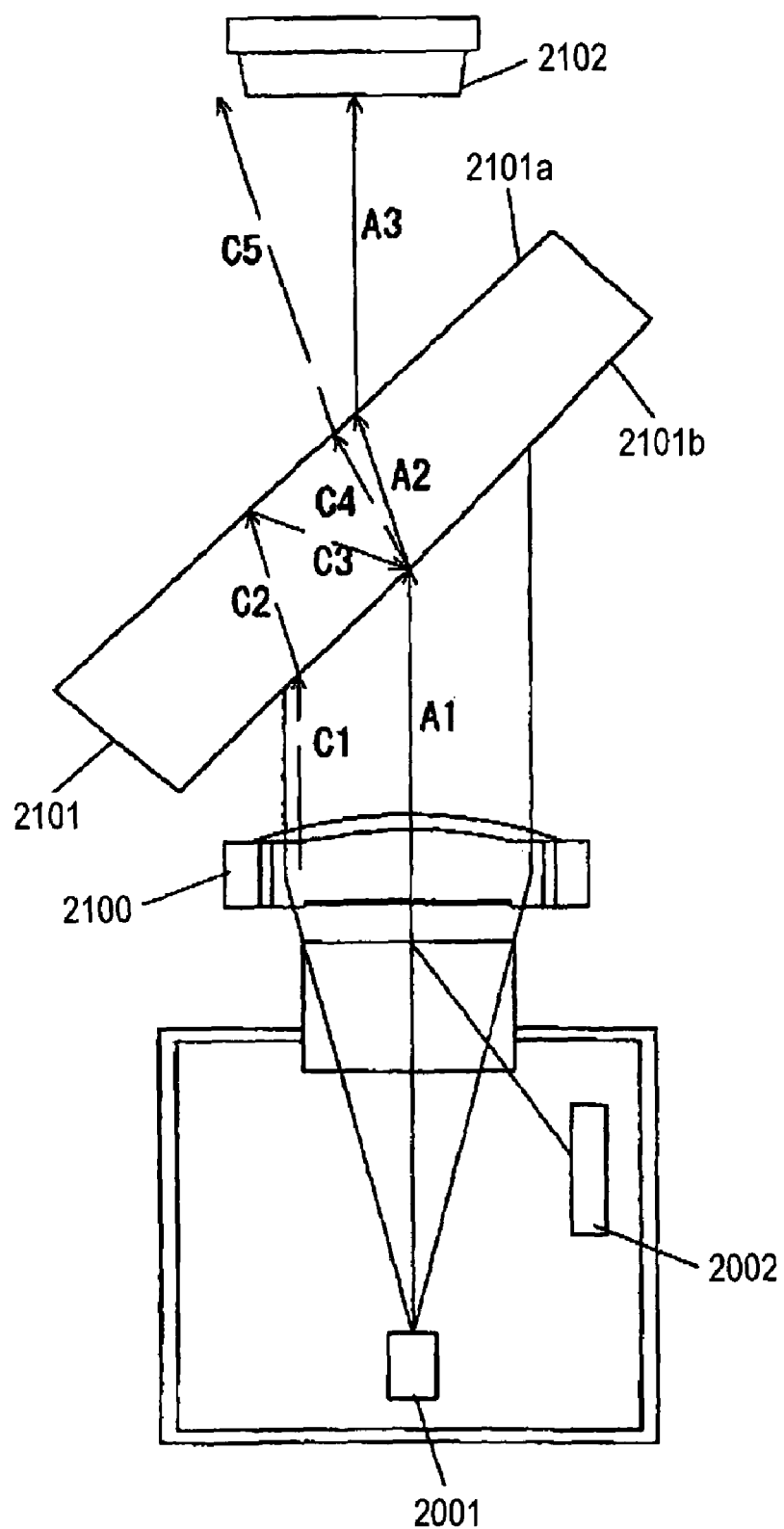
FIG. 38 is a view showing configuration of an optical system of an optical pickup in an embodiment of the present invention.

FIG. 38 is a view showing an optical structure of an optical pickup in the embodiment 5 of the invention, in which, in a state where the collimating lens 2100 for converting the diffuse light emitted from the light source 2001 into the parallel light is positioned on the optical path between the light source 2001 and the beam splitter plate 2101, the principal plane 2101a of the beam splitter plate 2101 at the side of the photosensor 2102 and the principal plane 2101b at the side of the collimating lens 2100 are made non-parallel, while the entire configurations of the optical pickup and the optical disk apparatus are similar to those in the embodiment 4.

In the following, characteristic parts of the embodiment 5 of the invention will be explained.

A diffuse light emitted from the light source 2001 is converted into a parallel light by passing the collimating lens 2100, and such parallel light enters the beam splitter plate 2101 through the principal plane 2101b at the side of the collimating lens 2100, then passes through the interior of the beam splitter plate 2101 and reaches the principal plane 2101a at the side of the photosensor 2102.

The beam splitter plate 2101 has a substantially rectangular parallelpiped form having a substantially square face of 5 mm and a thickness of about 3 mm, and is preferably constituted of a glass material such as borosilicate crown glass.

The principal plane 2101a of the beam splitter plate 2101 at the side of the photosensor 2102 and the principal plane 2101b at the side of the collimating lens 2100 are made non-parallel at least in a part.

In the present embodiment, the principal plane 2101b of the beam splitter plate 2101 at the side of the collimating lens 2100 and the principal plane 2101a at the side of the photosensor 2102 are made non-parallel over the entire surface with a non-parallelism within a range of 1° to 60°. The non-parallelism herein is defined by taking a state, where the principal plane 2101b of the beam splitter plate 2101 at the side of the collimating lens 2100 and the principal plane 2101a at the side of the photosensor 2102 are parallel, as 0°, and by a rotation angle from such state. Usually the principal plane 2101b of the beam splitter plate 2101 at the side of the collimating lens 2100 and the principal plane 2101a at the side of the photosensor 2102 are basically parallel, and an increase in the non-parallelism decreases the light directed from the collimating lens 2100 to the photosensor 2102, while a decrease in the non-parallelism increases the light directed from the collimating lens 2100 to the photosensor 2102, which becomes maximum at a non-parallelism of 0°.

Now there will be explained a case where the principal plane 2101b of the beam splitter plate 2101 at the side of the collimating lens 2100 and the principal plane 2101a at the side of the photosensor are parallel, namely a case of a non-parallelism of 0°.

FIG. 40 is a view showing an optical structure of a optical pickup of a prior configuration. A light emitted from the light source 2001 is passed by optical members 2004, 2005, enters the collimating lens 2100, reflected by the beam splitter plate 2101 and is guided to an upward-directing prism 2103. In the BS plate 2101, a part of the emitted light is reflected and guided to a photosensor 2102 for monitoring the light amount of the light source 2001, and the light emission power of the light source 2001 is regulated by the output of the photosensor 2002, and, in the following, there will be explained a part where a part of the emitted light is transmitted by the beam splitter plate 2101 and is guided to the photosensor 2102 for monitoring the light amount of the light source 2001 and the light emission power of the light source 2001 is regulated by the output of the photosensor 2102. Also for the purpose of clarity, the optical path of the light is divided into a light (A) emerging from the vicinity of a center of the collimating lens 2100 and a light (B) emerging from the vicinity of a peripheral portion of the collimating lens 2100. The optical path is similar to that explained in the embodiment 4, because of a difference in the optical path to the photosensor 2102 for the light (A) emerging from the central part of the collimating lens and the light (B) emerging from the peripheral part of the collimating lens, the light (A) emerging from the central part of the collimating lens receives an optical interference by a difference in phase, thereby giving erroneous information to the photosensor 2102.

However, in the embodiment 5 of the invention shown in FIG. 38 indicating the optical structure of the optical pickup, in which the principal plane 2101a of the beam splitter plate 2101 at the side of the photosensor 2102 and the principal plane 2101b at the side of the collimating lens 2100 are given a non-parallelism within a range of 1° to 60°, because the principal plane 2101b of the beam splitter plate 2101 at the side of the collimating lens 2100 and the principal plane 2101a at the side of the photosensor are non-parallel, the light (B) emerging from a peripheral part of the collimating lens 2100 enters the beam splitting plate 2101 through a peripheral part of the principal plane 2101b at the side of the collimating lens 2100, and, after passing through the interior of the beam splitter plate 2101, reaches the principal plane 2101a of the beam splitter plate 2101 at the side of the photosensor 2102 (order of C1 and C2), and, on the surface of the principal plane 2101a of the beam splitter plate 2101 at the side of the photosensor 2102, a part of the light is reflected by such principal plane 2101a of the beam splitter plate 2101 at the side of the photosensor 2102 and further reflected by the principal plane of the beam splitter plate 2101 at the side of the collimating lens 2100, such light passes a path different from a principal light guided to the photosensor 2102 and reaches a portion other than the photosensor (order of C3, C4 and C5). Also even in case a light reflected in the vicinity of the center of the beam splitter plate 2101 repeats reflection and eventually enters the photosensor 2102, a frequency of the reflected light, in the repeated reflections by the principal planes 2101a, 2101b of the beam splitter plate 2101, is changed outside a frequency range received by the photosensor.

Therefore, when the light emitted from the light source 2001 passes through the beam splitter plate 2101, the reflected light generated in the beam splitter plate 2101 does not reach the photosensor 2102 or changes to a state outside the frequency range receivable by the photosensor 2102, so that the photosensor can reduce reception of erroneous information including optical interference resulting from such reflected light, and there can be realized an optical pickup capable of precisely regulating the light emission intensity of the laser light source for executing at least either of information recording and reproduction on an optical disk.

Figure 41:
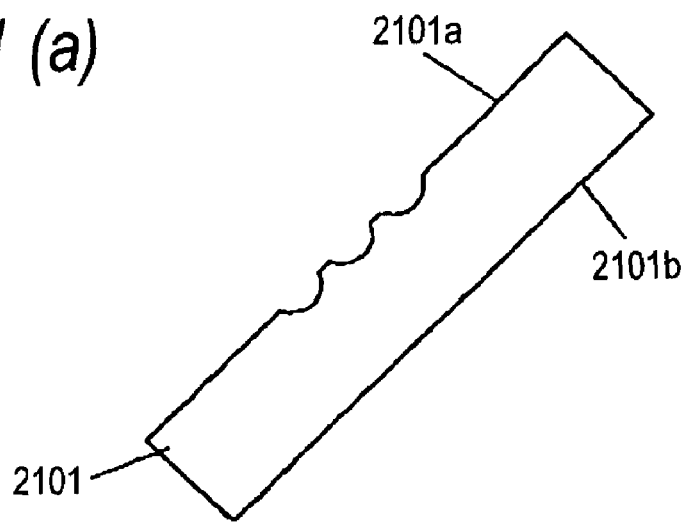
FIG. 41 is a view showing a shape of a beam splitter plate.
Figure 41:
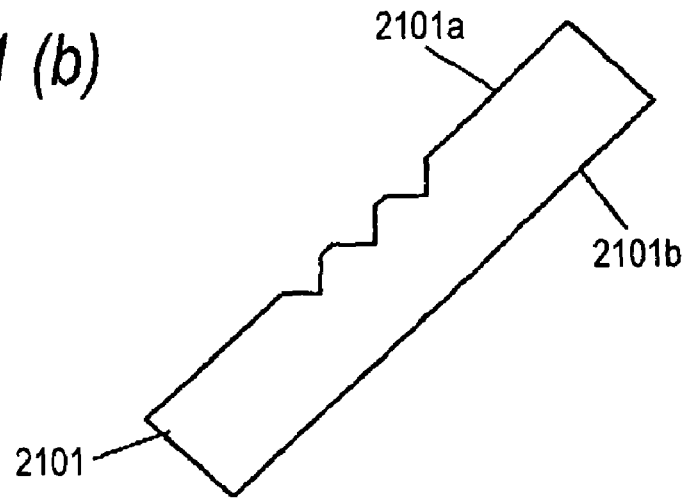
Figure 41:
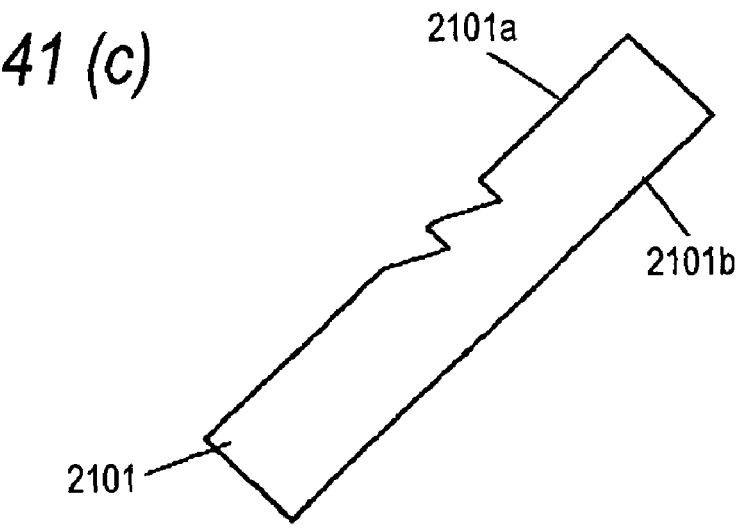

In the present embodiment, the principal plane 2101b of the beam splitter plate 2101 at the side of the collimating lens 2100 and the principal plane 2101a at the side of the photosensor 2102 are given a non-parallelism within a range of 1 to 60° over the entire surface, but the non-parallel area is only required in an area passed by the parallel light toward the photosensor 2102 on either of the principal plane 2101a of the beam splitter plate 2101 at the side of the photosensor 2102 or the principal plane 2101b of the beam splitter plate 2101 at the side of the collimating lens 2100, so that the non-parallel area may be provided in a part passed by the parallel light toward the photosensor 2102. In order to minimize the optical interference as far as possible, the non-parallel area preferably covers an entire surface passed by the parallel light toward the photosensor 2102, thereby increasing the attenuation of the reflected light. Also in the present embodiment, a non-parallel portion is constituted by forming the beam splitter plate 2101 into a substantially trapezoidal pillar shape as shown in FIG. 38, but, as shown in FIG. 41 illustrating shapes of the beam splitter plate, the non-parallel part may be formed as an arc shape in (a), or a sawtooth shape in (b), (c). Also the non-parallelism between the principal plane 2101b of the beam splitter plate 2101 at the side of the collimating lens 2100 and the principal plane 2101a at the side of the photosensor 2102 provides the amount of the transmitted light and the attenuation in the reflected light at the same time in the range of 1-60°, but such non-parallelism may preferably be displaced depending upon a material constituting the beam splitter plate 101.

Also the embodiment 5 can be employed in combination with the embodiment 4, and, in such case, the angle for forming a non-parallel state between at least a part of the principal plane 2101a of the beam splitter plate 2101 at the side of the photosensor 2102 and the principal plane 2101b at the side of the collimating lens 2100 becomes smaller.

FIG. 38 is a view showing an optical disk apparatus utilizing an optical pickup embodying the present invention.

In a state where the collimating lens for converting the diffuse light emitted from the light source into the parallel light is positioned on the optical path between the light source and the beam splitter plate, the principal plane of the beam splitter plate at the side of the photosensor and the principal plane at the side of the collimating lens are made non-parallel in at least a part, while the entire configurations of the optical pickup and the optical disk apparatus are similar to those in the embodiment 4.

The optical pickup and the optical disk apparatus of the invention can effectively transmit the heat, generated in the light emitting element, to the adjoined coupling base and can sufficiently secure the adjoining strength of the light source and the coupling base, whereby it is rendered possible, even when the structure is made compact by employing a light-emitting element capable of emitting plural light beams in a monoblock structure, to prevent at least either of a deterioration of the characteristics and a shortened life of the light-emitting element by heat, and can achieve application to electronic equipment such as a personal computer, a notebook computer and a mobile terminal device.

The present invention can be utilized as an optical pickup advantageously employable in electronic equipment such as a personal computer, a notebook computer and a mobile terminal device, and can realize an optical disk apparatus allowing easy regulation of the light emission intensity.

The present invention can be utilized as an optical pickup advantageously employable in electronic equipment such as a personal computer, a notebook computer and a mobile terminal device, and can realize an optical disk apparatus capable of precisely regulating the light emission intensity of the laser light source.

This application is based upon and claims the benefit of priority of Japanese Patent Application No 2004-021088 filed on 2004 Jan. 29, Japanese Patent Application No 2004-022896 filed on 2004 Jan. 30, Japanese Patent Application No 2004-030338 filed on 2004 Feb. 6, Japanese Patent Application No 2004-030339 filed on 2004 Feb. 6, Japanese Patent Application No 2004-103803 filed on 2004 Mar. 31, Japanese Patent Application No 2004-131006 filed on 2004 Apr. 27, Japanese Patent Application No 2004-147452 filed on 2004 May 18, the contents of which are incorporated herein by references in its entirety.

What is claimed is:

1. An optical pickup comprising:
a light source emitting plural light beams of mutually different wavelengths;
a diffraction member that diffracts said light beams;
a beam splitter that receives diffracted light beams from said diffraction member and that reflects some of the diffracted light beams and transmits some of the diffracted light beams;
a light-receiving element that receives the reflected light beams from said beam splitter; and
a coupling base having a penetrating hole and supporting the light source, the diffraction member and the light-receiving element, wherein the beam splitter is spaced apart from the penetrating hole of the coupling base and the diffraction member,
wherein the plural light beams emitted from the light source enter the diffraction member and the beam splitter through the penetrating hole,
wherein a light entering the beam splitter from the exterior enters the light-receiving element through the beam splitter, and
wherein:
the beam splitter guides the plural light beams from the light source toward an optical disk and a light reflected from the optical disk to the light-receiving element;
the beam splitter includes therein at least first and second inclined faces, inclined to an incident direction of the light to the beam splitter;
the first inclined face has a first polarizing beam-splitting portion;
the second inclined face has a second polarizing beam-splitting portion;
the first polarizing beam-splitting portion has a polarizing property to a light of a short wavelength;
the second polarizing beam-splitting portion has a polarizing property to a light of a long wavelength;
within lights of a short wavelength and a long wavelength emitted from the light source, a P-wave component is transmitted in the first and second polarizing beam-splitting portions and guided toward the optical disk;
within the light of the long wavelength reflected from the optical disk, an S-wave component is reflected by the second polarizing beam-splitting portion to reach the light-receiving element;
within the light of the short wavelength reflected from the optical disk, an S-wave component is transmitted by the second polarizing beam-splitting portion; and
within the light of the short wavelength transmitted by the second polarizing beam-splitting portion, an S-wave component is reflected by the first polarizing beam-splitting portion to reach the light-receiving element.

2. The optical pickup according to claim 1, wherein:
the beam splitter further includes a third inclined face;
the second inclined face is positioned between the first and third inclined faces;
the third inclined face includes a hologram portion; and
a light of a long wavelength reflected by the second polarizing beam-splitting portion is reflected by the hologram portion and then by the second polarizing beam-splitting portion again to enter the light-receiving clement.

3. The optical pickup according to claim 1, wherein the light of the short wavelength is reflected by the first polarizing beam-splitting portion to enter the light-receiving element.

4. The optical pickup according to claim 1, wherein: the beam splitter has a substantially parallelepiped form and has an entrance face for receiving a light from the light source, a light-receiving element-side exit face through which a light emerges from the beam splitter to the light-receiving element, and an optical disk-side exit face which is opposed to the entrance face and through which a light emerges from the beam splitter to the optical disk; and
the entrance face and the optical disk-side exit face are mutually opposed.

5. The optical pickup according to claim 1, wherein the light source emitting plural lights of mutually different wavelengths is formed on a semiconductor substrate.

\* \* \* \* \*